(12) United States Patent
Kondo et al.

(10) Patent No.: US 7,733,960 B2
(45) Date of Patent: Jun. 8, 2010

(54) MOTION VECTOR CALCULATION METHOD

(75) Inventors: Satoshi Kondo, Yawata (JP); Shinya Kadono, Nishinomiya (JP); Makoto Hagai, Moriguchi (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/976,750

(22) Filed: Oct. 26, 2007

(65) Prior Publication Data

US 2008/0063075 A1    Mar. 13, 2008

Related U.S. Application Data

(63) Continuation of application No. 10/480,928, filed as application No. PCT/JP03/04805 on Apr. 16, 2003.

(60) Provisional application No. 60/378,643, filed on May 9, 2002, provisional application No. 60/378,954, filed on May 10, 2002.

(30) Foreign Application Priority Data

| Apr. 19, 2002 | (JP) | ................ 2002-118598 |
| Apr. 23, 2002 | (JP) | ................ 2002-121053 |
| May 29, 2002 | (JP) | ................ 2002-156266 |
| Jun. 19, 2002 | (JP) | ................ 2002-177889 |
| Jul. 2, 2002 | (JP) | ................ 2002-193027 |
| Jul. 12, 2002 | (JP) | ................ 2002-204713 |
| Sep. 6, 2002 | (JP) | ................ 2002-262151 |
| Oct. 2, 2002 | (JP) | ................ 2002-290542 |
| Nov. 6, 2002 | (JP) | ................ 2002-323096 |

(51) Int. Cl.
*H04N 11/02* (2006.01)

(52) U.S. Cl. .................. 375/240.16; 348/699
(58) Field of Classification Search .................. None
See application file for complete search history.

(56) References Cited

U.S. PATENT DOCUMENTS

| 5,329,365 A | 7/1994 | Uz |
| 5,386,234 A | 1/1995 | Veltman et al. |

(Continued)

FOREIGN PATENT DOCUMENTS

CN    1136877    11/1996

(Continued)

OTHER PUBLICATIONS

Joint Video Team (JVT) of ISO/IEC MPEG and ITU-T VCEG, Working Draft No. 2, Revision 2 (WD-2); Document JVT-B118r2, File: JVT-B118r2.doc, Generated: Mar. 15, 2003.*

(Continued)

*Primary Examiner*—Andy S Rao
*Assistant Examiner*—Christopher Findley
(74) *Attorney, Agent, or Firm*—Wenderoth, Lind & Ponack, L.L.P.

(57) ABSTRACT

When a block (MB22) of which motion vector is referred to in the direct mode contains a plurality of motion vectors, 2 motion vectors MV23 and MV24, which are used for inter picture prediction of a current picture (P23) to be coded, are determined by scaling a value obtained from averaging the plurality of motion vectors or selecting one of the plurality of the motion vectors.

4 Claims, 56 Drawing Sheets

U.S. PATENT DOCUMENTS

| | | | |
|---|---|---|---|
| 5,410,354 | A | 4/1995 | Uz |
| 5,724,446 | A | 3/1998 | Liu et al. |
| 5,809,173 | A | 9/1998 | Liu et al. |
| 5,886,742 | A | 3/1999 | Hibi et al. |
| 6,097,842 | A | 8/2000 | Suzuki et al. |
| 6,108,449 | A | 8/2000 | Sekiguchi et al. |
| 6,205,177 | B1 | 3/2001 | Girod et al. |
| 6,389,173 | B1 | 5/2002 | Suzuki et al. |
| 6,396,874 | B1 | 5/2002 | Kato |
| 6,427,027 | B1 * | 7/2002 | Suzuki et al. .............. 382/236 |
| 6,459,812 | B2 | 10/2002 | Suzuki et al. |
| 6,611,558 | B1 | 8/2003 | Yokoyama et al. |
| 6,738,980 | B2 | 5/2004 | Lin et al. |
| RE38,563 | E | 8/2004 | Eifrig et al. |
| 6,807,231 | B1 | 10/2004 | Wiegand et al. |
| 6,980,596 | B2 | 12/2005 | Wang et al. |
| 2001/0014178 | A1 | 8/2001 | Boon |
| 2002/0001411 | A1 | 1/2002 | Suzuki et al. |
| 2002/0012523 | A1 | 1/2002 | Nakatani |
| 2005/0111550 | A1 | 5/2005 | Wang et al. |
| 2006/0072662 | A1 * | 4/2006 | Tourapis et al. ........ 375/240.12 |

FOREIGN PATENT DOCUMENTS

| | | |
|---|---|---|
| CN | 1207228 | 2/1999 |
| EP | 0 542 195 | 5/1993 |
| EP | 0 863 674 | 9/1998 |
| EP | 1 406 453 | 4/2004 |
| JP | 4-20088 | 1/1992 |
| JP | 4-245790 | 9/1992 |
| JP | 05-137131 | 6/1993 |
| JP | 6-62391 | 3/1994 |
| JP | 9-65342 | 3/1997 |
| JP | 10-126787 | 5/1998 |
| JP | 11-239353 | 8/1999 |
| JP | 2001-25019 | 1/2001 |
| JP | 2001-45475 | 2/2001 |
| JP | 2001-045498 | 2/2001 |
| JP | 2001-224036 | 8/2001 |
| JP | 2001-268581 | 9/2001 |
| KR | 1999-023089 | 3/1999 |
| KR | 2000-0064356 | 11/2000 |
| WO | 98/59496 | 12/1998 |
| WO | 03/047271 | 6/2003 |
| WO | 03/047272 | 6/2003 |

OTHER PUBLICATIONS

"*Working Draft No. 2, Revision 2 (WD-2)*", Document JVT-B118R2, Mar. 15, 2003, pp. 1-106 (XP002245569).

Satoshi Kondo et al., "*Proposal for Minor Changes to Multi-Frame Buffering Syntax for Improving Coding Efficiency of B-Pictures*", ISO/IEC JTC1/SC29/WG11 and ITU-T SG16 Q.6, XX, XX, Jan. 29, 2002, pp. 1-10, (XP002249662).

T. Wiegand, "*H.26L Test Model Long-Term No. 9 (TML-9) Draft0*", ITU-T Telecommunication Standardization Sector of ITU, Geneva, CH, Dec. 21, 2001, pp. 1, 3-75, (XP001086625).

Office Action issued Nov. 21, 2008 in U.S. Appl. No. 10/480,928.

International Search Report issued Jun. 17, 2003 in International Application No. PCT/JP03/002099.

Supplementary Partial European Search Report dated Jun. 2, 2005 in European Application No. 03 70 7082.

M. Flierl et al., "*A Locally Optimal Design Algorithm for Block-Based Multi-Hypothesis Motion-Compensated Prediction*", Data Compression Conference, 1998. DCC '98. Proceedings Snowbird, UT, USA Mar. 30-Apr. 1, 1998, Los Alamitos, CA, USA, IEEE Comput. Soc. US, Mar. 30, 1998, pp. 239-248, XP010276624.

Limin Wang, et al., "*JVT-B071r2—Adaptive rame/Field Coding for JVT*", JVT of ISO/IEC MPEG & ITU-T VCEG (ISO/IEC) JTC1/SC29/WG11 and ITU-T SG16 Q.6), Jan. 29, 2002, pp. 1-24; XP002377315.

Michael Gallant and Guy Cote, "*VCEG-N84—High Rate, High Resolution Video Using H26L*", ITU-T, VCEG, Study Group 16 Question 6, Sep. 24, 2001, pp. 1-7, XP002376024.

Supplementary European Search Report issued May 18, 2006 in European Application No. 03 70 7082.

Office Action issued Jun. 18, 2008 in European Patent Application No. 03707082.8.

Office Action issued May 7, 2007 in U.S. Appl. No. 10/468,119.

Office Action issued Sep. 24, 2007 in U.S. Appl. No. 10/468,119.

Office Action issued Jan. 31, 2008 in U.S. Appl. No. 10/468,119.

Office Action issued Nov. 10, 2008 in U.S. Appl. No. 10/468,119.

Office Action issued Jul. 16, 2008 in U.S. Appl. No. 11/980,557.

Office Action issued Nov. 10, 2008 in U.S. Appl. No. 11/980,557.

Office Action issued Mar. 31, 2009 in U.S. Appl. No. 11/980,557.

Office Action issued Apr. 28, 2009 in U.S. Appl. No. 10/480,928.

H. 26L Test Model Long Term No. 6(TML-6) draft 0. [Online], ITU-Telecommunications Standardization Sector Study Group 16 Video Coding Experts Group (VCEG), 2001. [retrieved on May 28, 2003], pp. 28-33. Retrieved from the Internet<URL:http://kbs.cs.tu-berlin.de/_stewe/vceg/TMLDocs/VCEG-L45d0.doc>.

* cited by examiner

Fig. 4A

| | | | | | | | |
|---|---|---|---|---|---|---|---|
| | P | B | B | B | B | B | P |
| Picture number | 10 | 12 | 14 | | 15 | 13 | 11 |
| The first reference index | 2 | 1 | 0 | | 3 | 4 | 5 |
| The second reference index | 5 | 4 | 3 | | 0 | 1 | 2 |

Display order →

Fig. 4B

| | | | | | | | |
|---|---|---|---|---|---|---|---|
| | P | B | B | B | B | B | P |
| Picture number | 10 | 12 | 14 | | 15 | 13 | 11 |
| The first reference index | 1 | 0 | 2 | | 3 | 4 | 5 |
| The second reference index | 5 | 4 | 0 | | 1 | 2 | 3 |

Display order →

```
     Ridx0   Ridx1
A      ×       ×
B      ○       ×
C      ○       ○
```

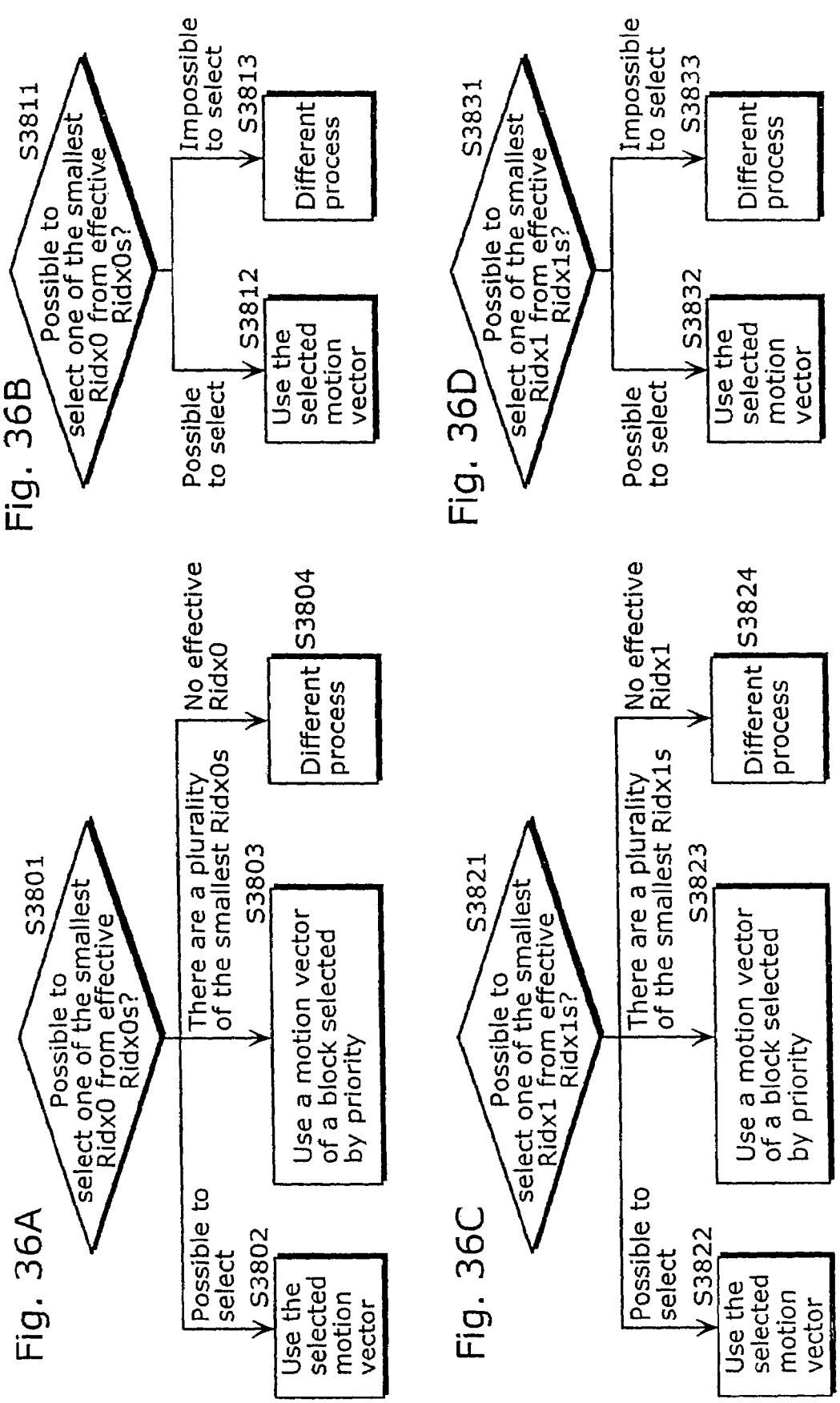

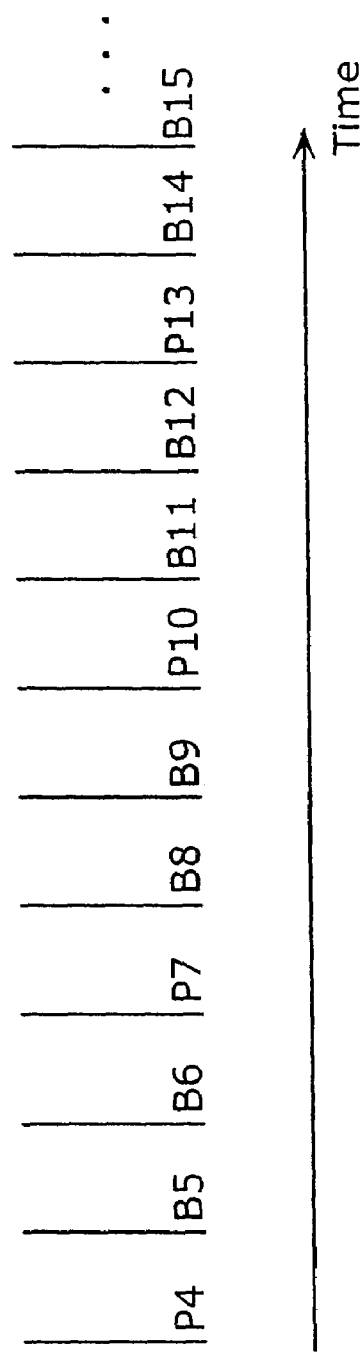
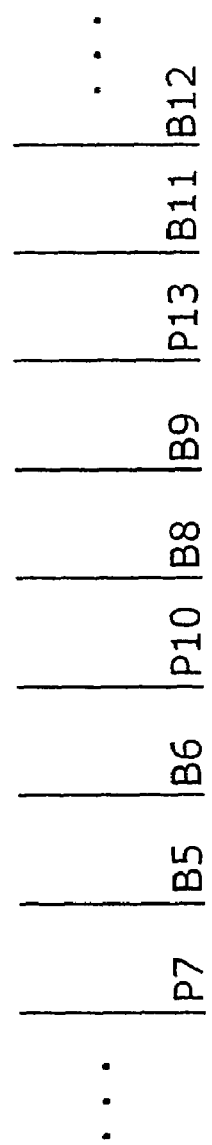
Fig. 41A
Fig. 41B (b)

US 7,733,960 B2

MOTION VECTOR CALCULATION METHOD

This is a continuation application of Ser. No. 10/480,928, filed Dec. 16, 2003, which is the National Stage of International Application No. PCT/JP03/04805, filed Apr. 16, 2003, which claims the benefit of U.S. Provisional Application No. 60/378,643, filed May 9, 2002, and U.S. Provisional Application No. 60/378,954, filed May 10, 2002.

TECHNICAL FIELD

The present invention relates to a moving picture coding method and a decoding method, and particularly to a prediction coding method referring to plural coded pictures preceding in display order or plural coded pictures following in display order or plural pictures both preceding and following in display order.

BACKGROUND ART

Generally, information volume is compressed by reducing redundancy in temporal and spatial directions for moving picture coding. Therefore, motion deriving and motion compensation are performed on a block-to-block basis referring to a preceding or a following picture, and a coding is performed for a difference value between an obtained predictive picture and a current picture for inter picture prediction coding aimed at reducing a temporal redundancy.

In a moving picture coding method H.26L, which is currently under standardization, a picture with only intra picture prediction coding (I picture), a picture for which inter picture prediction coding is performed referring to one picture (hereinafter P picture) and a picture for which inter picture prediction coding is performed referring to two pictures preceding in display order or two pictures following in display order or each one of pictures preceding and following in display order (hereinafter B picture) are proposed.

FIG. 1 is an illustration showing an example of a reference relation between each picture according to above-mentioned moving picture coding method and reference pictures.

In picture 11 intra picture prediction coding is performed without a reference picture, and in picture P10 inter picture prediction coding is performed referring to a picture preceding in display order, P7. In a picture B6 inter picture prediction coding is performed referring to two pictures preceding in display order, in a picture B12 inter picture prediction coding is performed referring to two pictures following in display order and in a picture B18 inter picture prediction coding is performed referring to each one of pictures preceding and following in display order.

A direct mode is one of prediction mode of bi-predictions which perform inter picture prediction coding referring to each of pictures preceding and following in display order. In the direct mode, motion vectors for a block to be coded are not coded in the bit stream directly, and two motion vectors for actual motion compensation are calculated referring to a motion vector of a co-located block in a coded picture close to the picture including the block to be coded in display order, and a predictive block is generated.

FIG. 2 shows an example that a coded picture which is referred to in order to determine a motion vector in the direct mode contains a motion vector which refers to a preceding picture in display order. "P" indicated by a vertical line in FIG. 2 has nothing to do with a picture type and it shows a mere picture. In FIG. 2, for example, a picture P83, in which bi-prediction is performed referring to pictures P82 and P84, is a current picture to be coded. If it is assumed that a block with coding in the picture P83 is a block MB81, a motion vector of the block MB81 is determined using a motion vector of a co-located block MB82 in the picture P84 which is a coded backward reference picture. Since the block MB82 contains only one motion vector MV81 as a motion vector, two motion vectors MV82 and MV83 to be obtained are calculated directly by applying a scaling to a motion vector MV81 and a time interval TR81 based on Equation 1 (a) and Equation 1(b).

$$MV82 = MV81/TR81 \times TR82 \qquad \text{Equation 1 (a)}$$

$$MV83 = -MV81/TR81 \times TR83 \qquad \text{Equation 1 (b)}$$

In these equations, the time interval TR81 shows an interval between the picture P84 and the picture P82, that is, a time interval between the picture P84 and a reference picture indicated by the motion vector MV81. The time interval TR82 shows a time interval between the picture P83 and a reference picture indicated by the motion vector MV82. The time interval TR83 shows a time interval between the picture P83 and a reference picture indicated by the motion vector MV83.

The direct mode includes two methods, the temporal prediction already explained and the spatial prediction, and the spatial prediction is explained below. In the spatial prediction in the direct mode, for example, coding is performed on a macroblock of 16×16 pixels basis, and a motion vector, which is obtained referring to a picture closest from a current picture to be coded in display order, is selected from motion vectors in three macroblocks neighboring the current macroblock to be coded, and the selected motion vector is a motion vector for the current macroblock to be coded. If three motion vectors refer to a same picture, a median value is selected. If two of three motion vectors refer to a picture closest from a current picture to be coded in display order, the remainder is considered as "0" vector, and a median value of these values is selected. If only 1 motion vector refers to a picture closest from a current picture to be coded in display order, this motion vector is selected. Thus a motion vector is not coded for a current macroblock to be coded in the direct mode, and motion prediction is performed using a motion vector contained in another macroblock.

FIG. 3A is an illustration showing an example of a motion vector predicting method in the case that a picture preceding in a B picture in display order is referred to using a conventional spatial predicting method in the direct mode. In this FIG. 3A, P indicates a P picture, B indicates a B picture and numbers assigned to picture types in right four pictures indicate an order in which each picture is coded. It should be assumed that a macroblock diagonally shaded in a picture B4 is a current macroblock to be coded. When a motion vector of a current macroblock to be coded is calculated using a spatial predicting method in the direct mode, first, three coded macroblocks (area shaded with broken lines) are selected from macroblocks neighboring the current macroblock to be coded. Explanation of a method for selecting three neighboring macroblocks is omitted here. Motion vectors in coded three macroblocks have been calculated and stored already. There is a case that the motion vector is obtained referring to different pictures for each macroblock even if macroblocks are in a same picture. Reference indices in reference pictures used for coding each macroblock can show which picture is referred to by the three neighboring macroblocks respectively from. Detail of reference indices will be explained later.

Now, for example, it is assumed that three neighboring macroblocks are selected for a current macroblock to be coded shown in FIG. 3A, and motion vectors in each coded macroblock are a motion vector a, b and c respectively. Here, it is assumed that the motion vector and the motion vector b are obtained referring to a P picture with a picture number 11 of "11", and the motion vector c is obtained referring to a P picture with the picture number 11 of "8". In this case, among these motion vectors, a, b, and c, the motion vectors a and b which refer to a picture closest to a current picture to be coded in order or display time are candidates for a motion vector of a current macroblock to be coded. In this case, the motion vector c is considered as "0", and a median value of these three motion vectors a, b and c is selected and determined as a motion vector of the current macroblock to be coded.

However, a coding method such as MPEG-4 can perform coding for each macroblock in a picture using a field structure and a frame structure. Therefore, in a coding method such as MPEG-4, there is a case that a macroblock coded in the field structure and a macroblock coded in the frame structure are mixed in one frame of reference frame. Even in such a case, if three macroblocks neighboring a current macroblock to be coded are coded in the same structure as the current macroblock to be coded, it is possible to derive a motion vector of the current macroblock to be coded using the above-mentioned spatial predicting method in the direct mode without any problems. That is, a case that three neighboring macroblocks are coded in the frame structure for a current macroblock to be coded in the frame structure, or a case that three neighboring macroblocks are coded in the field structure for a current macroblock to be coded in the field structure. The former case is as already explained. In the latter case, by using three motion vectors corresponding to top fields of three neighboring macroblocks for a top field of a current macroblock to be coded, and by using three motion vectors corresponding to bottom fields of three neighboring macroblocks for a bottom field of the current macroblock to be coded, a motion vector of the current macroblock to be coded can be derived for the top field and the bottom field respectively using the above-mentioned method.

However, in the temporal prediction method in the direct mode, since the above-mentioned block contains plural motion vectors for temporal prediction in the direct mode when in a block with intra picture prediction coding, motion compensation in the direct mode is performed, if a block of which motion vector is referred to belongs to a B picture such as B6 shown in FIG. 1, a problem occurs because a calculation of motion vector by a scaling based on Equation 1 can not be applied directly. Furthermore, there is a case that precision of motion vector value (half pixel precision and quarter pixel precision, for example) does not meet predetermined precision since dividing operation is performed after the calculation of motion vector.

When a current macroblock to be coded and one of neighboring macroblocks are coded in a different structure for a spatial prediction, it is not specified which one of a field structure or a frame structure is used for coding the current macroblock to be coded, and a method for selecting a motion vector of the current macroblock to be coded from motion vectors of neighboring macroblocks coded in both the field structure and the frame structure is not specified.

The first object of the present invention is to offer a motion vector prediction method in temporal direction with high precision in the direct mode even if a block of which motion vector is referred to belongs to a B picture.

The second object of the present invention is to offer a motion vector prediction method in spatial direction with high precision in the direct mode even if a block of which motion vector is referred to belongs to a B picture.

SUMMARY OF THE INVENTION

In order to achieve above object, a motion vector calculation method according to the present invention is a motion vector calculation method for inter picture prediction with reference to a plurality of pictures. The motion vector calculation method comprises a referring step of referring to a plurality of pictures preceding in display order or a plurality of pictures following in display order or a plurality of pictures both preceding and following in display order, and a motion compensating step, with reference to a motion vector of a co-located block in a picture other than a picture to which an inter picture predictive block belongs when performing motion compensation of the inter picture predictive block, for calculating a motion vector of the inter picture predictive block using at least one motion vector, which satisfies a predetermined condition, among motion vectors already calculated for the co-located block of which motion vector is referred to. Therefore according to the motion vector calculation method of the present invention, when in a block with inter picture predictive coding motion compensation is performed referring to a motion vector of a co-located block in a coded other picture, and when a block of which motion vector is referred to contains a plurality of motion vectors, it is possible to actualize the motion compensation without contradiction by generating one motion vector used for scaling among the plurality of motion vectors.

For the motion vector calculation method according to the present invention, in the reference step, each one of pictures selected from a first picture order and a second picture order can be referred to. Here the first picture order is the order in which identifying numbers are assigned to pictures in ascending sequence giving priority to a picture precedent in display order, and the second picture order is the order in which identifying numbers are assigned to pictures in ascending sequence giving priority to a picture following in display order. In the motion compensating step, a motion vector, which refers to a picture in the first picture order, of the block of which motion vector is referred to may be used. For the method, even if a block of which motion vector is referred to belongs to the B picture, the one used for the motion compensation of the block with inter picture prediction can be determined as a motion vector referring to a picture in the first picture order, and motion vector calculation method by scaling can be applied.

Moreover, another motion vector calculation method according to the present invention includes an assigning step, a first selecting step and a deriving step. The assigning step is for assigning one of a first reference index or a second reference index to the coded picture. Here, the first reference index and the second reference index are used for selecting at lest one of a first reference picture or a second reference picture which are referred to when obtaining a block in a current picture to be coded by motion compensation from a plurality of coded pictures stored in a storing unit. The first selecting step is for selecting a motion vector indicating a median value of the motion vectors, when performing motion compensation of a block in the current picture to be coded, there are a plurality of motion vectors containing the first reference indices among motion vectors of blocks in the neighbor of the current picture to be coded. The deriving step is for deriving a motion vector referring to a picture preceding the current picture to be coded in display order or a picture following the current picture to be coded in display order or pictures preceding and following the current picture to be coded in display order using the motion vector selected in the first selecting step. Therefore, when motion compensation is performed for a block in the current picture to be coded and when there are a plurality of motion vectors containing the first reference index among motion vectors of blocks in the neighbor of the block in the current picture to be coded, the motion vector of the current picture to be coded can be derived using a motion vector indicating a median value of motion vectors.

For the motion vector calculation method according to the present invention, a motion vector indicating a median value of the smallest first reference indices may be further selected from motion vectors containing the first reference indices in the first selecting step.

Further Information about Technical Background to this Application

Japanese Patent Application No. 2002-118598 filed Apr. 19, 2002:

Japanese Patent Application No. 2002-121053 filed Apr. 23, 2002:

Japanese Patent Application No. 2002-156266 filed May 29, 2002:

Japanese Patent Application No. 2002-177889 filed Jun. 19, 2002:

Japanese Patent Application No. 2002-193027 filed Jul. 2, 2002:

Japanese Patent Application No. 2002-204713 filed Jul. 12, 2002:

Japanese Patent Application No. 2002-262151 filed Sep. 6, 2002:

Japanese Patent Application No. 2002-290542 filed Oct. 2, 2002:

Japanese Patent Application No. 2002-323096 filed Nov. 6, 2002:

U.S. Provisional Application No. 60/378,643 filed May 9, 2002:

U.S. Provisional Application No. 60/378,954 filed May 10, 2002: are incorporated herein by reference.

BRIEF DESCRIPTION OF DRAWINGS

FIGS. 4A and 4B are explanatory illustrations of picture numbers and reference indices.

FIG. 36 is an illustration showing a procedure for determining a motion vector of a current block to be coded using a value of a reference index.

FIG. 41A is an illustration showing an order of frames inputted into the moving picture coding apparatus 100 in order of time on picture-to-picture basis.

FIG. 41B is an illustration showing the case that the order of frames shown in FIG. 41A is reordered in the coding order.

DETAILED DESCRIPTION OF THE INVENTION

The present invention aims to solve problems of the conventional technology, and aims at proposing a moving picture coding method and a decoding method which can determine a motion vector used for motion compensation without contradiction even if a block of which motion vector is referred to in a direct mode is a B picture. First, reference indices are explained here.

Figure 1:
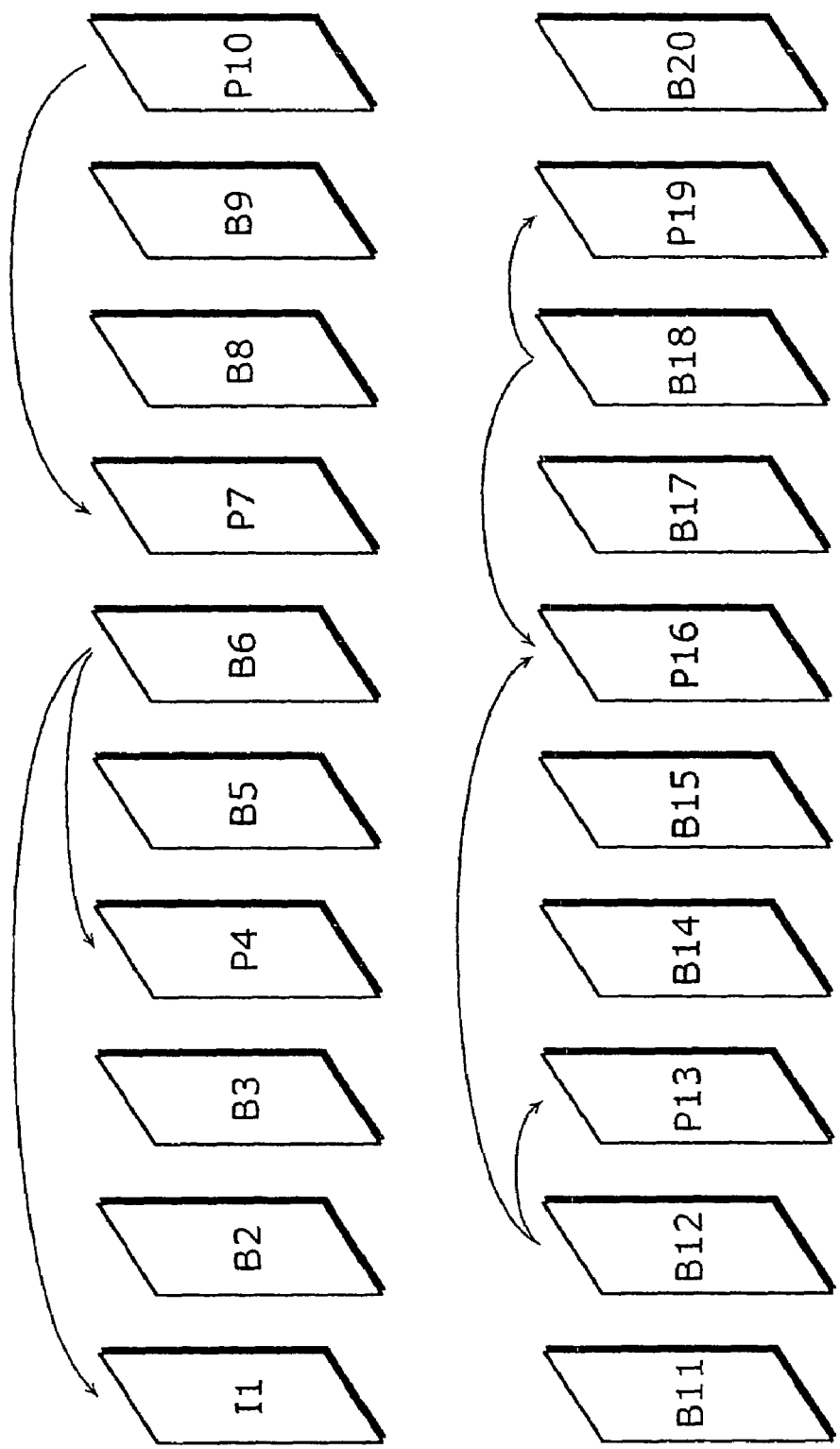
FIG. 1 is a schematic diagram showing a referential relation of pictures of a conventional example.
Figure 2:
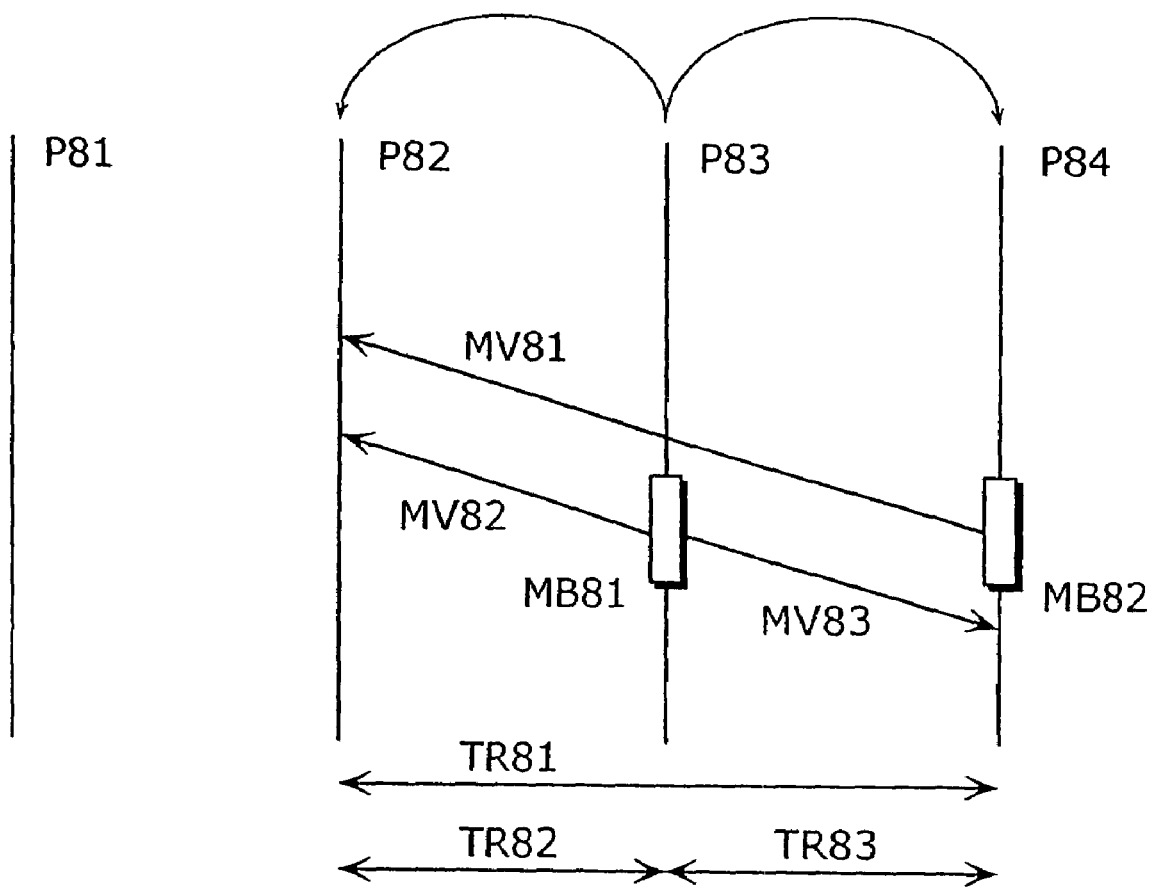
FIG. 2 is a schematic diagram showing an operation in a conventional direct mode.
Figure 3A:
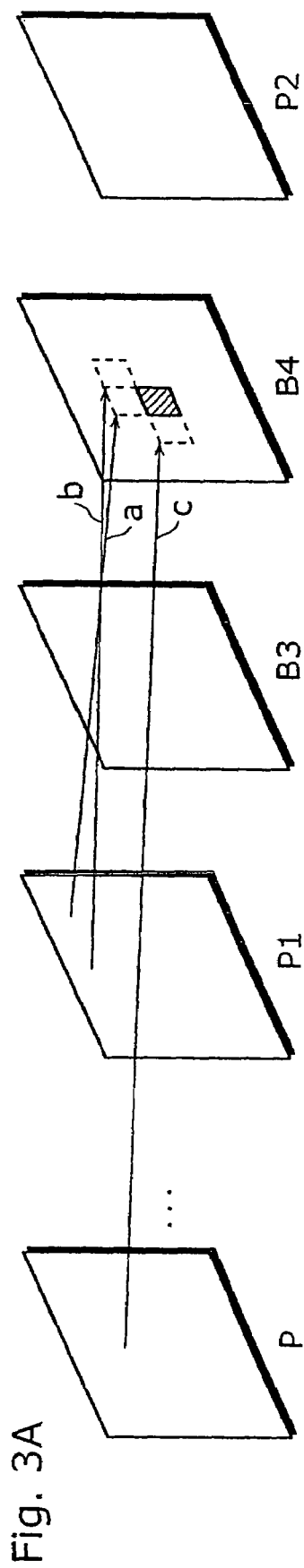
FIG. 3A is an illustration showing an example of a motion vector predicting method when a temporally preceding picture is referred to in a B picture using a spatial predicting method of a conventional direct mode.
Figure 3B:
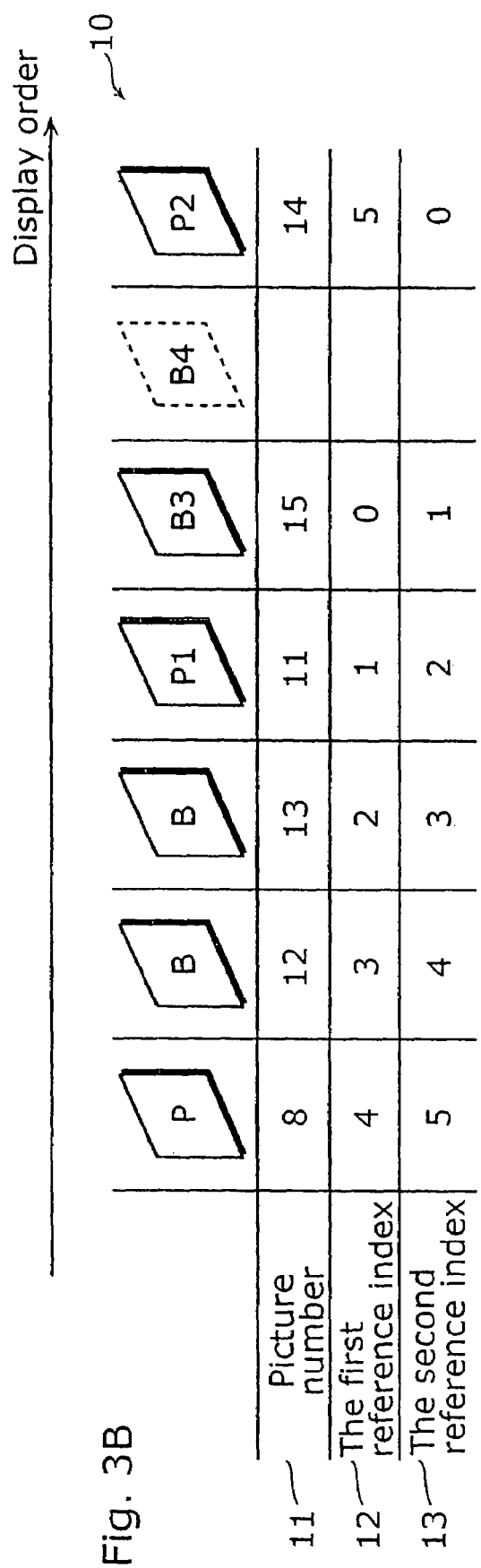
FIG. 3B is an illustration showing an example of a reference list generated in each current picture to be coded.

FIG. 3B is an illustration showing an example of a reference picture list 10 generated for each current picture to be coded. In the reference picture list 10 shown in FIG. 3B, pictures are shown preceding and following a B picture in display order with one B picture at the center, and pictures to which the B picture can refer, picture types, a picture number 11, the first reference index 12 and the second reference index 13 are shown. The picture number 11 is, for example, a number showing an order in which each picture is coded. The first reference index 12 is the first index showing a relative positional relation between a current picture to be coded and neighboring pictures, and, for example, is used mainly as an index when a current picture to be coded refers to a picture preceding in display order. A list of the first reference index 12 is called a "reference index list0 (list0)" or "the first reference index list". Moreover, the reference index is called a relative index. First, in the reference picture list 10 shown in FIG. 3B, integer which is advanced by "1" is assigned to a value of the first reference index 12 from "0" from the closest to a current picture to be coded in a time sequence for a reference picture preceding a current picture to be coded in display order. Next, after a value advanced by "1" from "0" is assigned to all reference pictures following a current picture to be coded in display order, following values are assigned to reference pictures following the current picture to be coded in display order from closest to the current picture to be coded in display order.

The second reference index 13 is the second index showing a relative positional relation between a current picture to be coded and neighboring pictures, and, for example, is used mainly as an index when a current picture to be coded refers to a picture following in display order. A list of the second reference index 13 is called "reference index list1 (list1)" or "the second reference index list". First, integer which is advanced by "1" is assigned to a value of the second reference index 13 is from "0" the closest to a current picture to be coded in display order. Next, after a value advanced by "1" from "0" is assigned to all reference pictures following a current picture to be coded in display order, following values are assigned to reference pictures preceding a current picture to be coded in display order from the closest value to a current picture to be coded in display order. Therefore, it is found in the reference picture list 10 that as for the first reference index 12 and the second reference index, a reference picture with smaller reference index value is closer to the current picture to be coded in display order. A method for assigning a reference index number in initial state of is explained above, however, the method for assigning a reference index number can be changed on a picture-by-picture basis or a slice-by-slice basis. In the method for assigning a reference index number, for example, a small number may be assigned to a picture far in display order, however, such a reference index is used, for example, when coding efficiency is improved by referring to the picture far in display order. In other words, since reference indices in a block are presented by variable length code words and data with shorter lengths are assigned to the indices of the smaller values, by assigning smaller reference index to the reference picture which improves coding efficiency if it is referred to, the amount of codes in reference indices is reduced and further coding efficiency is improved.

FIGS. 4A and 4B are explanatory illustrations for picture numbers and reference indices. FIGS. 4A and 4B show examples of the reference picture list, and show a reference picture, a picture number and a reference index used when coding the B picture at the center (indicated by a broken line). FIG. 4A shows the case assigning reference indices by the method for assigning reference indices in initial state explained using FIG. 3.

Figure 5:
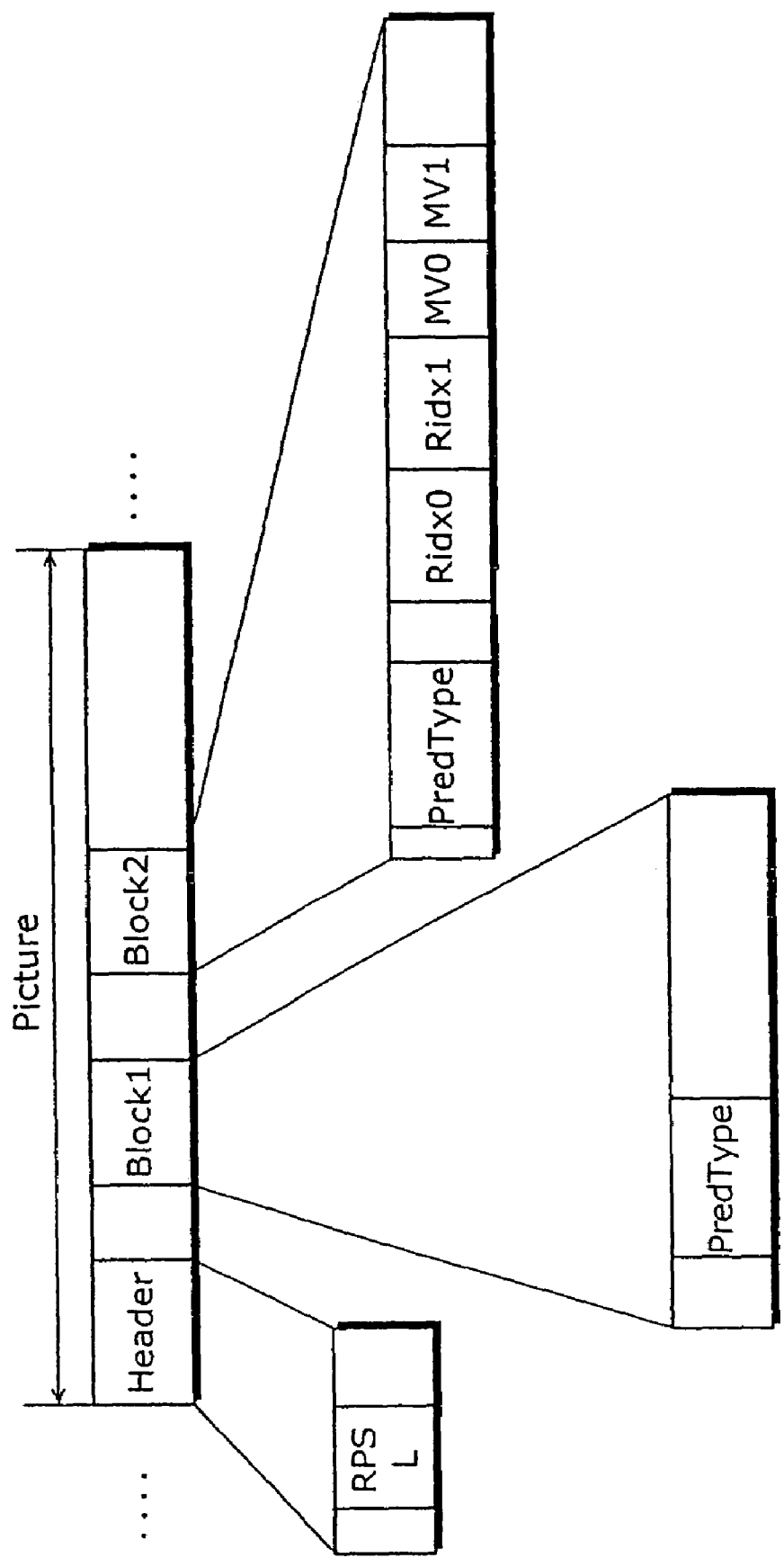
FIG. 5 is an illustration showing a concept of a picture coding signal format of a conventional picture coding apparatus.

FIG. 5 is a conceptual diagram of a picture coding signal format of a conventional picture coding apparatus. Picture indicates a coding signal for one picture, Header indicates a header coding signal included in the head of a picture, Block1 indicates a coding signal in a block coded in a direct mode, Block2 indicates a coding signal in a block coded by an interpolation prediction other than the direct mode, Ridx0 and Ridx1 are the first reference index and the second reference index respectively, and MV0 and MV1 are the first motion vector and the second motion vector respectively. The coded block Block2 has two reference indices Ridx0 and Ridx1 in a coding signal in this order for indicating two reference pictures to be used for motion compensation. Moreover, the first motion vector MV0 and the second motion vector MV1 are coded in the coding signal of the coded block Block2 in this order. It can be judged by PredType that which of the reference indices Ridx0 and/or Ridx1 is used. A picture (the first reference picture) referred to by the first motion vector MV0 is indicated by the first reference index Ridx0, and a picture (the second reference picture) referred to by the second motion vector MV1 is indicated by the second reference index Ridx1. For example, when it is indicated that pictures are referred to bi-directionally by the motion vectors MV0 and MV1, Ridx0 and Ridx1 are used, when it is indicated that pictures are referred to uni-directionally by one of motion vector MV0 or MV1, one of Ridx0 or Ridx1 corresponding to the motion vector is used, and when the direct mode is indicated, neither Ridx0 nor Ridx1 are used. The first reference picture is specified by the first reference index and generally has display time preceding a current picture to be coded, and the second reference picture is specified by the second reference index and generally has display time following the current picture to be coded. However, as the method for assigning reference indices in FIG. 4 shows, there is a case that the first reference picture contains display time following the current picture to be coded and the second reference picture contains display time preceding the current picture to be coded. The first reference index Ridx0 is a reference index indicating the first reference picture referred to by the first motion vector MV0 of the block Block2, and the second reference index Ridx1 is a reference index indicating the second reference picture referred to by the second motion vector MV1 of the block Block2.

On the other hand, an assignment of reference pictures to reference indices can be changed arbitrarily by indicating explicitly using a memory control signal in a coded signal (RPSL in Header in FIG. 5). This makes it possible to change the reference picture with the second reference index "0" to an arbitrary reference picture. For example, as shown in FIG. 4B, assignment of reference indices to picture numbers can be changed.

Thus, since assignment of reference pictures to reference indices can be changed arbitrarily and the change of the assignment of reference pictures to reference indices generally assigns a smaller reference index to a picture which improves coding efficiency if selected as a reference picture, coding efficiency can be improved by using a motion vector, which refers to a picture of which reference index is the smallest, as a motion vector used in the direct mode.

First Embodiment

Figure 6:
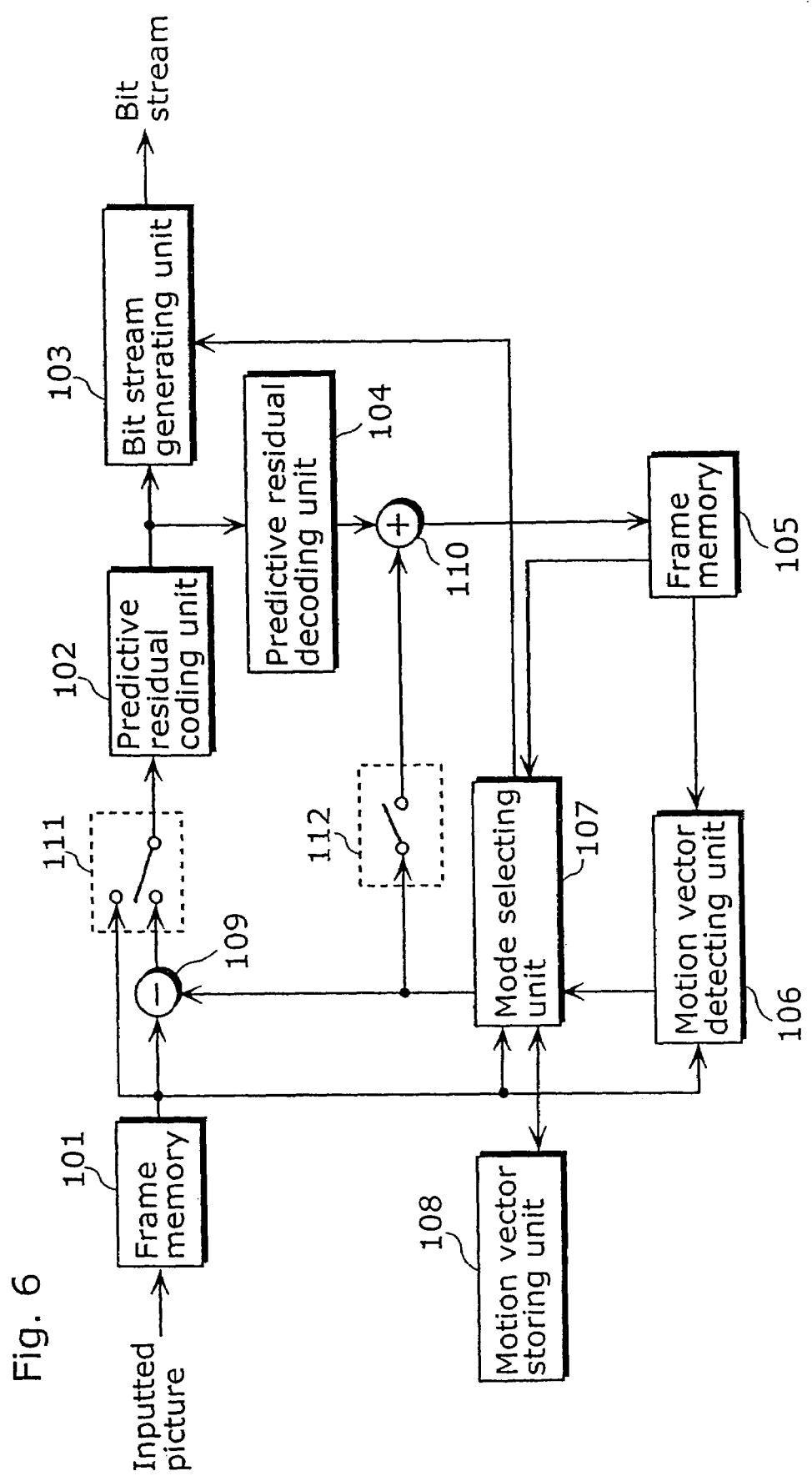
FIG. 6 is a block diagram showing an operation of coding according to the first and the second embodiments of this invention.

A moving picture coding method according to the first embodiment of the present invention is explained using the block diagram shown in FIG. 6.

A current moving picture to be coded is inputted into a frame memory 101 in a display order on a picture-to-picture basis, and reordered in a coding order. Each picture is divided into a group called a block, which is 16 (horizontal)×16 (vertical) pixels in size, for example, and following processes are performed on a block-to-block basis.

A block read from the frame memory 101 is inputted into a motion vector detecting unit 106. Here, a motion vector of a current block to be coded is detected using a decoded picture of a coded picture stored in the frame memory 105 as a reference picture. In this case, in a mode selecting unit 107, an optimum prediction mode is determined with reference to a motion vector obtained in the motion vector detecting unit 106 and a motion vector used in a coded picture stored in a motion vector storing unit 108. A prediction mode obtained in the mode selecting unit 107 and a motion vector used in the obtained mode are inputted to a difference calculating unit 109, and a predictive residual picture is generated by calculating a difference from a current block to be coded, and coding is performed in a predictive residual coding unit 102. Moreover, the motion vector used in the mode obtained in the mode selecting unit 107 is stored in a motion vector storing unit 108 in order to be used for coding by following blocks and pictures. An above processing flow is an operation when an inter picture prediction coding is selected, however, a switch 111 switches to an intra picture prediction coding. Eventually, variable length coding is performed for control information, such as a motion vector, and picture information, such as picture information outputted from the predictive residual coding unit 102, and a bit stream outputted eventually is generated by a bit stream generating unit 103.

A summary of coding flow is explained above, however, details of the process in the motion vector detecting unit 106 and the mode selecting unit 107 are explained below.

Motion vector detecting is performed on a block-by-block basis or an area-by-area (area is a divided block) basis. Using coded pictures preceding and following a current picture to be coded in display order as reference pictures, a predictive picture and a prediction mode showing a location which is predicted to be optimum in the search area in the picture is generated by deciding a motion vector.

A direct mode is one of bi-predictions which perform inter picture prediction coding prediction referring to two pictures preceding and/or following in display order. In the direct mode, a current block to be coded does not contain a motion vector directly, and two motion vectors for actual motion compensation are calculated referring to a motion vector of a co-located block in a coded picture close in display order, and a predictive block is generated.

Figure 7:
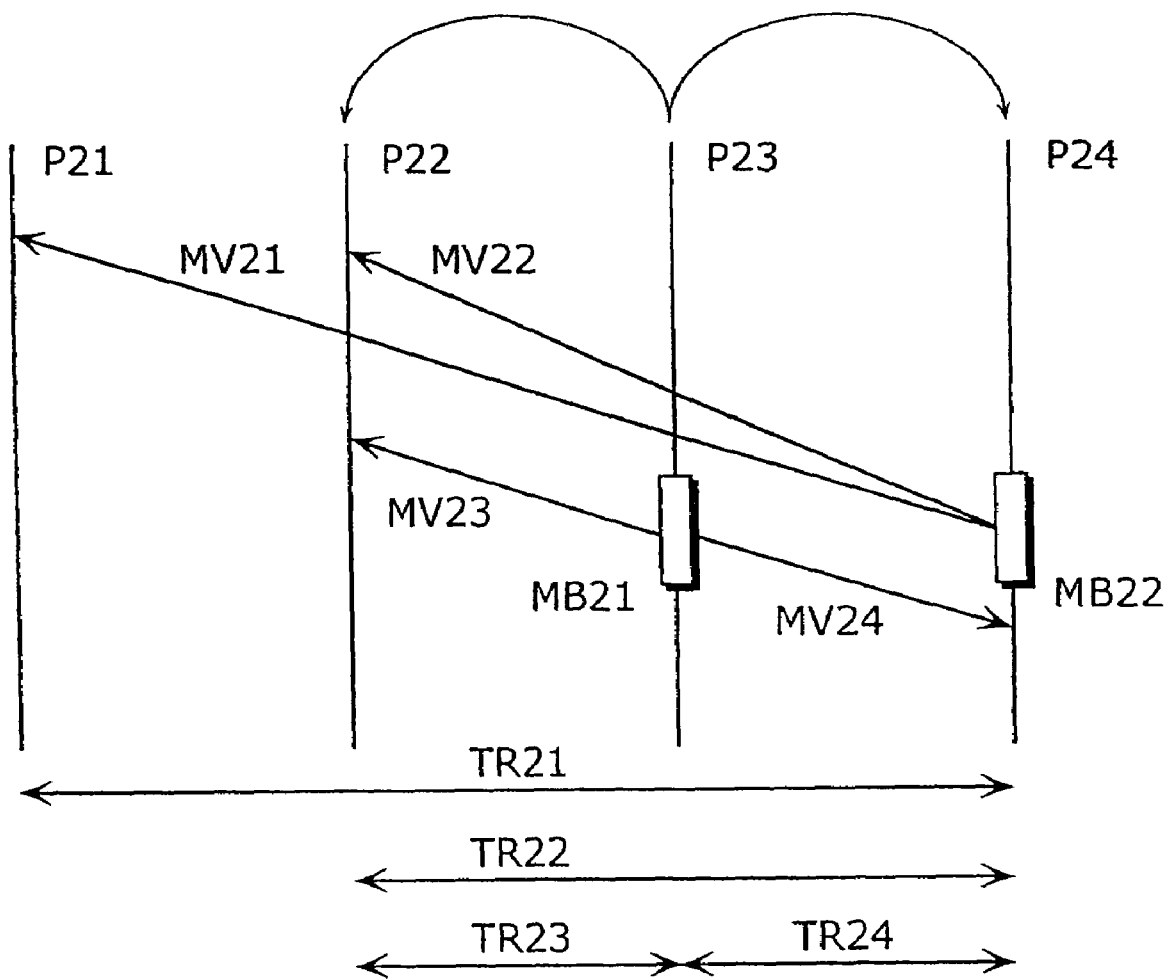
FIG. 7 is a schematic diagram showing an operation when a block of which motion vector is referred to in the direct mode contains two motion vectors which refer to preceding time in display order.

FIG. 7 shows an operation when a coded block referred to in order to determine a motion vector in the direct mode contains two motion vectors which refer to two pictures preceding in display order. A picture P23 is a current picture to be coded, and performs bi-prediction referring to pictures P22 and P24. Assume that a block to be coded is a block MB21; and two required motion vectors are determined using a motion vector contained in a block MB22, which is a co-located block in the coded following reference picture (the second reference picture specified by the second reference index) P24. Since the block MB22 contains motion vectors MV21 and MV22 as a motion vector, it is impossible to calculate two required motion vectors MV23 and MV24 by scaling directly similarly to Equation 1. Therefore, as Equation 2 shows, a motion vector MV_REF is calculated as a motion vector to be scaled from an average value of two motion vectors contained in the block MB22, and a time interval TR_REF at that time is calculated from the average value likewise. Then, motion vectors MV23 and MV24 are calculated by scaling the motion vector MV_REF and the time interval TR_REF based on Equation 3. In this case, the time interval TR21 indicates a time interval between the picture P24 and the picture P21, that is, a picture referred to by the motion vector MV21, and the time interval TR22 indicates a time interval until a picture referred to by the motion vector MV22. Moreover, the time interval TR23 is a time interval until a picture referred to by the motion vector MV23, and the time interval TR24 is a time interval until a picture referred to by the motion vector MV24. Time intervals between these pictures can be determined based on, for example, information indicating display time and display order added to each picture or difference of information. Note that a current picture to be coded refers to a next picture in the example of FIG. 7, however, the case referring to a picture which is not next may be treated in the same manner.

$$MV\_REF=(MV21+MV22)/2 \qquad \text{Equation 2 (a)}$$

$$TR\_REF=(TR21+TR22)/2 \qquad \text{Equation 2 (b)}$$

$$MV23=MV\_REF/TR\_REF \times TR23 \qquad \text{Equation 3 (a)}$$

$$MV24=-MV\_REF/TR\_REF \times TR24 \qquad \text{Equation 3 (b)}$$

The above embodiment shows the coding method in which an inter picture prediction coding can be performed using the direct mode without contradiction even if a block of which motion vector is referred to in the direct mode belongs to a B picture. In the coding method, when a block of which motion vector is referred to in the direct mode contains plural motion vectors which refer to a picture preceding in display order, one motion vector is generated using the plural motion vectors, and two motion vectors to be used for actual motion compensation are determined by scaling.

Note that when two motion vectors MV23 and MV24 in FIG. 7 are calculated, it is possible to use Equation 4 instead of Equation 2 as a method for averaging motion vectors MV21 and MV22, and for averaging time intervals TR21 and TR22 in order to calculate the motion vector MV_REF and the time interval TR_REF to be scaled. First, as Equation 4 (a) shows, the motion vector MV21' is calculated by scaling MV21 to equate the time interval with the motion vector MV22. Then the motion vector MV_REF is determined by averaging motion vectors MV21' and MV22. Here, the time interval TR22 is used directly as the time interval TR_RF. Note that the case calculating a motion vector MV22' by scaling the motion vector MV22 instead of calculating the motion vector MV21' by scaling a motion vector MV21 may be treated in the same manner.

$$MV21'=MV21/TR21 \times TR22 \qquad \text{Equation 4 (a)}$$

$$MV\_RF=(MV21'+MV22)/2 \qquad \text{Equation 4 (b)}$$

$$TR\_REF=TR22 \qquad \text{Equation 4 (c)}$$

Note that when two motion vectors MV23 and MV24 in FIG. 7 are calculated, as a motion vector MV_REF and a time interval TR_REF which are scaled, a motion vector MV22 and a time interval TR22, which refer to a picture P22 located temporally closer to a picture P24 of which motion vector is referred to, can be directly used as Equation 5 shows instead of using an average value of two motion vectors as Equation 2 shows. Likewise, as a motion vector MV_REF and a time interval TR_REF, a motion vector MV21 and a time interval TR21, which refer to a picture P21 located temporally farther, can be directly used as Equation 6 shows. This makes it possible to reduce capacity of a motion vector storing unit in a coding apparatus since each block belonging to a picture P24 of which motion vector is referred to can perform motion compensation by storing only one of two motion vectors.

$$MV\_REF=MV22 \qquad \text{Equation 5 (a)}$$

$$TR\_REF=TR22 \qquad \text{Equation 5 (b)}$$

$$MV\_REF=MV21 \qquad \text{Equation 6 (a)}$$

$$TR\_REF=TR21 \qquad \text{Equation 6 (b)}$$

Figure 8A:
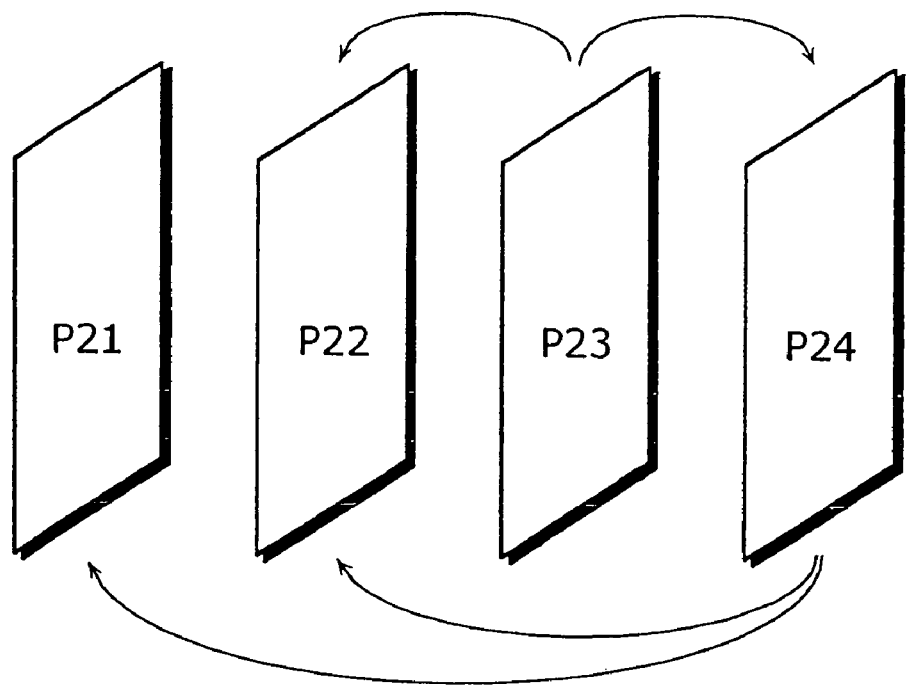
FIG. 8 is a schematic diagram comparing a referential relation of pictures in display order and coding order.
Figure 8B:
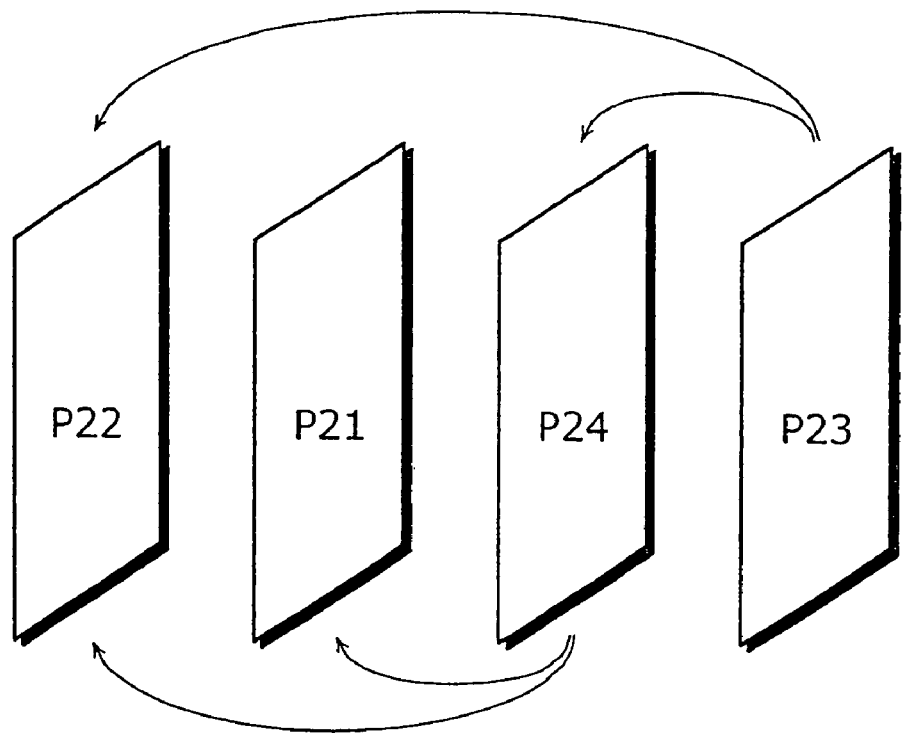

Note that when two motion vectors MV23 and MV24 in FIG. 7 are calculated, as a motion vector MV_REF and a time interval TR_REF which are scaled, a motion vector which refers to a picture to be coded precedently can be directly used instead of using an average value of two motion vectors as Equation 2 shows. FIG. 8A shows a reference relation in display order of moving pictures as FIG. 7 shows, and FIG. 8B shows an example of an order in which pictures are reordered by coding order in the frame memory 101 shown in FIG. 6. Here, a picture P23 indicates a picture to be coded in the direct mode, and a picture P24 indicates a picture of which motion vector is referred to for the coding. When pictures are reordered as shown in FIG. 8B, since a motion vector which refers to a picture to be coded precedently is directly used, a motion vector MV22 and a time interval TR22 are directly used as a motion vector MV_REF and a time interval TR_REF as shown in Equation 5. Likewise, it is possible to directly use a motion vector which refers to a picture to be coded later. In this case, a motion vector MV21 and a time interval TR21 are directly applied as a motion vector MV_REF and a time interval TR_REF as Equation 6 shows. This make it possible to reduce capacity of a motion vector storing unit in a coding apparatus since each block belonging to a picture P24 of which motion vector is referred to can perform motion compensation by storing only one of two motion vectors.

Note that in this embodiment, the case that a motion vector used in the direct mode is calculated by scaling a referenced motion vector using a time interval between pictures is explained, however, the motion vector may be calculated by multiplying by a constant number. Here, a constant used for the multiplication may be variable when coding or decoding is performed on plural blocks basis or on plural pictures basis.

Note that in Equation 2 (a) or 4 (b), when a motion vector MV_REF is calculated, after calculating the right side of Equation 2 (a) or 4 (b), the motion vector may be rounded to a predetermined motion vector precision (for example, round to a value of 0.5 pixel unit for a motion vector with half pixel precision). Precision of a motion vector is not limited to half pixel precision. In addition, precision of a motion vector can be determined on block basis, picture basis, and sequence basis, for example. Moreover, in Equations, 3 (a), 3 (b) and 4 (a), when motion vectors MV23, MV24 and MV21' are calculated, motion vectors may be rounded to a predetermined precision of a motion vector after calculating the right side of Equations 3 (a), 3 (b) and 4 (a).

Second Embodiment

An overview of a coding process based on FIG. 6 is completely equal to the first embodiment. Here, a detailed operation of bi-prediction in the direct mode is explained using FIG. 9.

Figure 9:
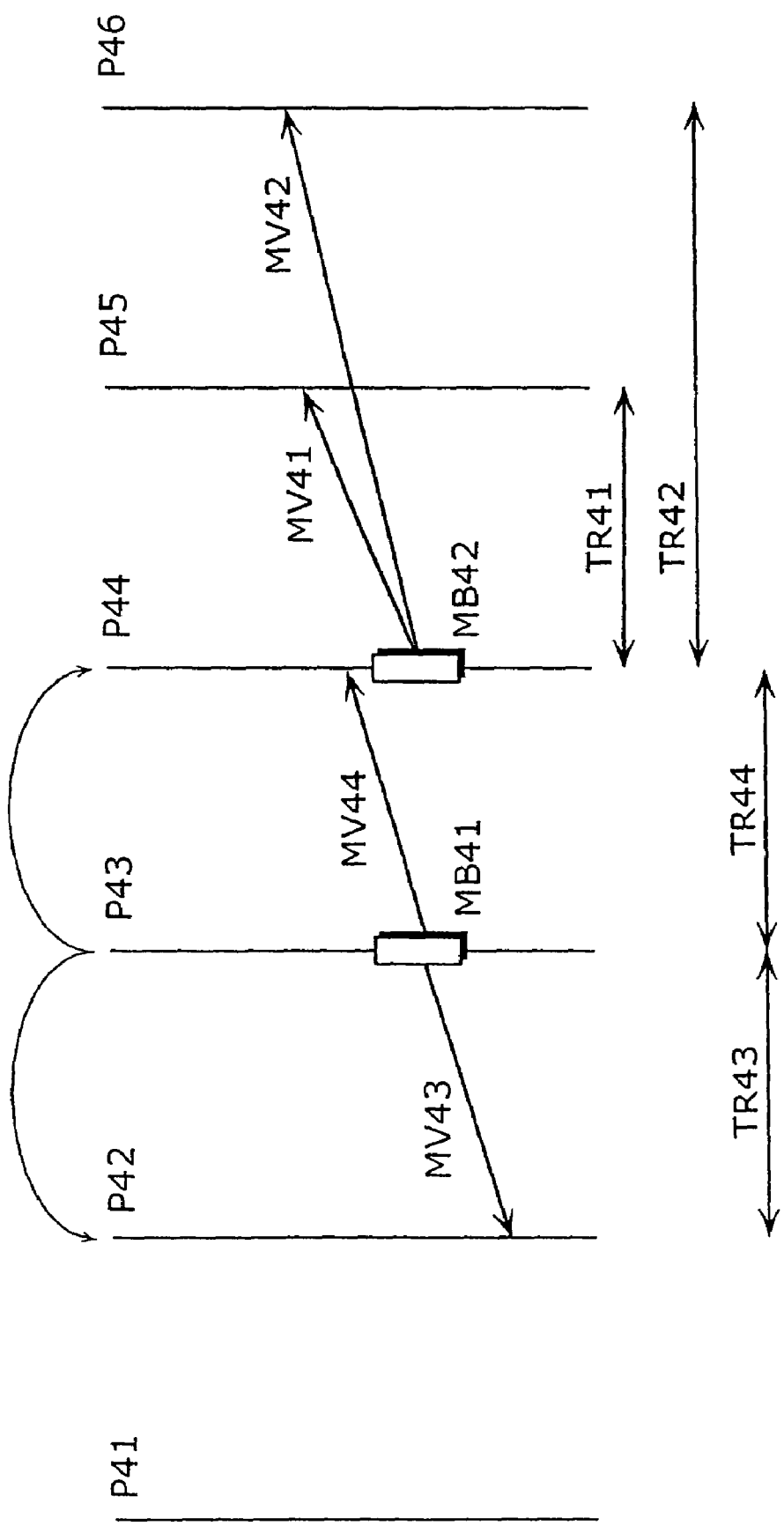
FIG. 9 is a schematic diagram showing an operation when a block of which motion vector is referred to in the direct mode contains two motion vectors which refer to following time in display order.

FIG. 9 shows an operation when a block referred to in order to determine a motion vector in the direct mode contains two motion vectors which refer to two following pictures in display order. A picture P43 is a current picture to be coded, and performs bi-prediction referring to pictures P42 and P44. Assume that a block to be coded is a block MB41, then two required motion vectors are determined using a motion vector of a co-located block MB42 in the coded backward reference picture (the second reference picture specified by the second reference index) P44. Since the block MB42 contains two motion vectors MV45 and MV46 as motion vectors, two required motion vectors MV43 and MV44 cannot be calculated by applying directly scaling similarly to Equation 1. Therefore, as Equation 7 shows, a motion vector MV_REF is determined as a motion vector to be scaled from an average value of two motion vectors of the block MB42, and a time interval TR_REF at that time is determined from an average value likewise. Then motion vectors MV43 and MV44 are calculated by scaling a motion vector MV_REF and a time interval TR_REF based on Equation 8. In this case, a time interval TR45 indicates a time interval between a picture P44 and P45, that is, until a picture which is referred to by a motion vector MV45; and a time interval TR46 indicates a time interval until a picture which is referred to by a motion vector MV46. A time interval TR43 indicates a time interval until a picture which is referred to by a motion vector MV43; and a time interval TR44 indicates a time interval until a picture which is referred to by a motion vector MV44. Time intervals between these pictures can be determined based on, for example, information indicating display time and display order that is added to each picture or difference of information as explained in the first embodiment. Note that a current picture to be coded refers to a next picture in the example of FIG. 9, however, the case referring to a picture which is not next may be treated in the same manner.

$$MV\_REF=(MV45+MV46)/2 \quad \text{Equation 7 (a)}$$

$$TR\_REF=(TR45+TR46)/2 \quad \text{Equation 7 (b)}$$

$$MV43=-MV\_REF/TR\_REF \times TR43 \quad \text{Equation 8 (a)}$$

$$MV44=MV\_REF/TR\_REF \times TR44 \quad \text{Equation 8 (b)}$$

The above embodiment shows the coding method in which an inter picture prediction coding can be performed using the direct mode without contradiction even if a block of which motion vector is referred to in the direct mode belongs to a B picture. In the coding method, when a block of which motion vector is referred to in the direct mode contains plural motion vectors which refer to a following picture in display order, a motion vector is generated using the plural motion vectors, and two motion vectors to be used for actual motion compensation are determined by scaling.

Note that when two motion vectors MV43 and MV44 in FIG. 9 are calculated, it is possible to use Equation 9 instead of Equation 7 as a method for averaging motion vectors MV45 and MV46 and for averaging time intervals TR45 and TR46 in order to calculate the motion vector MV_REF and the time interval TR_REF to be scaled. First, as Equation 9 (a) shows, the motion vector MV46' is calculated by scaling MV46 to equate the time interval with the motion vector MV45. Then the motion vector MV_REF is determined by averaging motion vectors MV46' and MV45. Here, the time interval TR41 is used directly as the time interval TR_REF. Note that the case calculating a motion vector MV45' by scaling the motion vector MV45 instead of calculating the motion vector MV46' by scaling a motion vector MV46 may be treated in the same manner.

$$MV46'=MV46/TR46 \times TR45 \quad \text{Equation 9 (a)}$$

$$MV\_REF=(MV46'+MV45)/2 \quad \text{Equation 9 (b)}$$

$$TR\_REF=TR45 \quad \text{Equation 9 (c)}$$

Note that when two motion vectors MV43 and MV44 in FIG. 9 are calculated, as a motion vector MV_REF and a time interval TR_REF which are scaled, a motion vector MV45 and a time interval TR45, which refer to a picture P45 located temporally closer to a picture P44 of which motion vector is referred to, can be directly used as Equation 10 shows instead of using an average value of two motion vectors as Equation 7 shows. Likewise, as a motion vector MV_REF and a time interval TR_REF, a motion vector MV46 and a time interval TR46, which refer to a picture P46 located temporally farther can be directly used as Equation 11 shows. This method makes it possible to reduce capacity of a motion vector storing unit in a coding apparatus since each block belonging to a picture P44 of which motion vector is referred to can implement motion compensation by storing only one of two motion vectors.

$$MV\_REF=MV45 \quad \text{Equation 10 (a)}$$

$$TR\_REF=TR45 \quad \text{Equation 10 (b)}$$

$$MV\_REF=MV46 \quad \text{Equation 11 (a)}$$

$$TR\_REF=TR46 \quad \text{Equation 11 (b)}$$

Figure 10A:
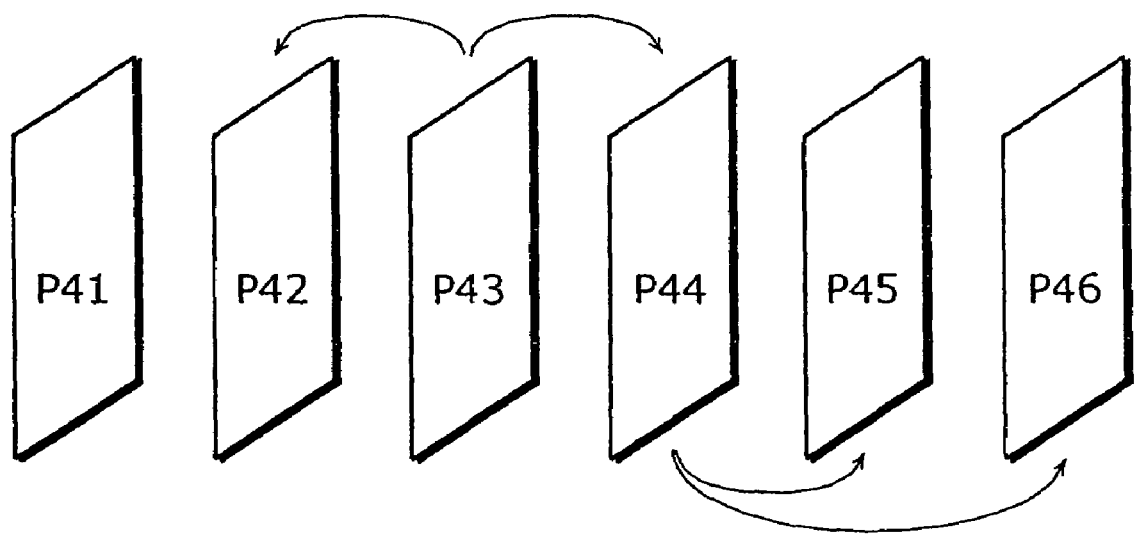
FIG. 10 is a schematic diagram comparing a referential relation of pictures in the display order and the coding order.
Figure 10B:
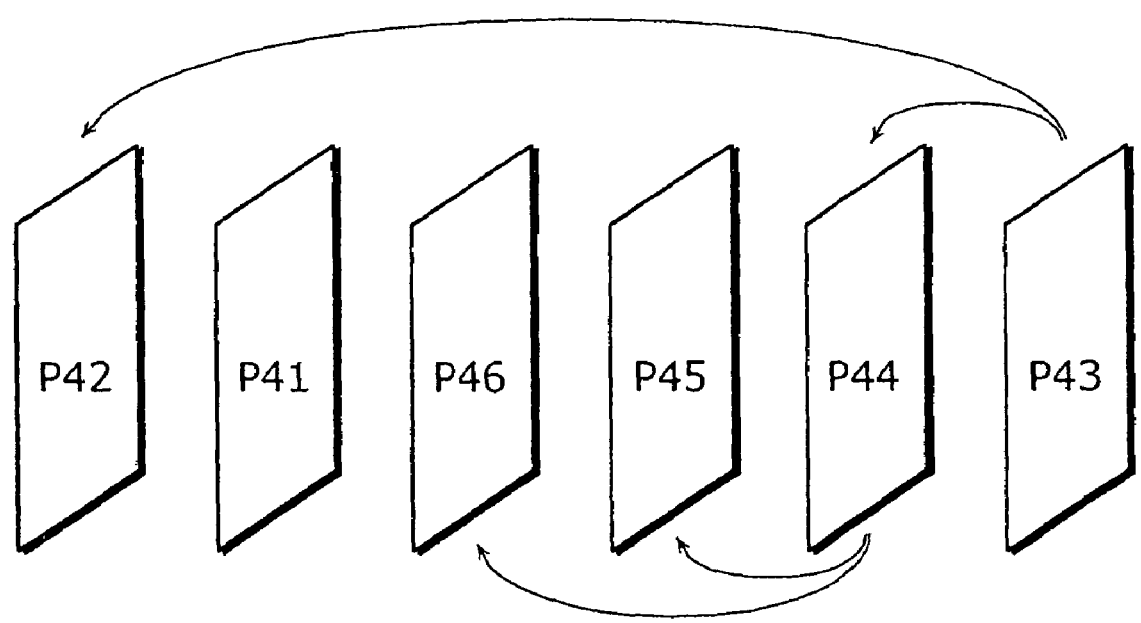

Note that when two motion vectors MV43 and MV44 in FIG. 9 are calculated, as a motion vector MV_REF and a time interval TR_REF which are scaled, a motion vector which refers to a picture to be coded precedently can be directly used instead of using an average value of two motion vectors as Equation 7 shows. FIG. 10A shows a referential relation of pictures in display order of moving pictures as FIG. 9 shows, and FIG. 10B shows an example of an order in which pictures are reordered in coding order in the frame memory 101 shown in FIG. 6. Here, a picture P43 indicates a picture to be coded in the direct mode, and a picture P44 indicates a picture of which motion vector is referred to for the coding. When pictures are reordered as shown in FIG. 10B, since a motion vector which refers to a picture to be coded precedently is directly used, a motion vector MV46 and a time interval TR46 are directly used as a motion vector MV_REF and a time interval TR_REF as shown in Equation 11. Likewise, it is possible to directly use a motion vector which refers to a picture to be coded later. In this case, a motion vector MV45 and a time interval TR45 are directly applied as a motion vector MV_REF and a time interval TR_REF. This method makes it possible to reduce capacity of a motion vector storing unit in a coding apparatus since each block belonging to a picture P44 of which motion vector is referred to can perform motion compensation by storing only one of two motion vectors.

Note that when a picture which is referred to in order to determine a motion vector in the direct mode contains two motion vectors which refer to two following pictures in display order, it is possible to perform motion compensation assuming that two required motion vectors MV43 and MV44 are "0". This method makes it possible to reduce capacity of a motion vector storing unit in a decoding apparatus, and further makes it possible to omit a process of calculating a motion vector, since each block belonging to a picture P44 of which motion vector is referred to does not have to store a motion vector.

Note that when a picture which is referred to in order to determine a motion vector in the direct mode contains two motion vectors which refer to two following pictures in display order, it is possible to inhibit referring to a motion vector and to apply only a prediction coding other than the direct mode. When following two pictures in display order are referred to as a picture P44 shown in FIG. 9, it is conceivable that correlation with a preceding picture in display order is low, because it is possible to generate a more precise predictive picture by inhibiting the direct mode and selecting other predicting method.

Note that in this embodiment, the case that a motion vector used in the direct mode is calculated by scaling a referenced motion vector using a time interval between pictures is explained, however, the motion vector may be calculated by multiplying by a constant number. Here, a constant used for the multiplication may be variable when coding or decoding is performed on plural blocks basis or on plural pictures basis.

Note that in Equation 7 (a) or 9 (b), when a motion vector MV_REF is calculated, after calculating the right side of Equation 7 (a) or 9 (b), the motion vector may be rounded to a predetermined motion vector precision. Precision of a motion vector includes half pixel precision, one-third pixel precision and quarter pixel precision or the like. In addition, the precision of a motion vector can be determined, for example, on block basis, picture basis, and sequence basis. Moreover, in Equations, 8 (a), 8 (b) and 9 (a), when motion vectors MV43, MV44 and MV46' are calculated, motion vectors may be rounded to a predetermined precision of a motion vector after calculating the right side of Equations 8 (a), 8 (b) and 9 (a).

Third Embodiment

Figure 11:
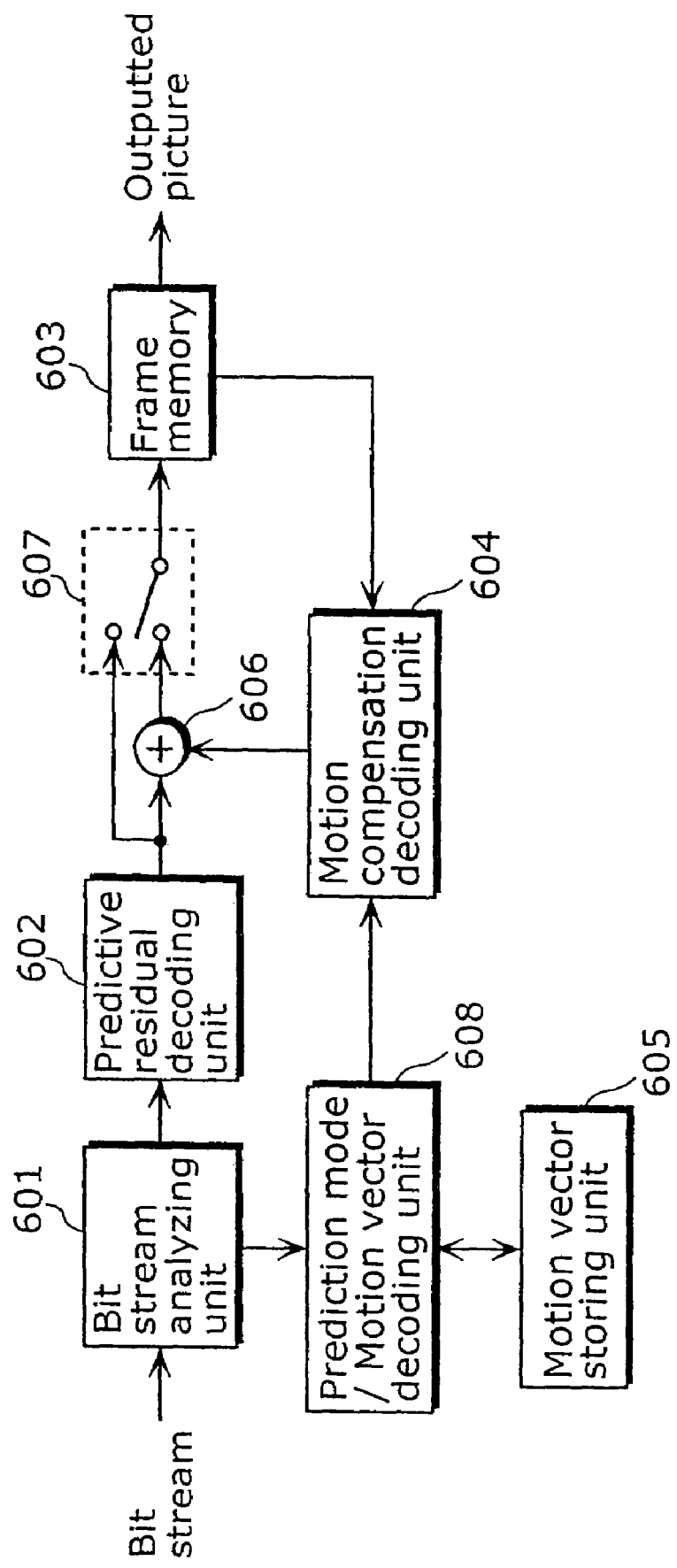
FIG. 11 is a block diagram showing an operation of decoding according to the fifth and sixth embodiments of the present invention.

A moving picture decoding method according to the third embodiment of the present invention is explained using the block diagram shown in FIG. 11. However, it is assumed that the bit stream generated in the picture coding method of the first embodiment is inputted.

First, various information such as a prediction mode, motion vector information and predictive residual coding data is extracted from inputted bit stream by a bit stream analyzer 601.

The prediction mode and the motion vector information are outputted to a prediction mode/motion vector decoding unit 608 and a predictive residual coding data is outputted to a predictive residual decoding unit 602. The prediction mode/motion compensation decoding unit 608 decodes the prediction mode and a motion vector used in the prediction mode. When decoding the motion vector, a decoded motion vector stored in the motion vector storing unit 605 is used. Decoded prediction mode and motion vector are outputted to a motion compensation decoding unit 604. In addition, decoded motion vector is stored in the motion vector storing unit 605 in order to be used for decoding motion vectors of following blocks. In the motion compensation decoding unit 604, a predictive picture is generated based on the inputted prediction mode and motion vector information using a decoded picture stored in a frame memory 603 as a reference picture. A decoded picture is generated by inputting the above generated predictive picture into an add operating unit 606 and adding the inputted picture to the predictive residual picture generated in a predictive residual decoding unit 602. The above embodiment shows an operation for an inter-picture-prediction-bit stream, however, a switch 607 switches to a decoding process for an intra-picture-prediction-bit stream.

A summary of a decoding flow is shown above, however, a detailed process in the motion compensation decoding unit 604 is explained below.

Motion vector information is added on a block basis or an area (a divided block) basis. By using decoded pictures preceding and following a current picture to be coded in display order as reference pictures, a predictive picture to perform motion compensation from the pictures is generated.

A direct mode is one of bi-predictions which perform inter picture prediction coding referring to each of pictures preceding and following in display order. In the direct mode, since a current block to be coded inputs a bit stream which does not contain a motion vector directly, two motion vectors for actual motion compensation are calculated referring to a motion vector of a co-located block in a decoded picture close in display order, and a predictive picture is generated.

FIG. 7 shows an operation when a decoded picture referred to in order to determine a motion vector in the direct mode contains two motion vectors which refer to preceding two pictures in display order. A picture P23 is a current picture to be decoded, and performs bi-prediction referring to pictures P22 and P24. When it is assumed that a block to be decoded is a block MB21, two required motion vectors are determined using a motion vector of a co-located block MB22 in the decoded backward reference picture (the second reference picture specified by the second reference index) P24. Since the block MB22 contains two motion vectors MV21 and MV22 as the motion vectors, two required motion vectors MV23 and MV24 cannot be calculated by applying the direct scaling similarly to Equation 1. Therefore, as Equation 2, a motion vector MV_REF is determined as a motion vector to be scaled from an average value of two motion vectors of the block MB22, and a time interval TR_REF at that time is determined from an average value likewise. Then motion vectors MV23 and MV24 are calculated by scaling a motion vector MV_REF and a time interval TR_REF based on Equation 3. In this case, a time interval TR21 indicates a time interval between a picture P24 and P21, that is, until a picture which is referred to by a motion vector MV21, and a time interval TR22 indicates a time interval until a picture which is referred to by a motion vector MV22. A time interval TR23 indicates a time interval until a picture which is referred to by a motion vector MV23; and a time interval TR24 indicates a time interval until a picture which is referred to by a motion vector MV24. Time intervals between these pictures can be determined based on, for example, information indicating display time and display order added to each picture or difference of information. Note that a current picture to be coded refers to a next picture in the example of FIG. 7, however, the case referring to a picture which is not next may be treated in the same manner.

The above embodiment shows the decoding method in which an inter picture prediction decoding can be performed using the direct mode without contradiction even if a block of which motion vector is referred to belongs to a B picture. In the decoding method, when a block of which motion vector is referred to in the direct mode contains plural motion vectors which refer to a preceding picture, a motion vector is generated using the plural motion vectors, and two motion vectors to be used for actual motion compensation are determined by scaling.

Note that when two motion vectors MV23 and MV24 in FIG. 7 are calculated, it is possible to use Equation 4 instead of Equation 2 as a method for averaging motion vectors MV21 and MV22 and for averaging time intervals TR21 and TR22 in order to calculate the motion vector MV_REF and the time interval TR_REF to be scaled. First, as Equation 4 (a) shows, the motion vector MV21' is calculated by scaling MV21 to equate the time interval with the motion vector MV22. Then the motion vector MV_REF is determined by averaging motion vectors MV21' and MV22. Here, the time interval TR22 is used directly as the time interval TR_REF. Note that the case calculating a motion vector MV22' by scaling the motion vector MV22 instead of calculating the motion vector MV21' by scaling a motion vector MV21 may be treated in the same manner.

Note that when two motion vectors MV23 and MV24 in FIG. 7 are calculated, as a motion vector MV_REF and a time interval TR_REF which are scaled, a motion vector MV22 and a time interval TR22, which refer to a picture P22 located temporally closer to a picture P24 of which motion vector is referred to, can be directly used as Equation 5 shows instead of using an average value of two motion vectors as Equation 2 shows. Likewise, as a motion vector MV_REF and a time interval TR_REF, a motion vector MV21 and a time interval TR21, which refer to a picture P21 located temporally farther can be directly used as Equation 6 shows. This method makes it possible to reduce capacity of a motion vector storing unit in a coding apparatus since each block belonging to a picture P24 of which motion vector is referred to can actualize motion compensation by storing only one of two motion vectors.

Note that when two motion vectors MV23 and MV24 in FIG. 7 are calculated, as a motion vector MV_REF and a time interval TR_REF which are scaled, a motion vector which refers to a picture to be decoded precedently can be directly used, instead of using an average value of two motion vectors as Equation 2 shows. FIG. 8A shows a referential relation in display order of moving pictures as FIG. 7 shows, and FIG. 8B shows an order in which a bit stream is inputted, that is, a decoding order. Here, a picture P23 indicates a picture decoded in the direct mode, and a picture P24 indicates a picture of which motion vector is referred to for the decoding. When considering an order as shown in FIG. 8B, since a motion vector which refers to a picture to be decoded precedently is directly used, a motion vector MV22 and a time interval TR22 are directly applied as a motion vector MV_REF and a time interval TR_REF as Equation 5 shows. Likewise, it is possible to directly use a motion vector which refers to a picture to be decoded later. In this case, a motion vector MV21 and a time interval TR21 are directly applied as a motion vector MV_REF and a time interval TR_REF as Equation 6 shows. This makes it possible to reduce capacity of a motion vector storing unit in a decoding apparatus since each block belonging to a picture P24 of which motion vector is referred to can perform motion compensation by storing only one of two motion vectors.

Note that in this embodiment, the case that a motion vector used in the direct mode is calculated by scaling a referenced motion vector using a time interval between pictures is explained, however, the motion vector may be calculated by multiplying by a constant number. Here, a constant used for the multiplication may be variable when coding or decoding is performed on plural blocks basis or on plural pictures basis.

Fourth Embodiment

An overview of a coding process based on FIG. 11 is completely equal to the third embodiment. Here, a detailed operation of bi-prediction in the direct mode is explained using FIG. 9. However, it is assumed that the bit stream generated in the picture coding method of the first embodiment is inputted.

FIG. 9 shows an operation when a picture referred to in order to determine a motion vector in the direct mode contains two motion vectors which refer to following two pictures in display order. A picture P43 is a current picture to be decoded, and performs bi-prediction referring to pictures P42 and P44. When it is assumed that a block to be decoded is a block MB41, two required motion vectors are determined using a motion vector of a co-located block MB42 in the decoded backward reference picture (the second reference picture specified by the second reference index) P44. Since the block MB42 contains two motion vectors MV45 and MV46 as motion vectors, two motion vectors MV43 and MV44 cannot be calculated by directly scaling similarly to Equation 1. Therefore, as Equation 7, a motion vector MV_REF is determined as a motion vector to be scaled from an average value of two motion vectors of the block MB42, and a time interval TR_REF at that time is determined from an average value likewise. Then motion vectors MV43 and MV44 are calculated by scaling a motion vector MV_REF and a time interval TR_REF based on Equation 8. In this case, a time interval TR45 indicates a time interval between a picture P44 and P45, that is, until a picture which is referred to by a motion vector MV45; and a time interval TR46 indicates a time interval between until a picture which is referred to by a motion vector MV46. A time interval TR43 indicates a time interval until a picture which is referred to by a motion vector MV43; and a time interval TR44 indicates a time interval until a picture which is referred to by a motion vector MV44. Note that a current picture to be decoded refers to a next picture in the example of FIG. 9, however, the case referring to a picture which is not adjacent may be treated in the same manner.

The above embodiment shows the decoding method in which an inter picture prediction decoding can be performed using the direct mode without contradiction even if a block of which motion vector is referred to in the direct mode belongs to a B picture. In the decoding method, when a block of which motion vector is referred to in the direct mode contains plural motion vectors which refer to a following picture in display order, a motion vector is generated using the plural motion vectors, and two motion vectors to be used for actual motion compensation are determined by scaling.

Note that when two motion vectors MV43 and MV44 in FIG. 9 are calculated, it is possible to use Equation 7 instead of Equation 9 as a method for averaging motion vectors MV45 and MV46 and for averaging time intervals TR45 and TR46 in order to calculate the motion vector MV_REF and the time interval TR_REF to be scaled.

First, as Equation 9 (a) shows, the motion vector MV46' is calculated by scaling MV46 to equate the time interval with the motion vector MV45. Then the motion vector MV_REF is determined by averaging motion vectors MV46' and MV45. Here, the time interval TR45 is used directly as the time interval TR_RF. Note that the case calculating a motion vector MV45' by scaling the motion vector MV45 instead of calculating the motion vector MV46' by scaling a motion vector MV46 may be treated in the same manner.

Note that when two motion vectors MV43 and MV44 in FIG. 9 are calculated, as a motion vector MV_REF and a time interval TR_REF which are scaled, a motion vector MV45 and a time interval TR45, which refer to a picture P45 located temporally closer to a picture P44 of which motion vector is referred to, can be directly used, as Equation 10 shows, instead of using an average value of two motion vectors as Equation 7 shows. Likewise, as a motion vector MV_REF and a time interval TR_REF, a motion vector MV46 and a time interval TR46, which refer to a picture P46 located temporally farther can be directly used as Equation 11 shows. This method makes it possible to reduce capacity of a motion vector storing unit in a decoding apparatus since each block belonging to a picture P44 of which motion vector is referred to can implement motion compensation by storing only one of two motion vectors.

Note that when two motion vectors MV43 and MV44 in FIG. 9 are calculated, as a motion vector MV_REF and a time interval TR_REF which are scaled, a motion vector which refers to a picture to be decoded precedently can be directly used, instead of using an average value of two motion vectors as Equation 7 shows. FIG. 10A shows a referential relation in display order of moving pictures as FIG. 9 shows and FIG. 10B shows an order in which a bit stream is inputted, that is, a decoding order. Here, a picture P43 indicates a picture which is decoded in the direct mode, and a picture P44 indicates a picture of which motion vector is referred to for the decoding. When considering an order as shown in FIG. 10B, since a motion vector which refers to a picture to be decoded precedently is directly used, a motion vector MV46 and a time interval TR46 are directly applied as a motion vector MV_REF and a time interval TR_REF as Equation 10 shows. This method makes it possible to reduce capacity of a motion vector storing unit in a decoding apparatus since each block belonging to a picture P44 of which motion vector is referred to can perform motion compensation by storing only one of two motion vectors.

Note that when a block which is referred to in order to determine a motion vector in the direct mode contains two motion vectors which refer to two following pictures in display order, it is possible to perform motion compensation assuming that two required motion vectors MV43 and MV44 are "0". This method makes it possible to reduce capacity of a motion vector storing unit in a decoding apparatus and further makes it possible to omit a process of calculating a motion vector since each block belonging to a picture P44 of which motion vector is referred to does not have to store a motion vector.

Note that in this embodiment, the case that a motion vector used in the direct mode is calculated by scaling a referenced motion vector using a time interval between pictures is explained, however, the motion vector may be calculated by multiplying by a constant number. Here, a constant used for the multiplication may be variable when coding or decoding is performed on plural blocks basis or on plural pictures basis.

Fifth Embodiment

Coding/decoding method can be actualized not only by the coding/decoding method shown in the above first embodiment through fourth embodiment, but also by a motion vector calculation method shown below.

Figure 12:
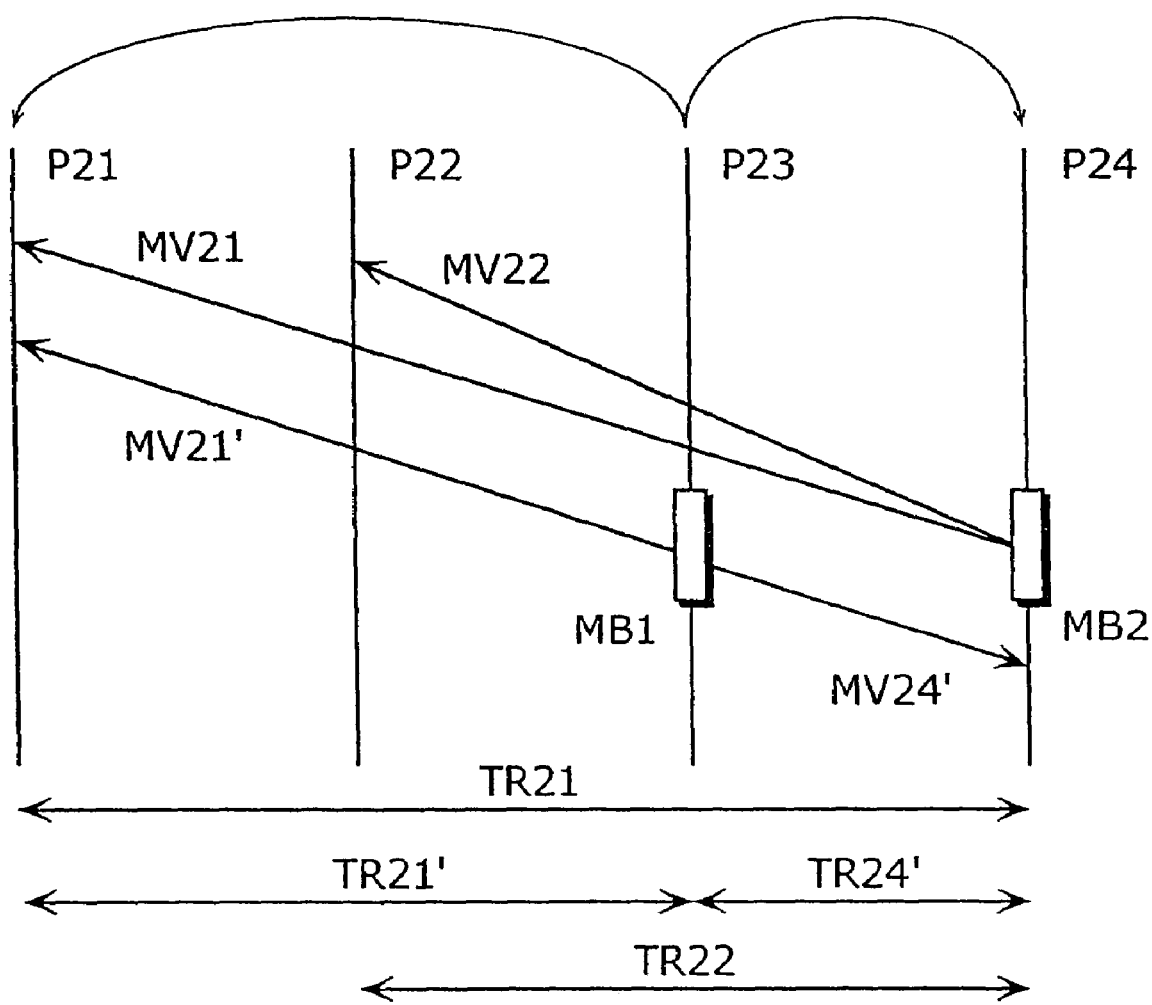
FIG. 12 is a schematic diagram showing an operation when a block of which motion vector is referred to in the direct mode contains two motion vectors which refer to preceding time in display order.

FIG. 12 shows an operation when a coded or decoded block referred to in order to calculate a motion vector in the direct mode contains two motion vectors which refer to preceding two pictures in display order. A picture P23 is a current picture to be coded or decoded. When it is assumed that a block to be coded or decoded is a block MB1, two required motion vectors are determined using a motion vector of a co-located block MB2 in the coded or decoded backward reference picture (the second reference picture specified by the second reference index) P24. Note that in FIG. 12, the block MB1 is a current block of process, the blocks MB1 and MB2 are co-located blocks in other pictures, and the motion vectors MV21 is first forward motion vector that the reference picture is specified by first reference index and MV22 is forward motion vector that the reference picture is specified by second reference index, and these motion vectors are used for coding or decoding the block MB2 and refer to pictures P21 and P22 respectively. The pictures P21, P22 and P24 are coded or decoded pictures. A time interval TR21 is a time interval between the picture P21 and the picture P24; a time interval TR22 is a time interval between the picture P22 and the picture P24; a time interval TR21' is a time interval between P21 and the picture P23; and a time interval TR 24' is a time interval between the picture P23 and the picture P24.

In the motion vector calculation method, as shown in FIG. 12, only the forward motion vector (the first motion vector) MV21 coded or decoded precedently is used out of motion vectors of the block MB2 in the reference picture P24, and a motion vectors MV21' and MV24' of the block MB1 are calculated by following equations.

$$MV21'=MV21 \times TR21'/TR21$$

$$MV24'=-MV21 \times TR24'/TR21$$

Then bi-prediction is performed from the pictures P21 and P24 using the motion vectors MV21' and MV24'. Note that a motion vector of the block MB1 may be calculated using only a motion vector (the second motion vector) MV22 coded or decoded later out of motion vectors of the block MB2 in the reference picture P24, instead of calculating motion vectors MV21' and MV24' of the block MB1 using only the motion vector MV21. Moreover, as shown in the first embodiment through the fourth embodiment, a motion vector of the block MB1 may be determined using both the motion vectors MV21 and MV22. When selecting one of the motion vectors MV21 and MV22, a motion vector of a block coded or decoded precedently may be selected, and it may be set arbitrarily in a coding apparatus and a decoding apparatus. Motion compensation is possible either when the picture P21 is in the short term reference picture buffer or in the long term reference picture buffer. Explanation will be given for the short term reference picture buffer and the long term reference picture buffer later.

Figure 13:
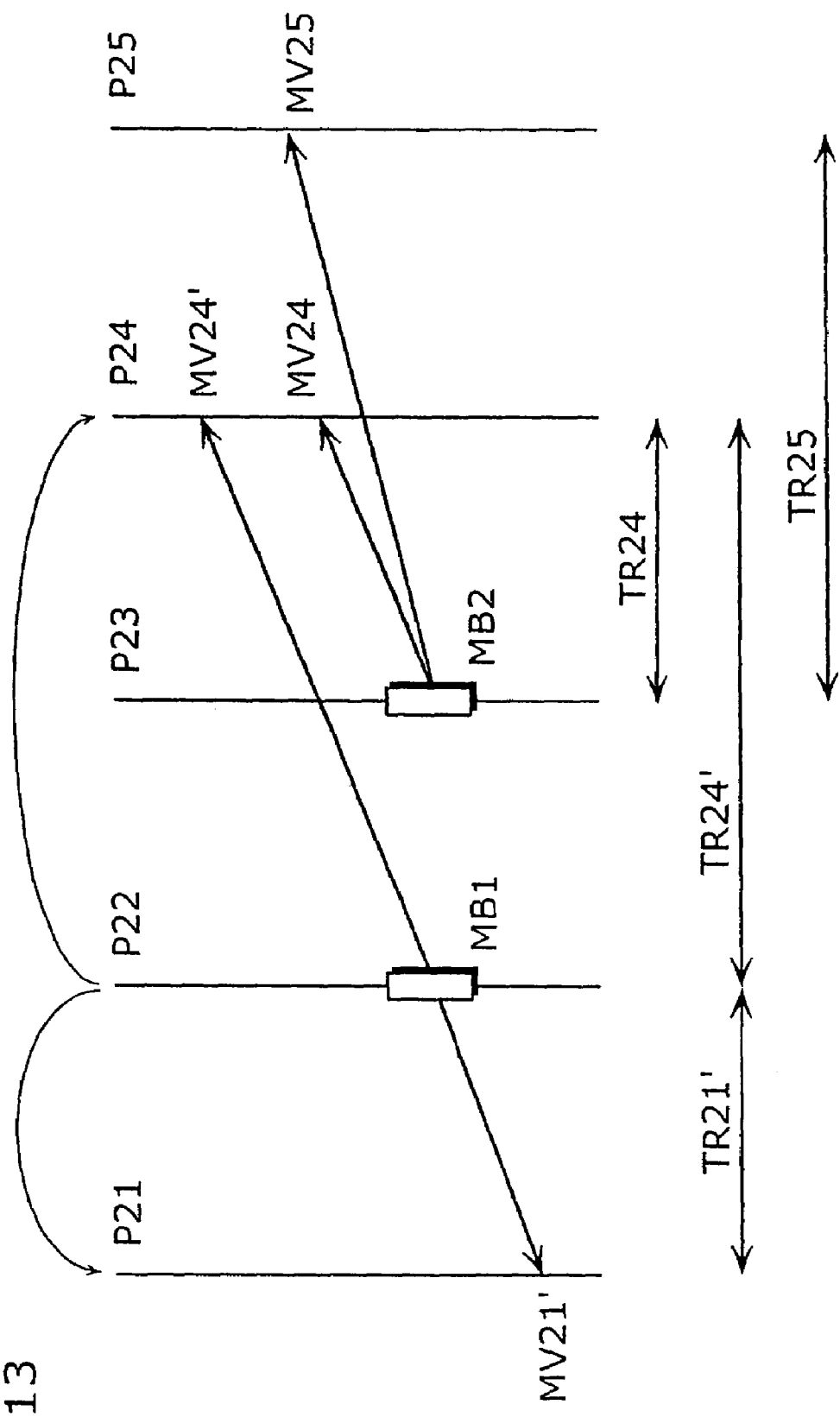
FIG. 13 is a schematic diagram to show an operation when a block of which motion vector is referred to in the direct mode contains two motion vectors which refer to following time in display order.

FIG. 13 shows an operation when a coded or decoded block referred to in order to calculate a motion vector in the direct mode contains two motion vectors which refer to following two pictures in display order. A picture P22 is a current picture to be coded or decoded. When it is assumed that a block to be coded or decoded is a block MB1, two required motion vectors are determined using a motion vector of a co-located block MB2 in the coded or decoded backward reference picture (the second reference picture) P23. Note that in FIG. 13 the block MB1 is a current block of processing, the blocks MB1 and MB2 are co-located blocks in pictures, and the motion vectors MV24 and MV25 are backward motion vectors used for coding or decoding the block MB2 and refer to pictures P21 and P22, respectively. The pictures P21, P23, P24 and P25 are coded or decoded pictures. A time interval TR24 is a time interval between the picture P23 and the picture P24, a time interval TR25 is a time interval between the picture P23 and the picture P25, a time interval TR24' is a time interval between P22 and the picture P24, and a time interval TR 21' is a time interval between the picture P21 and the picture P22.

In a motion vector calculation method, as shown in FIG. 13, only the backward motion vector MV24, which refers to the picture P24, of the block MB2 in the reference picture P23 is used, and a motion vectors MV21' and MV24' are calculated by following equations $$MV21'=-MV24 \times TR21'/TR24$$

$$MV24'=MV24 \times TR24'/TR24$$

Then bi-prediction is performed from the pictures P21 and P24 using the motion vectors MV21' and MV24'.

Figure 14:
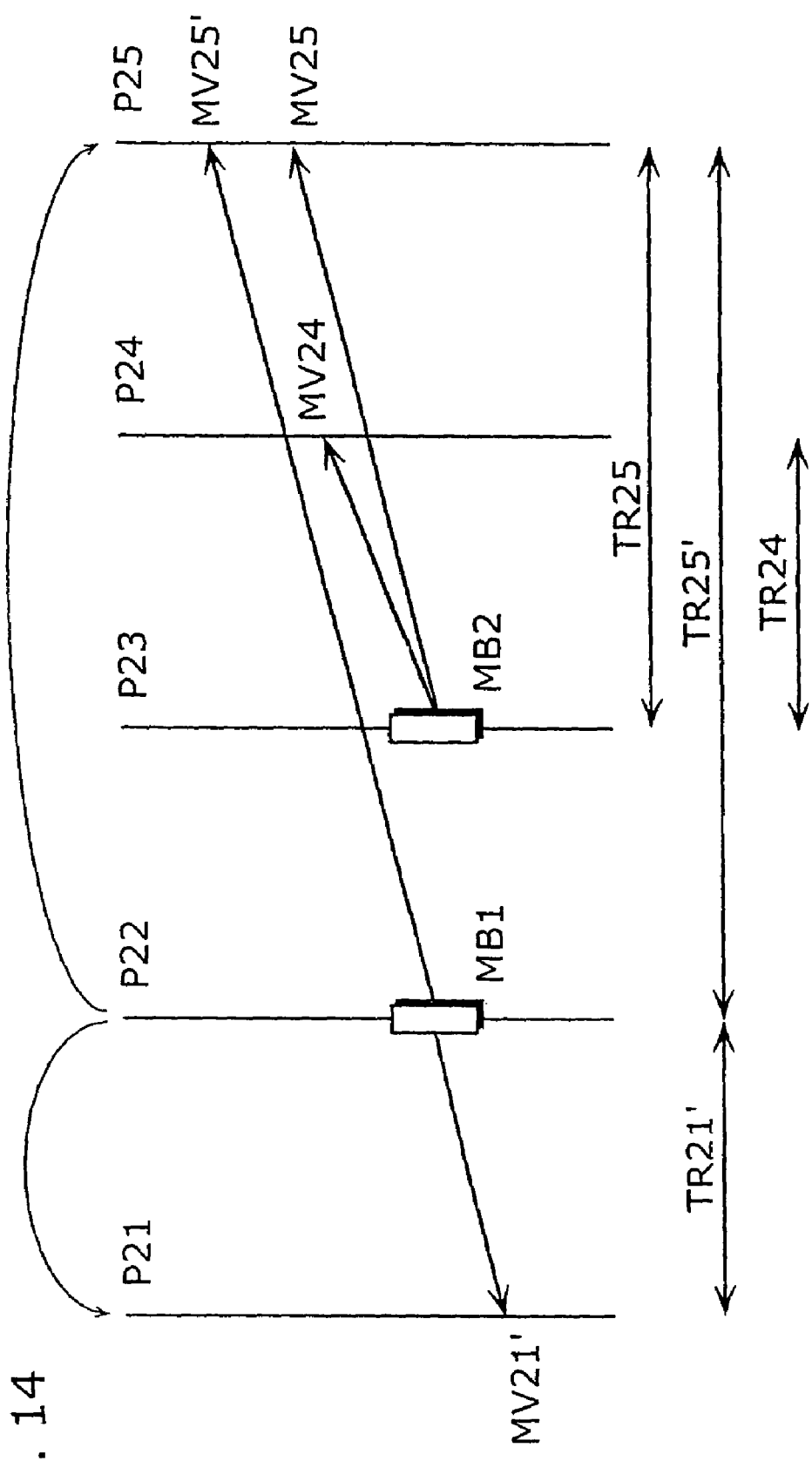
FIG. 14 is a schematic diagram to show an operation when a block of which motion vector is referred to in the direct mode contains two motion vectors which refer to following time in display order.

Note that, as shown in FIG. 14, when only a backward motion vector MV 25, which points at the picture P25, of the block MB2 in the reference picture P23 is used, motion vectors MV21' and MV24' are calculated by following equations. Here, a time interval TR24 is a time interval between the picture P23 and the picture P24; a time interval TR25 is a time interval between the picture P23 and the picture P25; a time interval TR25' is a time interval between the picture P22 and the picture P25; and a time interval TR21' is a time interval between the picture P21 and the picture P22.

$$MV21'=-MV25 \times TR21'/TR25$$

$$MV25'=MV25 \times TR25'/TR25$$

Then bi-prediction is performed from the pictures P21 and P24 using the motion vectors MV21' and MV24'.

Figure 15:
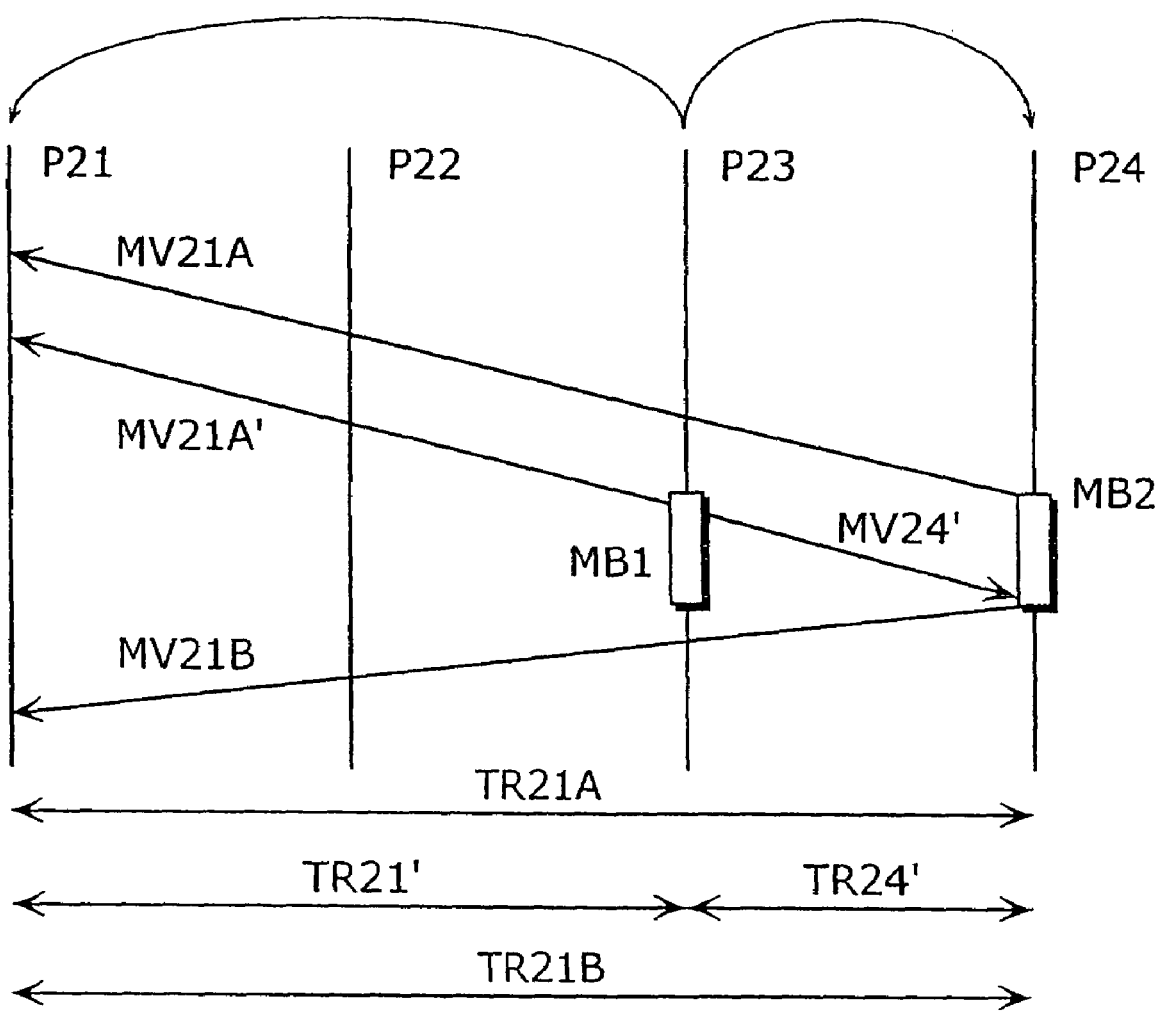
FIG. 15 is a schematic diagram to show an operation when a block of which motion vector is referred to in the direct mode contains two motion vectors which refer to preceding time in display order.

FIG. 15 shows an operation when a coded or decoded block referred to in order to calculate a motion vector in the direct mode contains two motion vectors which refer to a preceding picture in display order. A picture P23 is a current picture to be coded or decoded. When it is assumed that a block to be coded or decoded is a block MB1, two required motion vectors are determined using a motion vector of a co-located block MB2 in the coded or decoded backward reference picture (the second reference picture specified by the second reference index) P24. Note that in FIG. 15, the block MB1 is a current block of processing, the blocks MB1 and MB2 are co-located blocks in other pictures. The motion vectors MV21A and MV21B are forward motion vectors used for coding or decoding the block MB2, and both refer to the picture P21. The pictures P21, P22 and P24 are coded or decoded pictures. Time intervals TR21A and TR21B are a time interval between the picture P21 and the picture P24; a time interval TR21' is a time interval between the picture P21 and the picture P23; and a time interval TR24' is a time interval between P23 and the picture P24.

In a motion vector calculation method, as shown in FIG. 15, only the forward motion vector MV21A, which points at the picture P21, of the block MB2 in the reference picture P24 is used, and a motion vectors MV21A' and MV24' are calculated by following equations.

$$MV21A'=MV21A \times TR21'/TR21A$$

$$MV24'=-MV21A \times TR24'/TR21A$$

Then bi-prediction is performed from the pictures P21 and P24 using the motion vectors MV21A' and MV24'.

Note that a motion vector of the block MB1 may be calculated using only a forward motion vector MV21B, which points at the picture P21, of the block MB2 in the reference picture P24. Moreover, as shown in the first embodiment through the fourth embodiment, a motion vector of the block MB1 may be determined using both forward motion vectors MV21A and MV21B. When selecting one of the forward motion vectors MV21A and MV21B, a motion vector of a block coded or decoded precedently (described earlier in a bit stream) may be selected, and it may be set arbitrarily by a coding apparatus and a decoding apparatus. Here, the motion vector coded or decoded precedently means the first motion vector. Motion compensation is possible either when the picture P21 in the short term reference picture buffer or in the long term reference picture buffer. Explanation will be given for the short term reference picture buffer and the long term reference picture buffer later.

Note that in this embodiment, the case that a motion vector used in the direct mode is calculated by scaling a referenced motion vector using a time interval between pictures is explained, however, the motion vector may be calculated by multiplying by a constant number. Here, a constant used for the multiplication may be variable when coding or decoding is performed on plural blocks basis or on plural pictures basis.

Note that, in the above-mentioned equations to calculate motion vectors MV21', MV24', MV25' and MV21A', motion vectors may be rounded to a predetermined precision of a motion vector after calculating the right side of the equations. Precision of motion vector includes half pixel precision, one-third pixel precision and quarter pixel precision or the like. In addition, precision of a motion vector can be determined, for example, on block basis, picture basis, and sequence basis.

Sixth Embodiment

Figure 16:
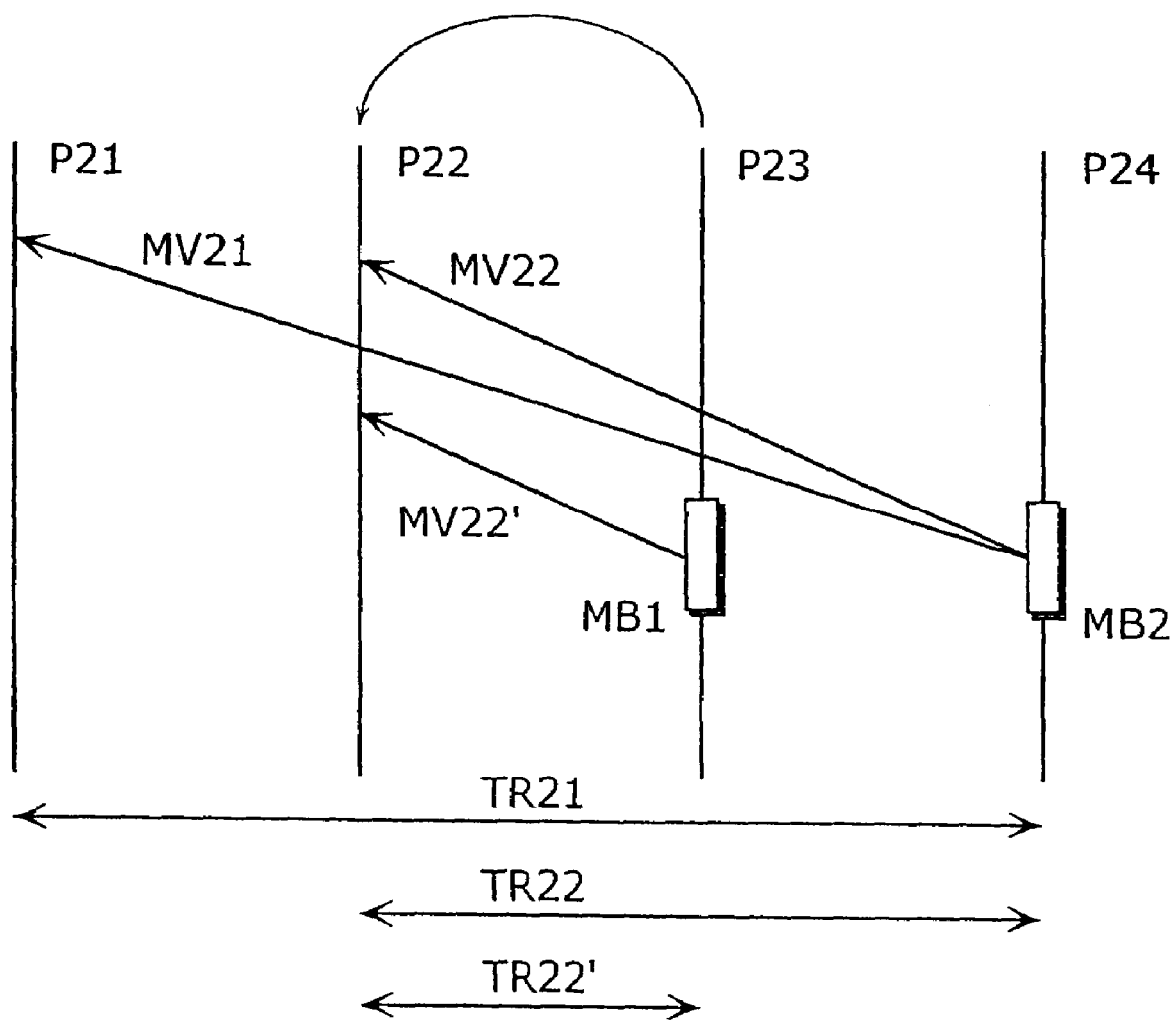
FIG. 16 is a schematic diagram to show an operation when a block of which motion vector is referred to in the direct mode contains two motion vectors which refer to preceding time in display order.

In this sixth embodiment, a method for calculating a current motion vector by scaling only one of two forward motion vectors, which refer to two pictures preceding in display order, is explained using FIGS. 14, 15 and 16. In this case, a reference picture used to in order to determine a current motion vector in the direct mode contains the two forward motion vectors. Note that the block MB1 is a current block to be processed; the blocks MB1 and MB2 are co-located blocks in other pictures; and the motion vectors MV21 and MV22 are forward motion vectors used for coding or decoding the block MB2, and refer to pictures P21 and P22, respectively. The pictures P21, P22 and P24 are coded or decoded pictures.

A time interval TR21 is a time interval between the picture P21 and the picture P24; a time interval TR22 is a time interval between the picture P22 and the picture P24; a time interval TR21' is a time interval between P21 and the picture P23; and a time interval TR22' is a time interval between P22 and the picture P23.

As the first method, when a block MB2 in a reference picture P24 contains a forward motion vector MV21 referring to a picture P22 and a forward motion vector MV22 referring to a picture P23 as shown in FIG. 16, a motion vector MV22' of the block MB1 is calculated using only a motion vector MV22 which refers to a picture P22 close to a current picture P23 in display order by a following equation.

$$MV22'=MV22 \times TR22'/TR22$$

Then motion compensation is performed from the picture P22 using the motion vector MV22'.

Figure 17:
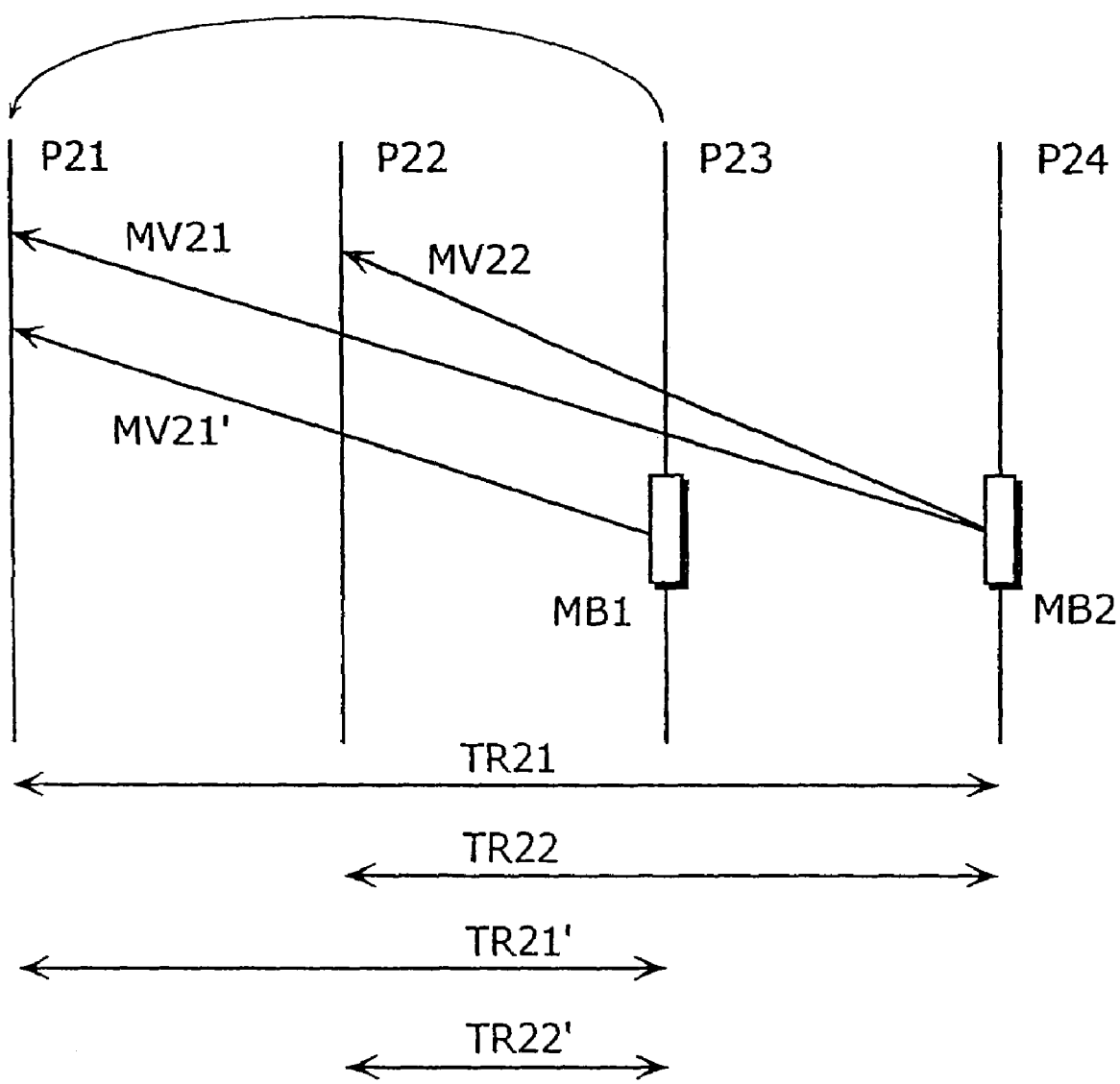
FIG. 17 is a schematic diagram to show an operation when a block of which motion vector is referred to in the direct mode contains two motion vectors which refer to preceding time in display order.

As the second method, when a block MB2 of a reference picture P24 contains a forward motion vector MV21 referring to a picture P21 and a forward motion vector MV22 referring to a picture P22 as shown in FIG. 17, a motion vector MV21' of the block MB1 is calculated using only a motion vector MV21 which refers to a picture P21 being far from a current picture P23 in display order by a following equation.

$$MV21'=MV21 \times TR21'/TR21$$

Then motion compensation is performed from the picture P21 using the motion vector MV21'.

The first and the second methods make it possible to reduce capacity of a motion vector storing unit since the block MB2 belonging to a picture P24 of which motion vector is referred to can actualize motion compensation by storing only one of two motion vectors.

Note that motion compensation can be performed from a picture P22 close in display order, using the forward motion vector MV21 same as the first embodiment. A motion vector MVN (not shown in this figure) used for the motion compensation is calculated by a following equation.

$$MVN=MV21 \times TR22'/TR21$$

Figure 18:
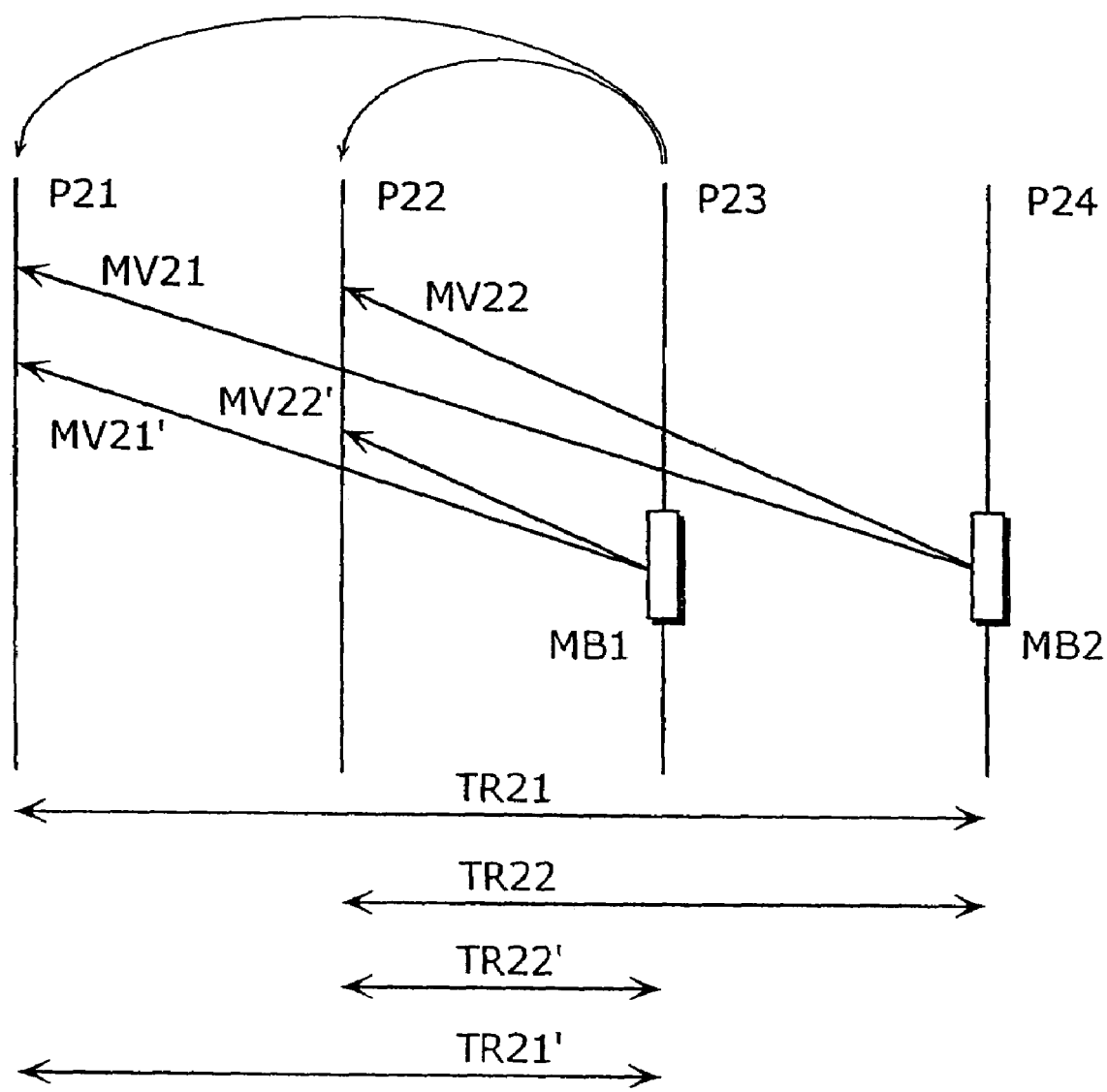
FIG. 18 is a schematic diagram to show an operation when a block of which motion vector is referred to in the direct mode contains two motion vectors which refer to preceding time in display order.

As the third method, as shown in FIG. 18, a motion compensation block is obtained from the pictures P21 and P22 respectively using the motion vectors MV21' and MV22' calculated above, and an average picture is used as an interpolation picture in motion compensation.

The third method increases calculated amount, however, improves precision of motion compensation.

Moreover, it is possible to obtain a motion compensation block from the picture P22 using the above-mentioned motion vectors MVN and MV22', and to use an average picture as an interpolation picture in motion compensation.

Note that in this embodiment, the case that a motion vector used in the direct mode is calculated by scaling a referenced motion vector using a time interval between pictures is explained, however, the motion vector may be calculated by multiplying a reference motion vector by a constant number. Here, a constant used for the multiplication may be variable when coding or decoding is performed on plural blocks basis or on plural pictures basis.

Note that, in the above-mentioned equations to calculate the motion vectors MV21', MV22' and MVN, the motion vectors may be rounded to a predetermined precision of a motion vector after calculating the right side of the equations. Precision of motion vector includes half pixel precision, one-third pixel precision and quarter pixel precision or the like. In addition, precision of a motion vector can be determined, for example, on block basis, picture basis, and sequence basis.

Seventh Embodiment

In the above sixth embodiment, the case when a reference picture used to determine a motion vector of a current block to be coded or decoded contains two forward motion vectors in the direct mode is described. The two forward motion vectors refer to two preceding pictures in display order. However, when the reference picture contains two backward motion vectors which refer to two following pictures in display order, it is possible to calculate a current motion vector by scaling only one of two backward motion vectors (the second motion vectors of which reference picture is specified by the second reference indices), likewise. Explanation will be given using FIGS. 17~20 below. Note that the block MB1 is a current block of process, the blocks MB1 and MB2 are co-located blocks in other pictures, and the motion vectors MV24 and MV25 are backward motion vectors (the second motion vectors of which reference picture is specified by the second reference indices) used for coding or decoding the block MB2. The pictures P21, P23, P24 and P25 are coded or decoded pictures. A time interval TR24 is a time interval between the picture P23 and the picture P24; a time interval TR25 is a time interval between the picture P23 and the picture P25; a time interval TR24' is a time interval between P22 and the picture P25; and a time interval TR25' is a time interval between P22 and the picture P25.

Figure 19:
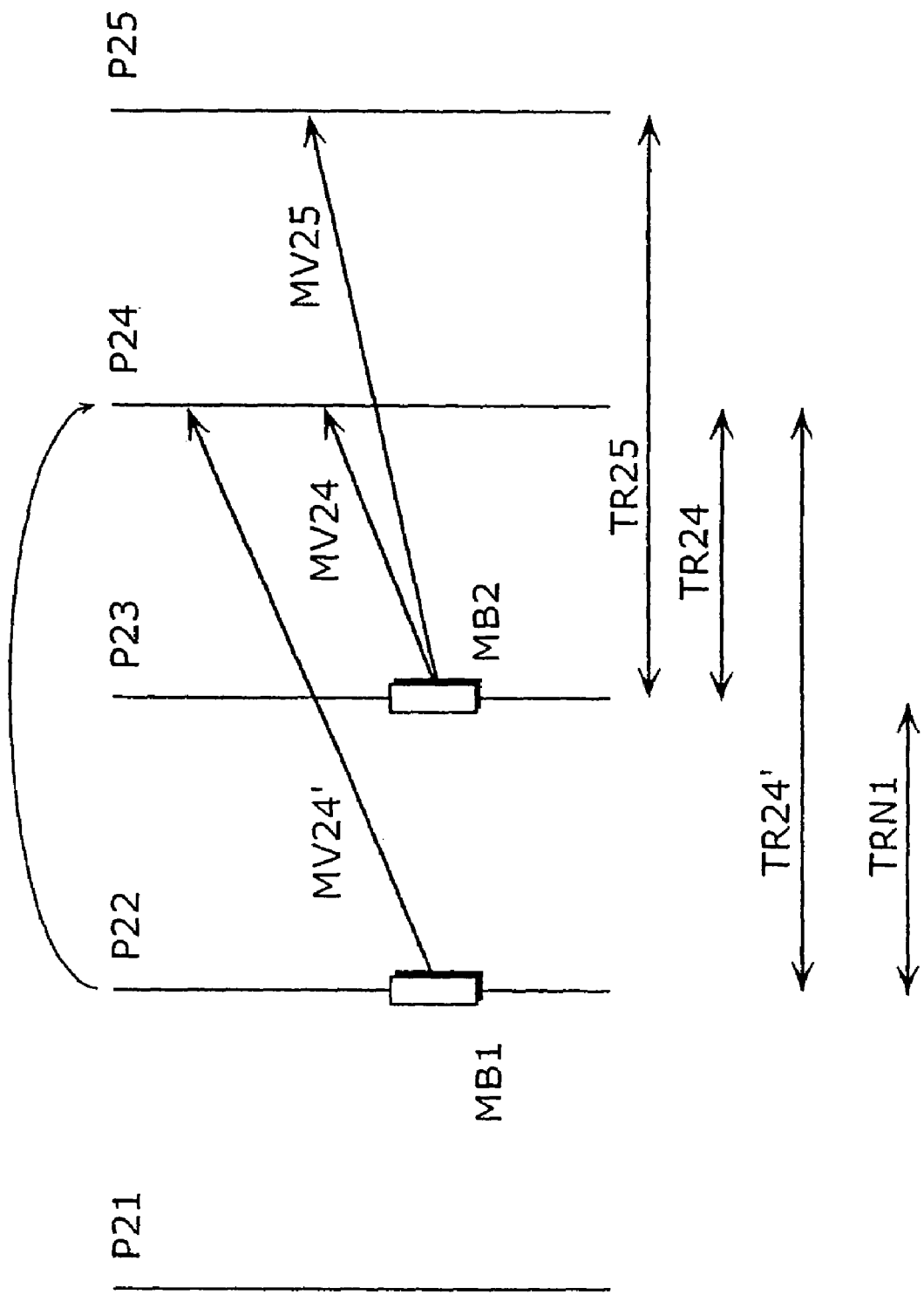
FIG. 19 is a schematic diagram to show an operation when a block of which motion vector is referred to in the direct mode contains two motion vectors which refer to following time in display order.

As the first method, when a block MB2 of a reference picture P23 contains two backward motion vectors MV24 referring to a picture P24 and MV25 referring to a picture P25 as shown in FIG. 19, a motion vector MV24' of the block MB1 is calculated using only a backward motion vector MV24 which refers to a picture P24 being temporally close to a current picture P22 by a following equation.

$$MV24'=MV24 \times TR24'/TR24$$

Then motion compensation is performed from the picture P24 using the motion vector MV24'.

Note that motion compensation can be performed from a picture P23 close in display order, using a backward motion vector MV24 same as the first embodiment. A motion vector MVN1 (not shown in this figure) used for the motion compensation is calculated by a following equation.

$$MVN1=MV24 \times TRN1/TR24$$

Figure 20:
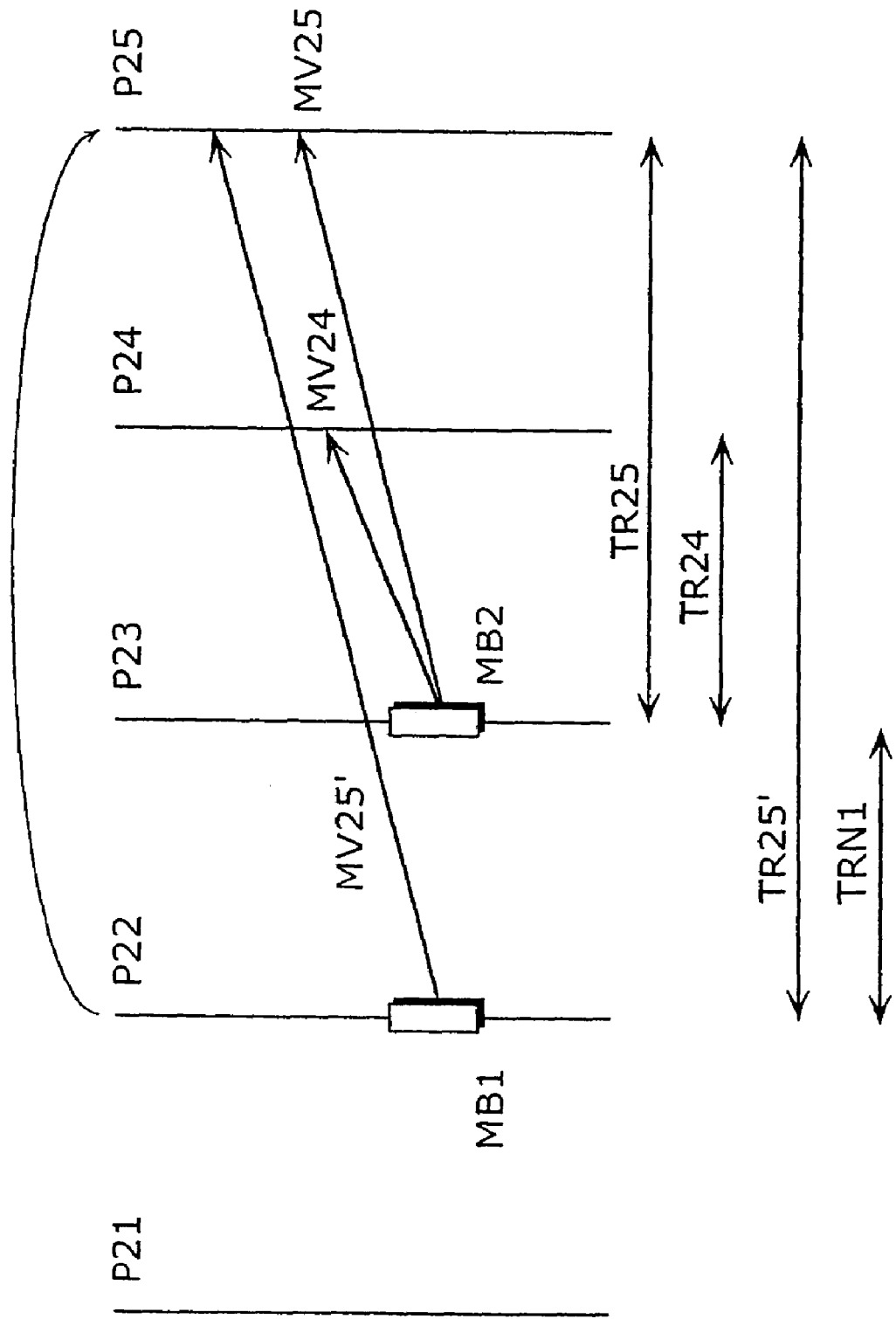
FIG. 20 is a schematic diagram to show an operation when a block of which motion vector is referred to in the direct mode contains two motion vectors which refer to following time in display order.

As the second method, when a block MB2 of a reference picture P23 contains two backward motion vectors MV24 referring to a picture P24 and MV25 referring to a picture P25 as shown in FIG. 20, a motion vector MV25' of the block MB1 is calculated using only a backward motion vector MV25 which refers to a picture P25 far from a current picture P23 in display order by a following equation.

$$MV25'=MV25 \times TR25'/TR25$$

Then motion compensation is performed from the picture P25 using the motion vector MV25'.

The first and the second methods make it possible to reduce capacity of a motion vector storing unit since the block MB2 belonging to a picture P23 of which motion vector is referred to can implement motion compensation by storing only one of two motion vectors.

Note that a motion compensation can be performed from a picture P23 close in display order, using a backward motion vector MV25 as same as the first embodiment. A motion vector MVN2 (not shown in this figure) used for the motion compensation is calculated using a following equation.

$$MVN2=MV25\times TRN1/TR25$$

Figure 21:
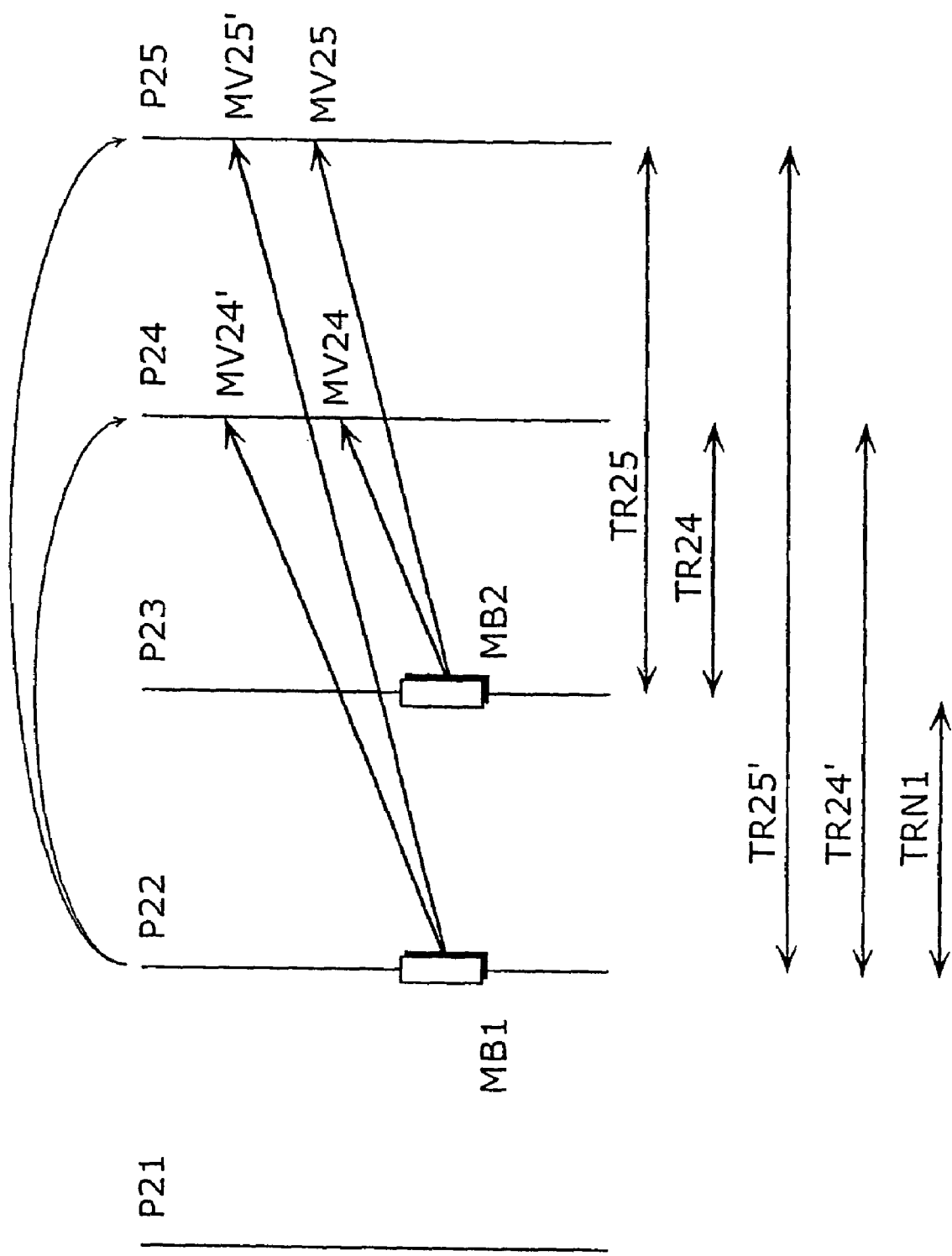
FIG. 21 is a schematic diagram to show an operation when a block of which motion vector is referred to in the direct mode contains two motion vectors which refer to following time in display order.

As the third method, as shown in FIG. 21, a motion compensation block is obtained from the pictures P24 and P25 respectively using the motion vectors MV24' and MV25' calculated above, and an average picture is used as an interpolation picture in a motion compensation.

The third method increases the amount of calculation, however, improves precision of motion compensation.

Note that, it is possible to obtain a motion compensation block from the picture P24 using the above-mentioned motion vectors MVN1 and MVN2, and use an average picture as an interpolation picture in motion compensation.

Figure 22:
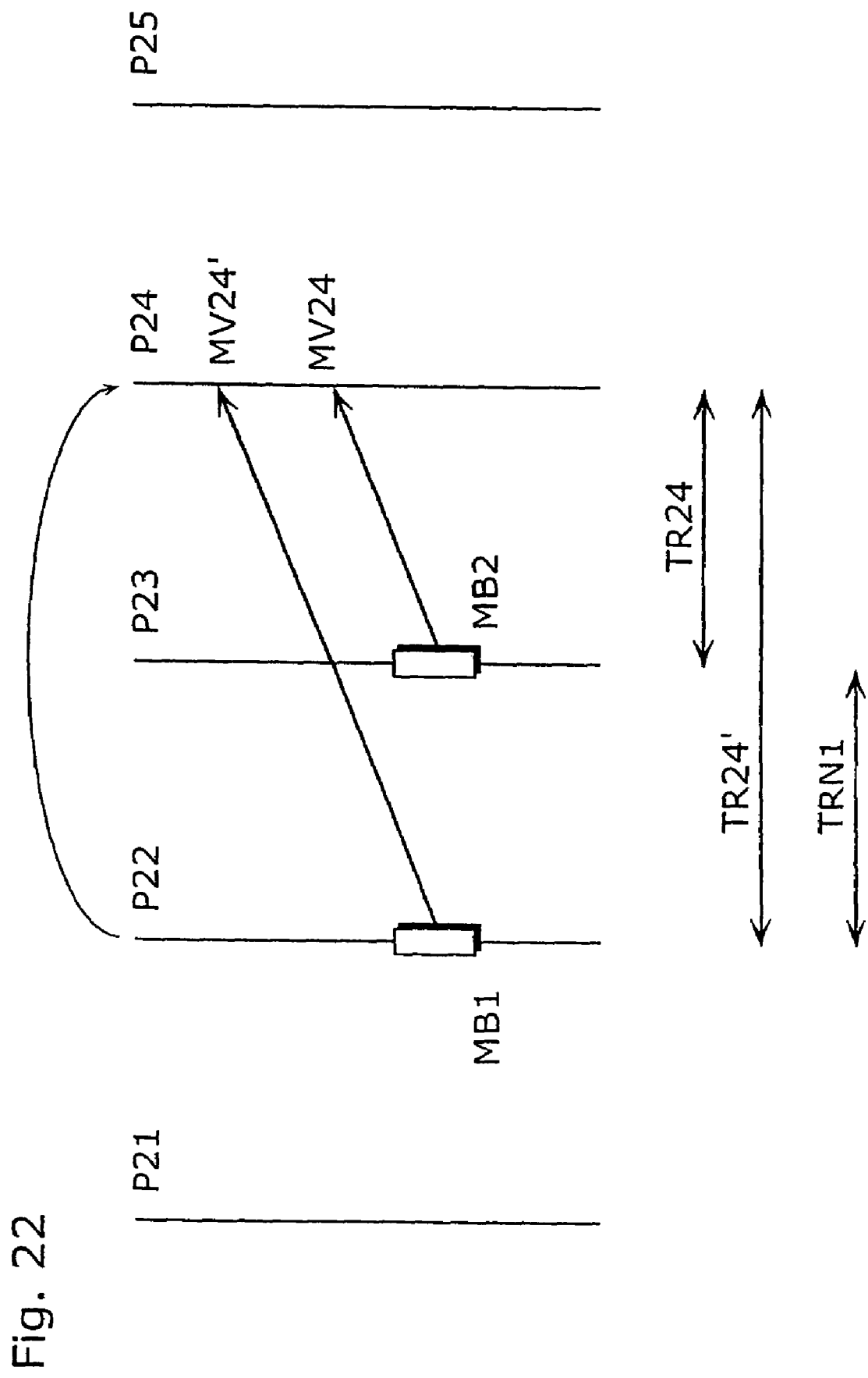
FIG. 22 is a schematic diagram to show an operation when a block of which motion vector is referred to in the direct mode contains two motion vectors which refer to following time in display order.

Moreover, as shown in FIG. 22, when a reference picture referred to in order to determine a motion vector of a current motion vector in the direct mode contains a backward motion vector which refers to a picture following in display order, for example, a motion vector MV24' is calculated using a following equation.

$$MV24'=MV24\times TR24'/TR24$$

Then motion compensation is performed from the picture P24 using the motion vector MV24'.

Note that motion compensation can be performed from a picture P23 close in display order, using a backward motion vector MV25 as same as the first embodiment. A motion vector MVN3 (not shown in this figure) used for the motion compensation is calculated by a following equation.

$$MVN3=MV24\times TRN1/TR24$$

Note that in this embodiment, the case when a current motion vector is calculated by scaling the backward motion vector is explained, when containing two backward motion vectors, which refer to two pictures following in display order, and when containing a backward motion vector, which refers to a picture following in display order. However, a current motion vector may be calculated referring to a motion vector of a neighboring block in a same picture without using a backward motion vector, and when intra picture coding is performed, a current motion vector may be calculated referring to a motion vector of a neighboring block in a same picture.

To begin with, the first calculation method will be described.

Figure 23:
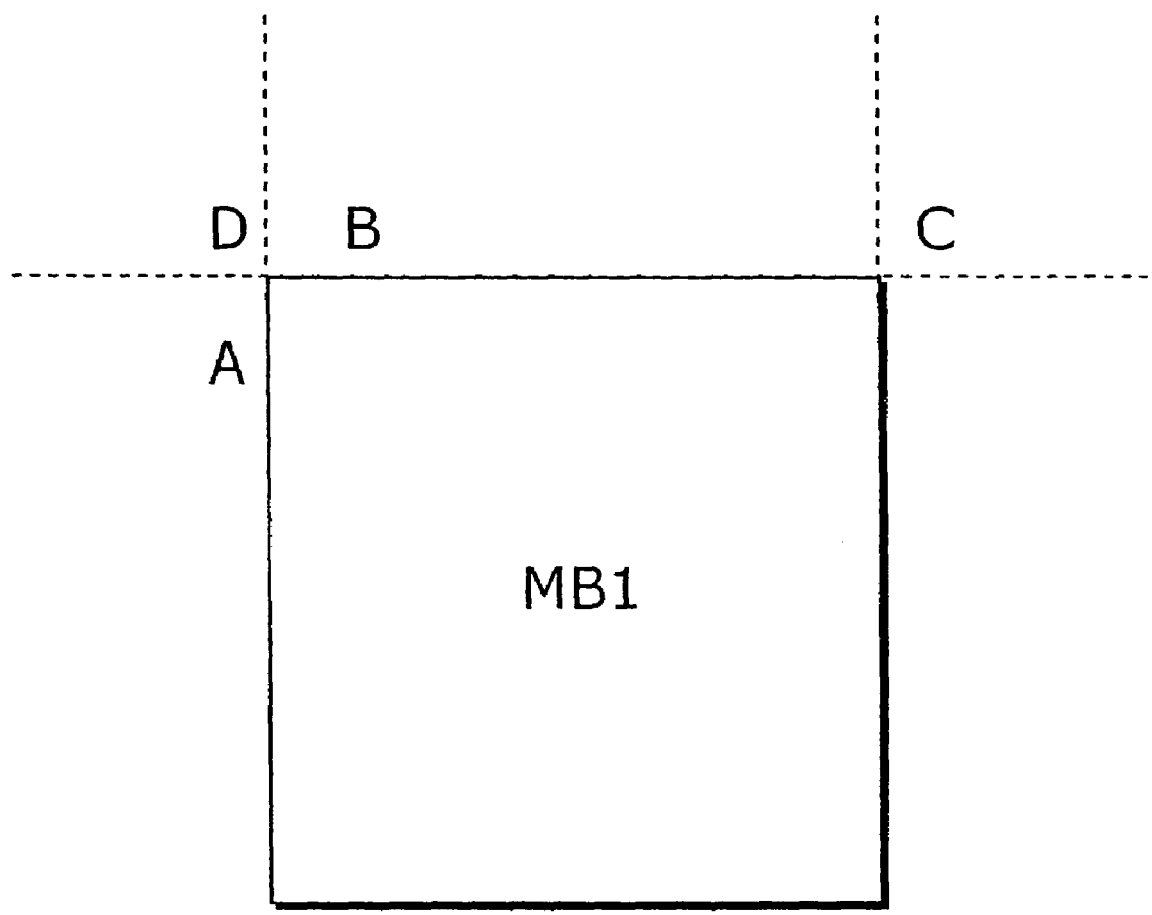
FIG. 23 is a schematic diagram to show an operation when a motion vector of a neighboring block is referred to in the direct mode.

FIG. 23 shows a positional relation between a motion vector to be referred to and a current block. A block MB 1 is a current block, and refers to a motion vector of a block including three pixels located on A, B and C. Note that when a pixel C cannot be referred to since it is located outside of a frame or it has not been coded/decoded, a motion vector of a block including a pixel D is used instead of a block including the pixel C. By calculating a median value of motion vectors of three current blocks including pixels A, B and C to be referred to, a motion vector used actually in the direct mode is determined. By calculating a median value of motion vectors of three blocks, additional information showing which motion vector is selected is not necessary to be described in a bit stream. Hence, it is possible to obtain a motion vector expressing motion close to actual motion of the block MB1. In this case, motion compensation may be performed by only forward reference (reference to the first reference picture) using the determined motion vector and by bi-directional reference (reference to the first reference picture and the second reference picture) using a motion vector parallel with the determined motion vector.

Next, the second calculation method will be described.

Figure 24A:
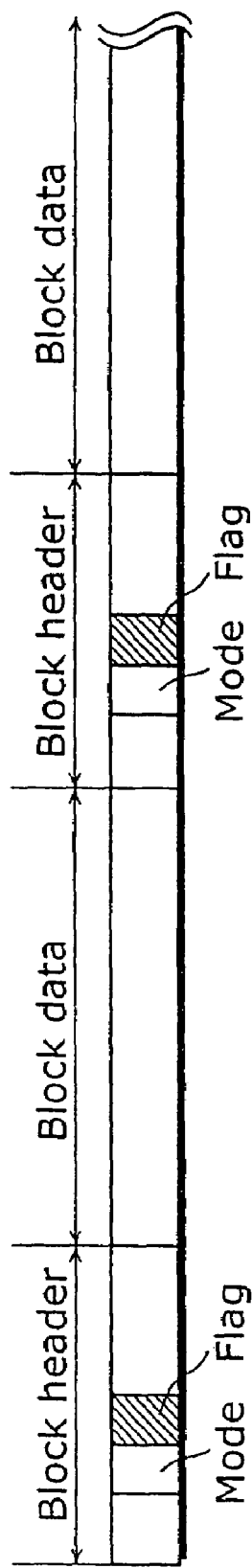
FIG. 24 is an illustration showing a bit stream.
Figure 24B:
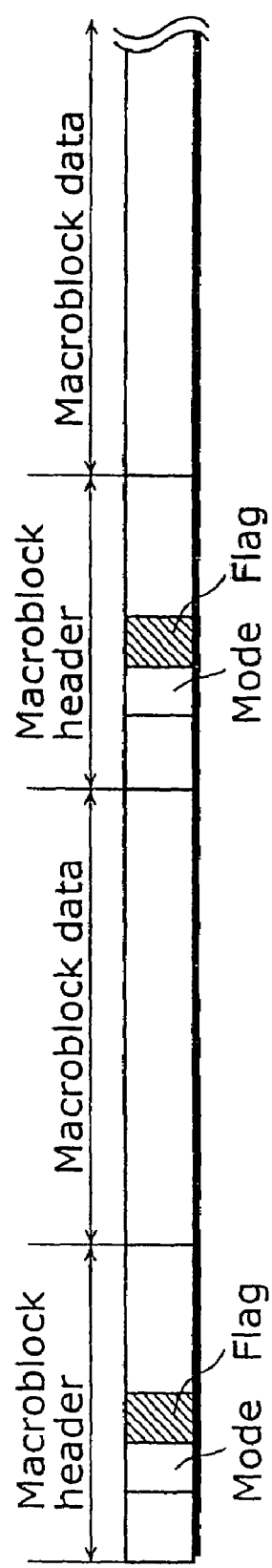

Under the second calculation method, a median value is not selected as the first calculation method, and a motion vector used in actual direct mode is determined by selecting a motion vector of which coding efficiency is the highest of motion vectors of three blocks including pixels A, B and C. In this case, motion compensation may be performed by only forward reference (reference to the first reference picture), using the determined motion vector and by bi-directional reference (reference to the first reference picture and the second reference picture) using a motion vector parallel with the determined motion vector. Information indicating a motion vector with the highest coding efficiency is, for example as shown in FIG. 24A, added to a header area of a block in a bit stream generated by a bit stream generating unit 103 with information indicating a direct mode outputted from a mode selecting unit 107. Note that as shown in FIG. 24B, the information indicating a motion vector with the highest coding efficiency may be added to a header area of a macroblock. Here, information indicating a motion vector with the highest coding efficiency is, for example, a number identifying a block including a current pixel to be referred to, and an identification number given to every block. When a block is identified by the identification number, a motion vector with the highest coding efficiency may be indicated by using only one of motion vectors used for coding a block corresponding to an identification number, and when motion vectors are more than 1, a motion vector with the highest coding efficiency may be indicated by using plural motion vectors. Or, a motion vector with the highest coding efficiency may be indicated by using an identification number given to every block to every motion vector in bi-direction (reference to the first reference picture and the second reference picture). This selecting method makes it possible to always select a motion vector which makes coding efficiency the highest. However, since additional information showing which motion vector is selected needs to be described in a bit stream, extra amount of code for the additional information is necessary. In addition, the third calculation method is explained.

Under the third calculation method, a motion vector referring to a reference picture with the smallest reference index is determined as a motion vector used in an actual direct mode. The smallest reference index means generally a motion vector which refers to a picture close in display order or a motion vector with the highest coding efficiency. Therefore, this motion vector selecting method makes it possible to improve coding efficiency, since a motion vector used in the direct mode is generated using a motion vector which refers to a picture closest in display order or a motion vector with the highest coding efficiency.

Note that when all of three motion vectors refer to a same reference picture, a median value of the three motion vectors may be used. On the other hand, when two of three motion vectors refer to a reference picture with the smallest reference index value, for example, a same one of the two motion vectors may be always selected. As an example, referring to FIG. 23, there are three blocks including pixels A, B and C respectively, and when reference index values of blocks including pixels A and B are the smallest, and a same reference picture is referred to, a motion vector in the block including the pixel A may be selected. However, when reference index values of blocks including pixels A and C are the smallest, and a same reference picture is referred to, a motion vector in a block BL1 including the pixel A located closer to a block may be selected.

Note that the above-mentioned median value may be a median value of components in horizontal direction and vertical direction of each motion vector, and may be a median value of value (absolute value) of each motion vector.

Figure 25:
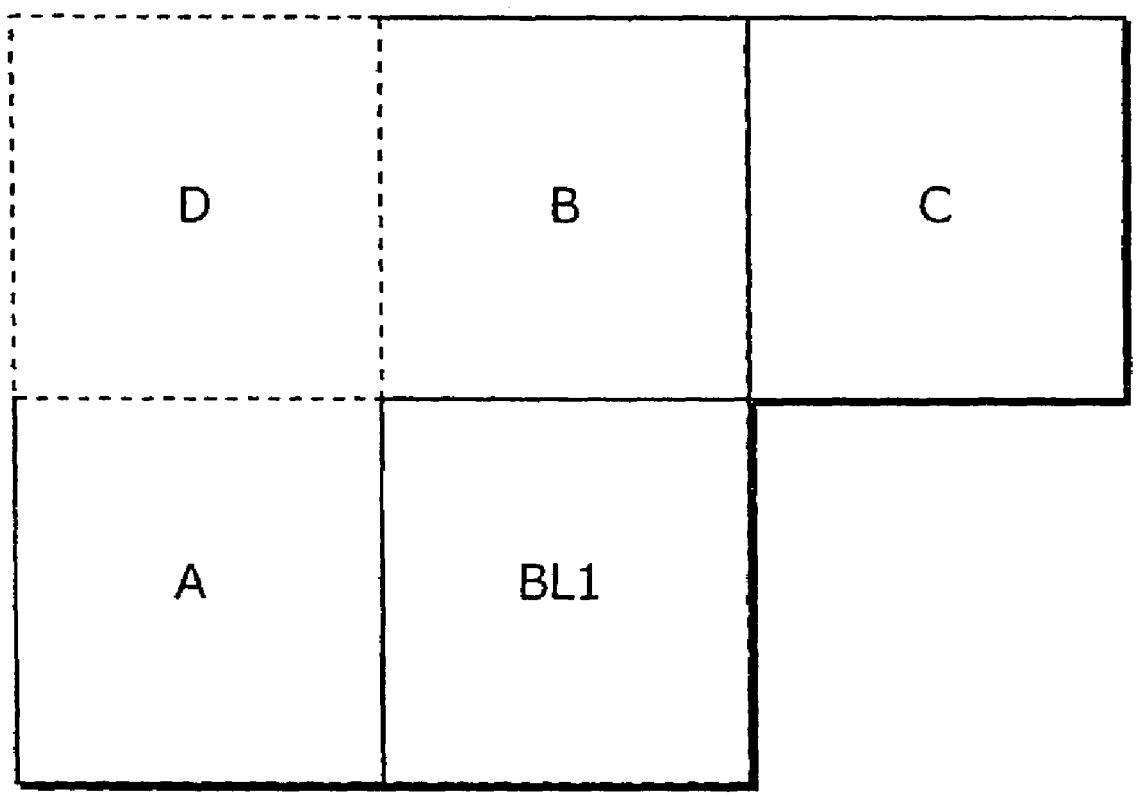
FIG. 25 is an illustration showing a relation between a current block to be coded and a block in the neighbor of the current block to be coded.

In the case as shown in FIG. 25, a median value of motion vectors may be a median value of motion vectors contained in 5 blocks: a co-located block of a block BL1 in a following reference picture; blocks including pixels A, B and C respectively; +++ and a block including a pixel D shown in FIG. 25. As described above, when a co-located block, which is close to a current pixel to be coded, of the block BL1 in a following reference picture is used, a process of calculating a median value of motion vectors becomes easier by using a block including the pixel D in order to make the number of blocks an odd number. Note that when plural blocks are on a co-located area of the block BL1 in a following reference picture, a motion compensation may be performed for the block BL1 by using a motion vector in a block which occupies the largest area overlapped with the block BL1, or by dividing the block BL1 corresponding to area of the plural block in the following reference picture and a motion compensation may be performed on divided block basis.

An explanation will be further given using concrete examples.

Figure 26:
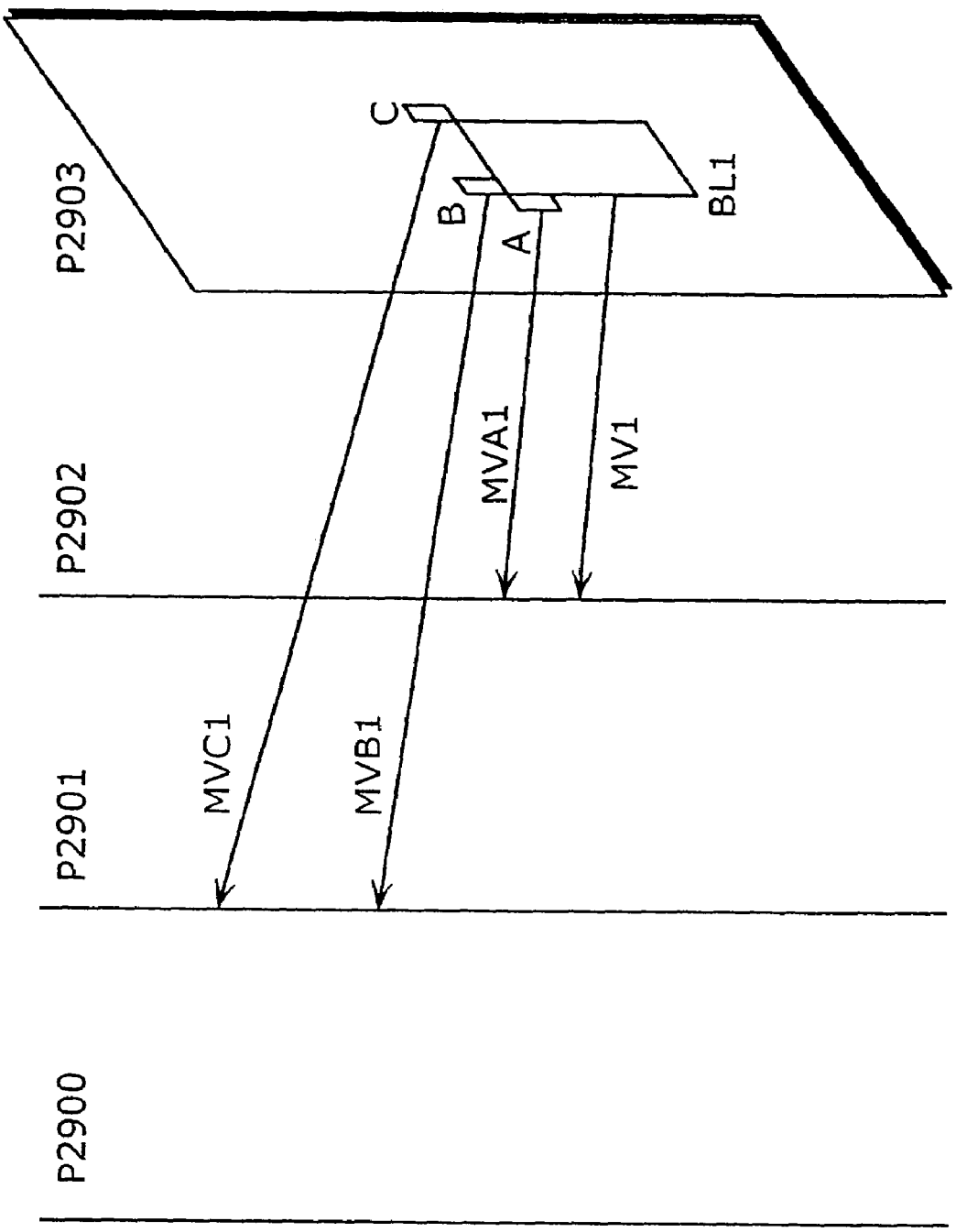
FIG. 26 is an illustration showing a motion vector contained in a block neighboring a current block to be coded.
Figure 27:
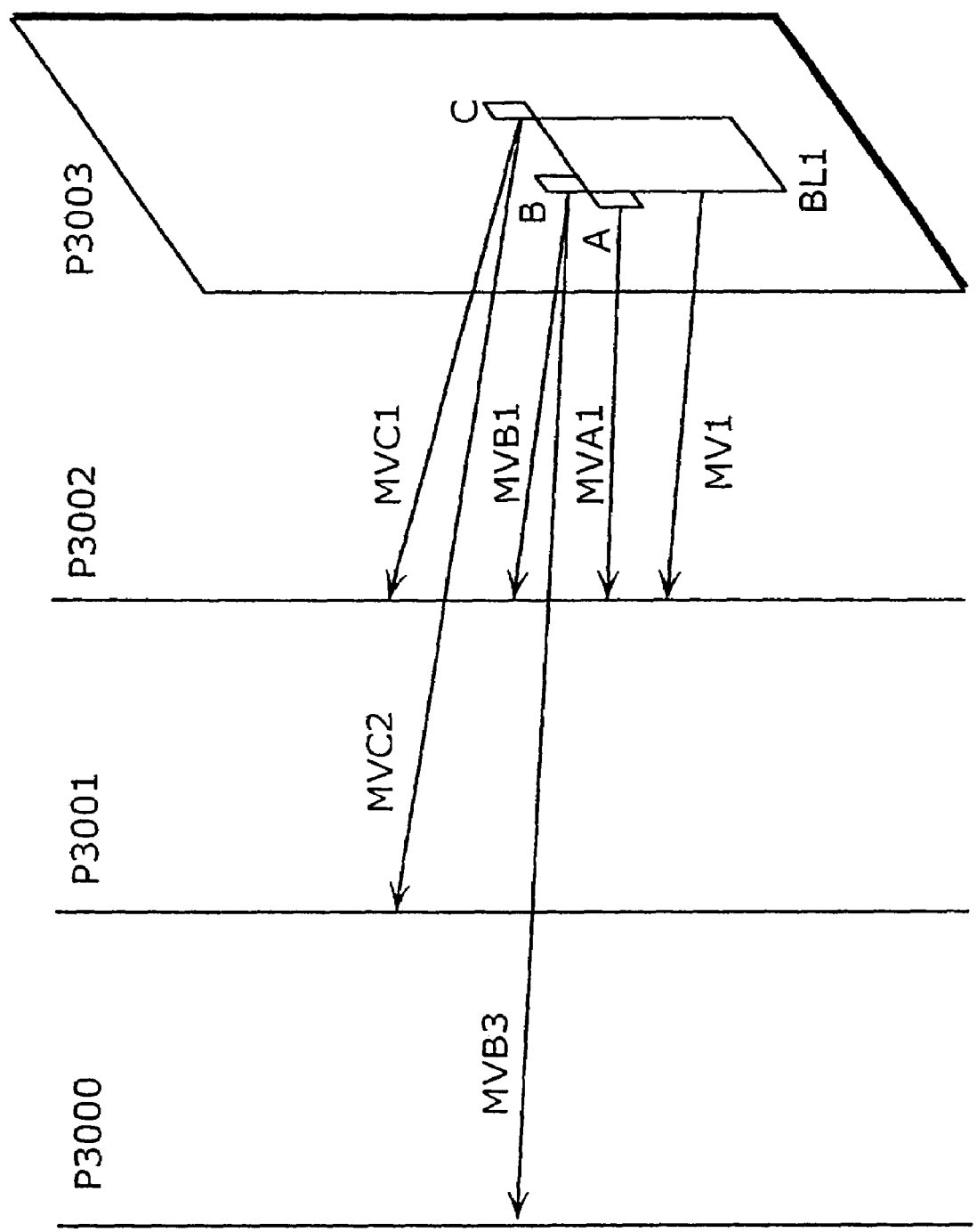
FIG. 27 is an illustration showing a motion vector contained in a block neighboring a current block to be coded.

As shown in FIGS. 26 and 27, when all blocks including pixels A, B and C contain a motion vector which refers to a picture preceding a current picture to be coded, any of the above-mentioned first through the third calculation methods may be used.

Figure 28:
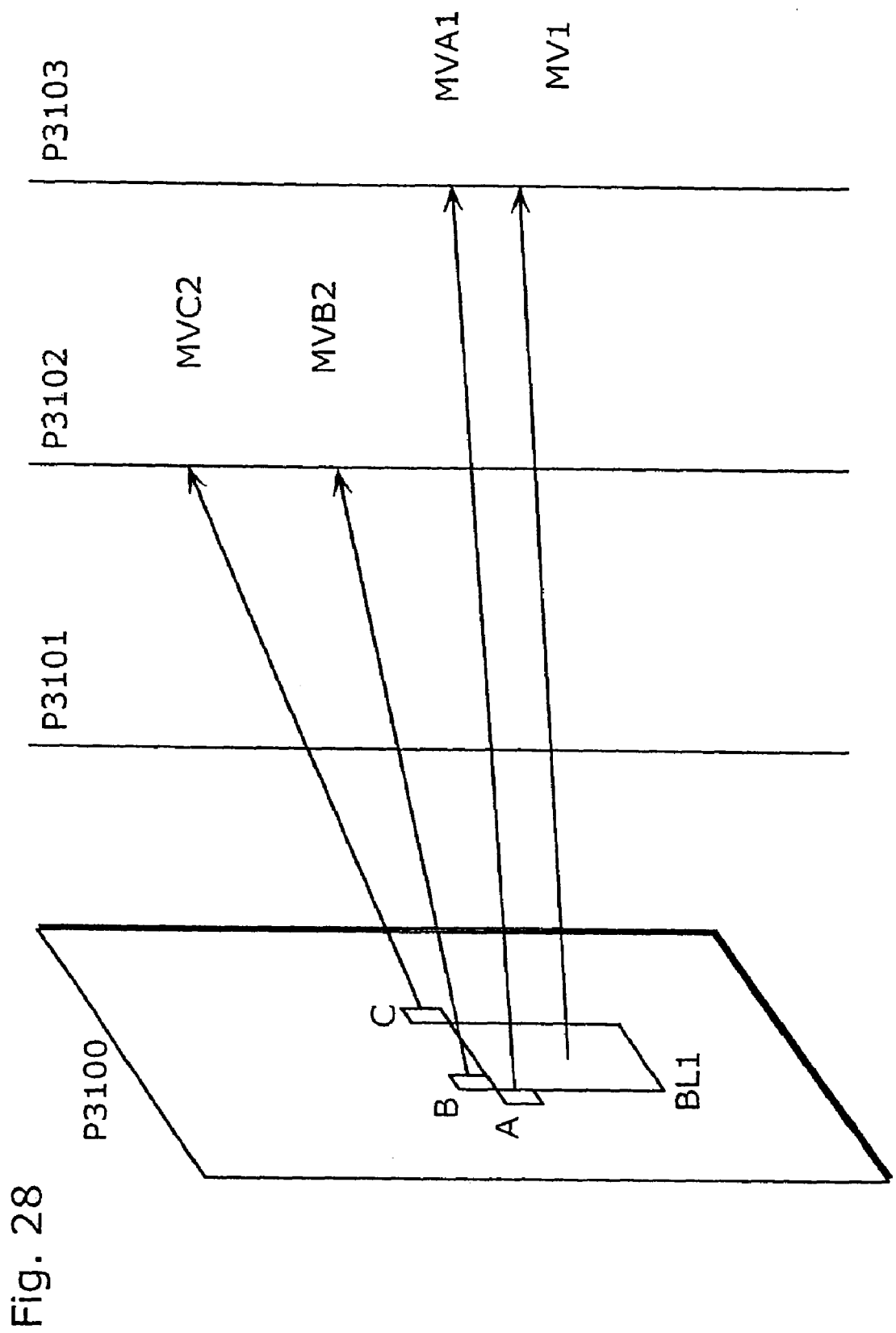
FIG. 28 is an illustration showing a motion vector contained in a block neighboring a current block to be coded.
Figure 29:
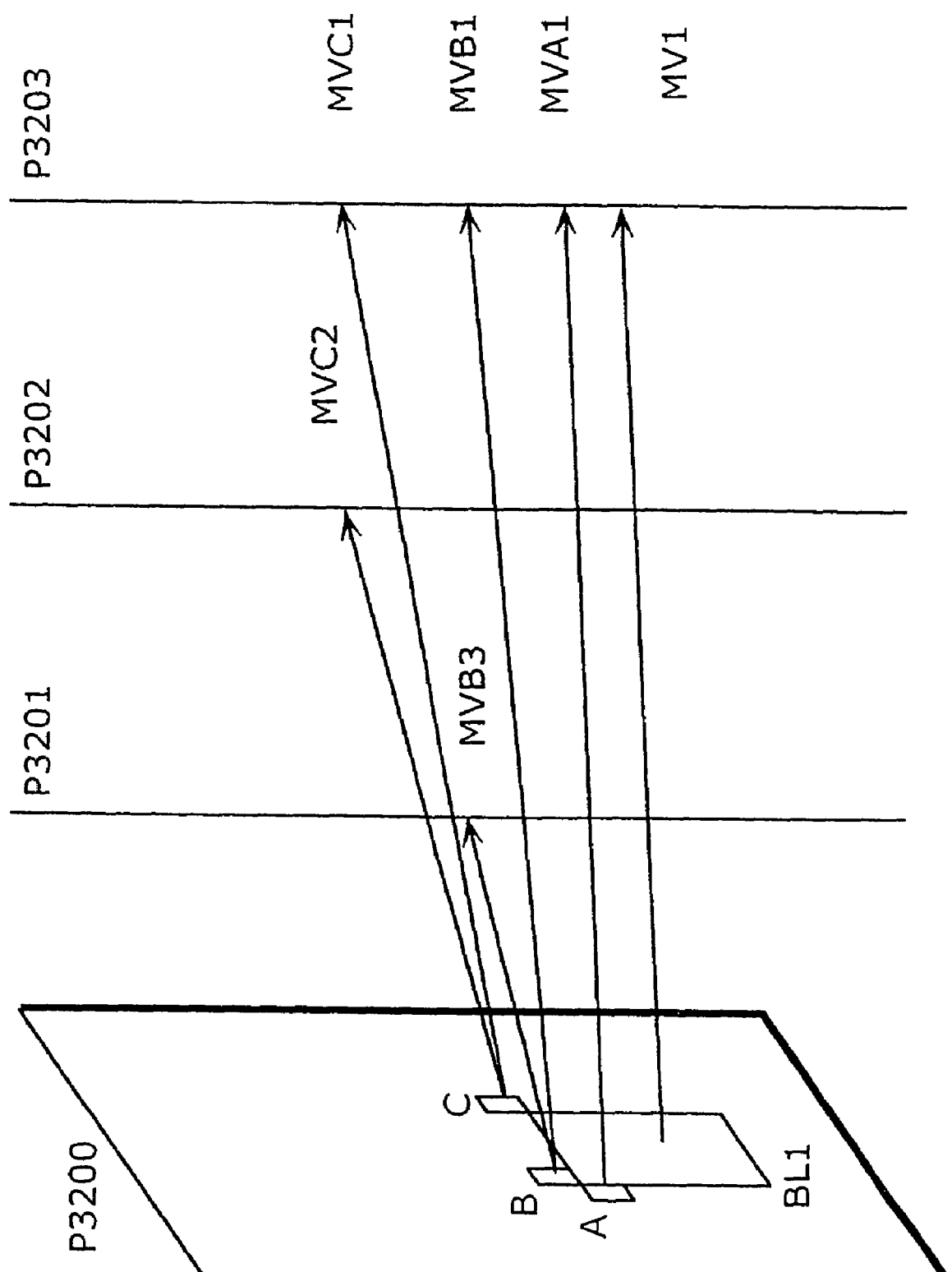
FIG. 29 is an illustration showing a motion vector contained in a block neighboring a current block to be coded.

Likewise, as shown in FIGS. 28 and 29, when all blocks including pixels A, B and C contain a motion vector which refers to a picture following a current picture to be coded, any of the first through the third calculation methods may be used.

Figure 30:
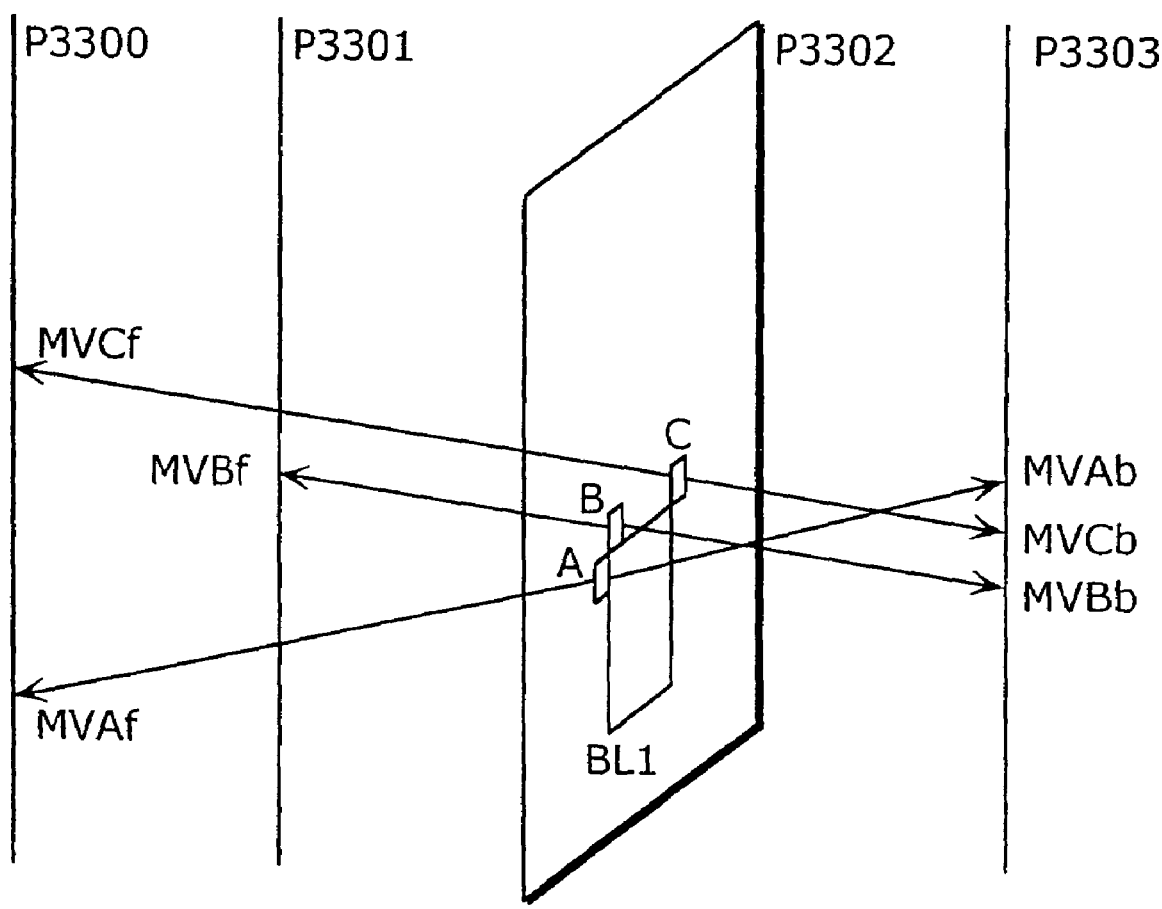
FIG. 30 is an illustration showing a motion vector contained in a block neighboring a current block to be coded.

Next, the case shown in FIG. 30 is explained. FIG. 30 shows the case that each of blocks including pixels A, B and C respectively contains each of motion vectors, one refers to a picture preceding a current picture to be coded and another refers to a picture following a current picture to be coded.

According to the first calculation method, a forward motion vector used for motion compensation of the block BL1 is selected by a median value of motion vectors MVAf, MVBf and MVCf, and a backward motion vector used for motion compensation of the block BL1 is selected by a median value of motion vectors MVAb, MVBb and MVCb. Here, the motion vector MVAf is a forward motion vector of a block containing the pixel A, the motion vector MVAb is a backward motion vector of a block containing the pixel A, the motion vector MVBf is a forward motion vector of a block containing the pixel B, the motion vector MVBb is a backward motion vector of a block containing the pixel B, the motion vector MVCf is a forward motion vector of a block containing the pixel C, the motion vector MVCb is a backward motion vector of a block containing the pixel C. Motion vectors such as the motion vector MVAf are not limited to the case referring to a picture as shown in the figure. Same applies to a following explanation.

According to the second calculation method, a motion vector to be used in the actual direct mode is determined by selecting a motion vector with the highest coding efficiency of forward reference motion vectors MVAf, MVBf and MVCf, and selecting a motion vector with the highest coding efficiency of backward reference motion vectors MVAb, MVBb and MVCb. In this case, motion compensation may be performed by only forward reference using a motion vector with the highest coding efficiency of forward reference motion vectors MVAf, MVBf and MVCf, and by bi-prediction using a motion vector parallel with the determined motion vector. Note that, in order to achieve the highest coding efficiency, a motion compensation may be performed by selecting one block and using forward and backward reference motion vectors of the selected block instead of selecting for forward and backward reference motion vectors respectively. In this case, since information indicating a selection can be reduced as compared with the case that selecting information indicating a block which contains a pixel having a forward motion vector selected for the highest coding efficiency and a block which contains a pixel having a backward motion vector selected for the highest coding efficiency, coding efficiency can be improved. The selection of the block may be from the following: 1. A block includes a pixel having a forward reference motion vector which refers to a reference picture with the smallest reference index value; 2. A block has the smallest value which is a sum of a reference index value of a picture referred to by a forward reference motion vector of a block including each pixel and a reference index value of a picture referred to by a backward reference motion vector of a block including each pixel; 3. A block selects a median value of reference indices of a picture referred to by a forward reference motion vector and includes a pixel having a forward reference motion vector with the selected median value, and a backward motion vector is included in the block; and 4. A block selects a median value of reference indices in a picture referred to by a backward reference motion vector and includes a pixel having a backward motion vector with the selected median value, and a forward motion vector is included in the block. Note that when each of backward motion vectors refers to a same picture, selecting the method 1 and the method 3 are appropriate.

According to the third calculation method, one of forward reference motion vectors MVAf, MVBf and MVCf, which refers to a reference picture with the smallest reference index value, is a forward reference (the first reference) motion vector used in the direct mode. Or, one of backward reference motion vectors MVAb, MVBb and MVCb, which refers to a reference picture with the smallest reference index value, is a backward reference (the second reference) motion vector used in the direct mode. Note that, in the third calculation method, the forward motion vector referring to the reference picture with the smallest reference index is a forward motion vector of a block BL1, and the backward motion vector referring to the reference picture with the smallest reference index is a backward motion vector of the block BL1, however, two motion vectors BL1 and BL2 may be derived using one of a forward motion vector or a backward motion vector referring to a reference picture with the smallest reference index, and motion compensation may be performed using the derived motion vector.

Figure 31:
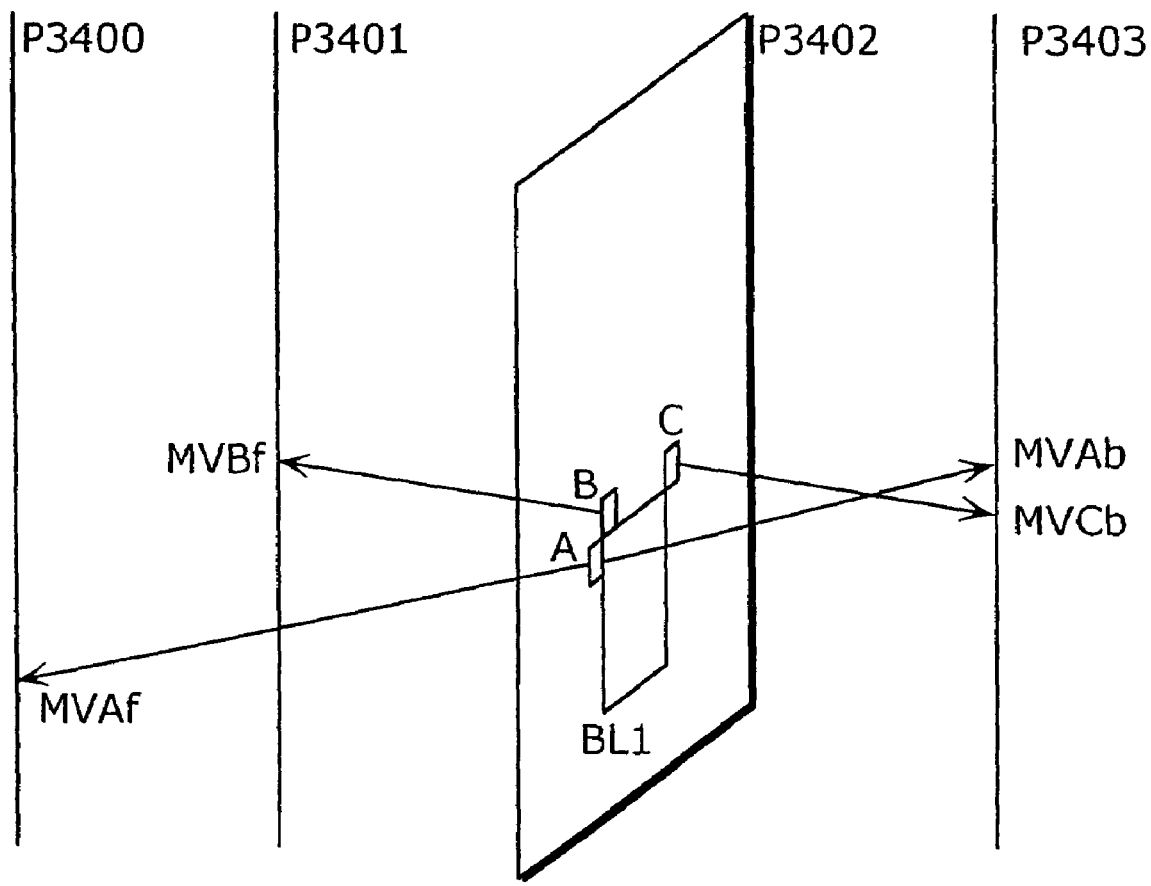
FIG. 31 is an illustration showing a motion vector contained in a block neighboring a current block to be coded.

Next, the case shown in FIG. 31 is explained. FIG. 31 shows a case that the pixel A contains each of motion vectors, one refers to preceding picture and another refers to a following picture, the pixel B contains only a motion vector which refers to a preceding picture, and the pixel C contains only a motion vector which refers a following picture.

Thus, when there is a block including a pixel containing only a motion vector referring a picture uni-directionally, assuming that a motion vector referring to a picture in another direction is 0, the calculation method in above-mentioned FIG. 30 may be used for motion compensation. Specifically, using the first or the third calculation method in FIG. 30, calculation may be performed assuming MVCf=MVBb=0. That is, in the first calculation method, when a forward motion vector of the block BL1 is calculated, assuming that a motion vector MVCf of the pixel C referring to a preceding picture is 0, a median value of motion vectors MVAf, MVBf and MVCf is calculated. On the other hand, when a backward motion vector of the block BL1 is calculated, assuming a motion vector MVBb, which refers to a following picture, of the pixel B is 0, a median value of motion vectors MVAb, MVBb and MVCb is calculated.

According to the third calculation method, assuming that a motion vector MVCf, which refers to a preceding picture, of the pixel C and a motion vector, which refers to a following picture, of the pixel B are 0, a motion vector, which refers to a reference picture with the smallest reference index value, of the block BL1 is calculated. For example, when a block including a pixel A refers to a picture with the first reference index of "0" and a block including a pixel B refers to a picture with the first reference index of "1", the smallest value of reference index is "0". Therefore, since only the motion vector MVBf, which refers to a preceding picture, of the block including the pixel refers to a picture with the smallest first reference index, the motion vector MVBf is selected as a forward motion vector of the block BL1. Moreover, for example, when both pixels A and C refer to a following picture with the smallest second reference index, for example "0", assuming a motion vector MVBb, which refers to a following picture, of a pixel B is 0, a median value of motion vectors MVAb, MVBb and MBCb is calculated. The motion vector resulted from the calculation is set as a forward motion vector of the block BL1.

Figure 32:
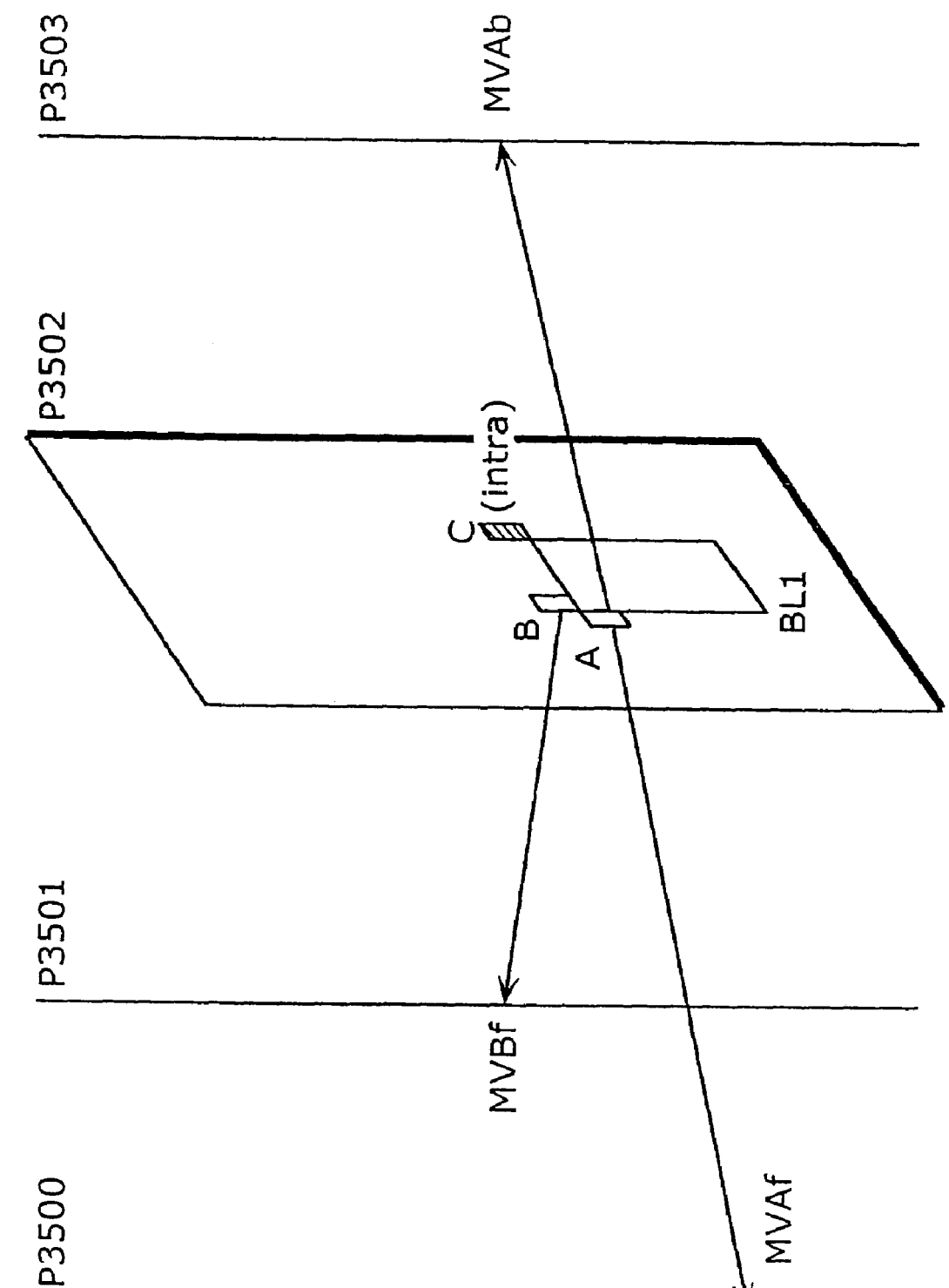
FIG. 32 is an illustration showing a motion vector contained in a block neighboring a current block to be coded.

Next, a case shown in FIG. 32 is explained. FIG. 32 shows a case when the pixel A contains each of motion vectors; one refers to preceding picture and another refers to a following picture. The pixel B contains only a motion vector which refers to a preceding picture and the pixel C does not contain a motion vector and is intra-picture coded.

When a block including a current pixel C to be coded is intra-picture coded, assuming that motion vectors which refer to pictures preceding and following the block are both 0, the calculation method in above-mentioned FIG. 30 may be used for motion compensation. Specifically, calculation may be performed assuming MVCf=MVCb=0. Note that, in FIG. 30, MVBb is 0.

Figure 33:
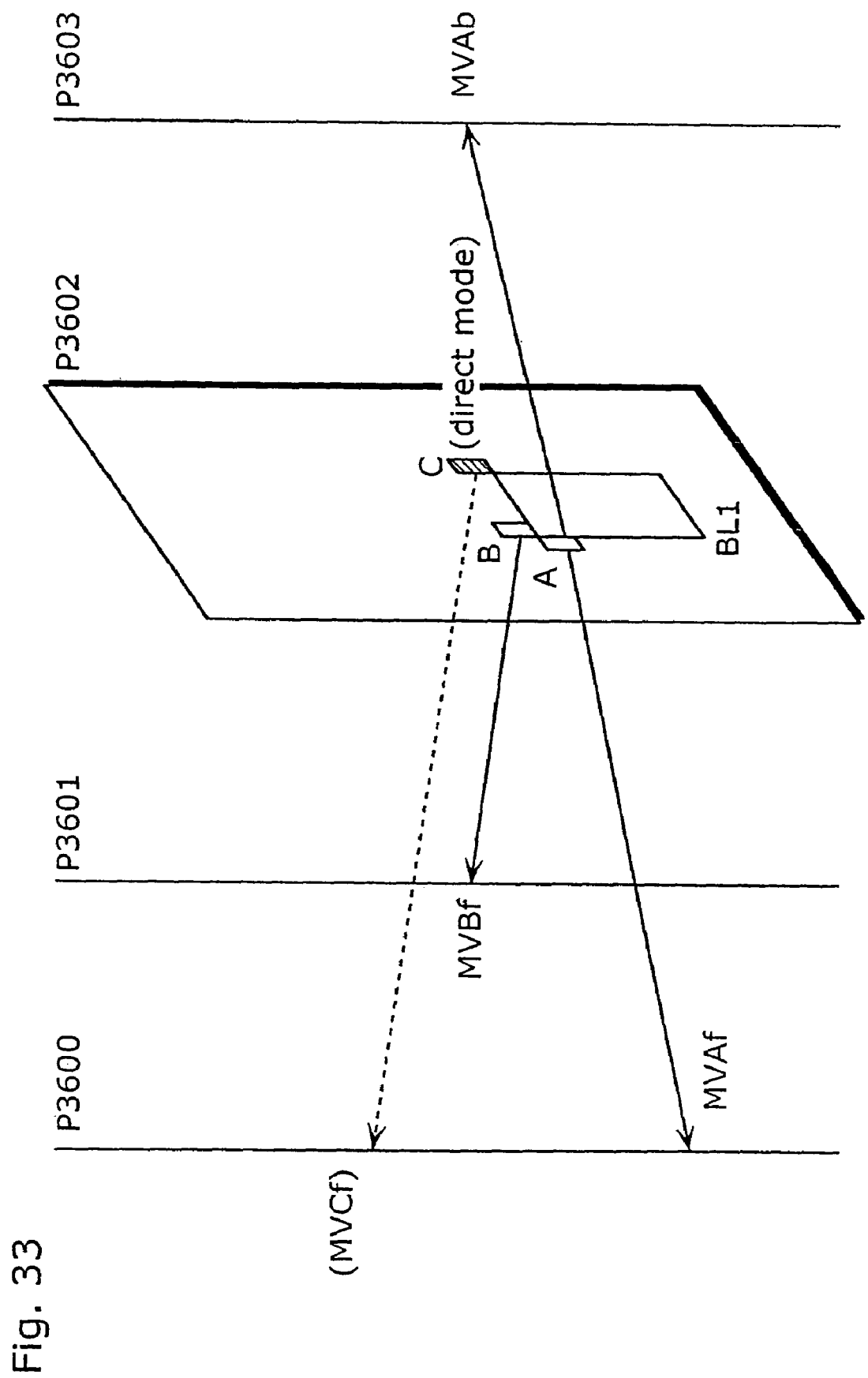
FIG. 33 is an illustration showing a motion vector contained in a block neighboring a current block to be coded.

Lastly, a case shown in FIG. 33 is explained. FIG. 33 shows a case that a pixel C is coded by the direct mode.

When blocks including a current pixel referred to contain a block coded by the direct mode, motion compensation of the block BL1 may be performed using a motion vector used for coding a block coded by the direct mode and using the calculation method shown in FIG. 30.

Note that it is determined which of a forward or a backward reference motion vector is used depending on a picture to be referred to, a picture to be coded and time information included in each picture. Therefore, when a motion vector is derived after differentiating between a forward reference and a backward reference, a motion vector of each block is judged if a forward reference or a backward reference from time information contained in each picture.

Figure 34A:
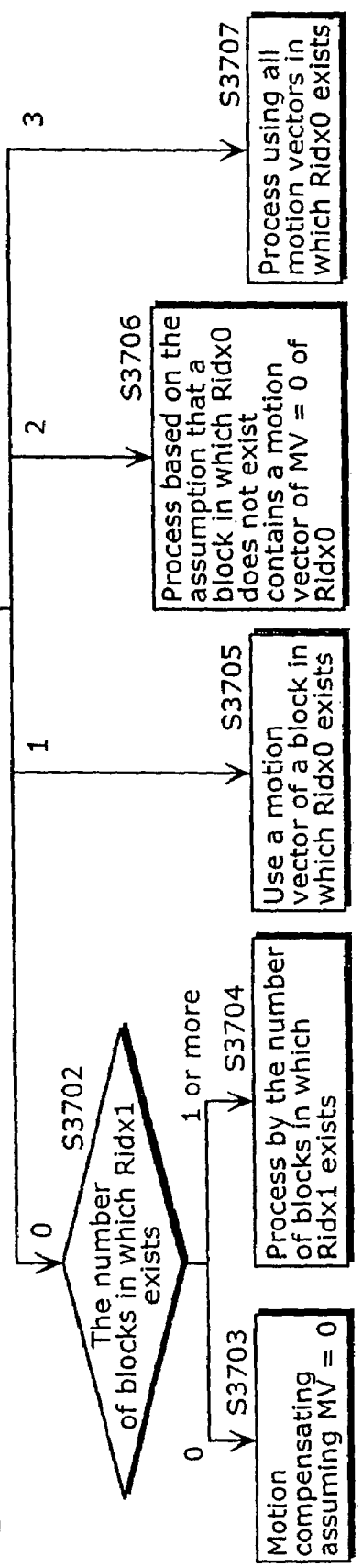
FIG. 34 is an illustration showing a procedure for determining a motion vector to be used in the direct mode.
Figure 34B:
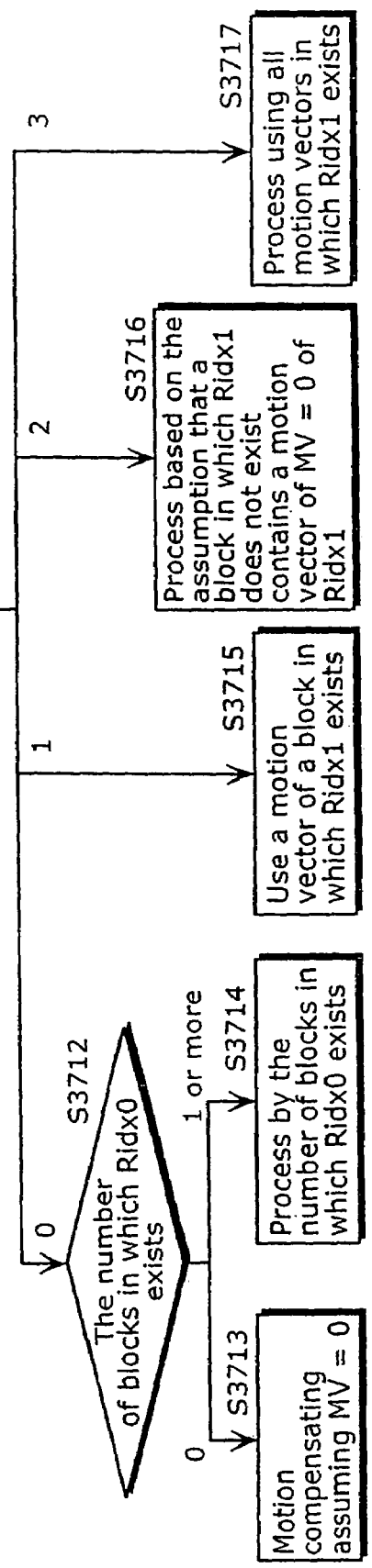

In addition, an example of a calculation method combining the above-mentioned calculation methods is explained. FIG. 34 is an illustration showing a procedure for determining a motion vector to be used in the direct mode. FIG. 34 is an example of a method for determining a motion vector using reference indices. Note that Ridx0 and Ridx1 shown in FIG. 34 are reference indices explained above. FIG. 34A shows a procedure for determining a motion vector using the first reference index Ridx0, and FIG. 34B shows a procedure for determining a motion vector using the second reference index Ridx1. First, FIG. 34A is explained.

In a step S3701, there are three blocks including pixels A, B and C respectively, and the number of blocks referring to a picture using the first reference index Ridx0 is calculated.

When the number of blocks calculated in the step S3701 is "0", the number of blocks referring to a picture using the second reference index Ridx1 is further calculated in a step S3702. When the number of blocks calculated in the step S3702 is "0", motion compensation is performed bi-directionally for a current block to be coded assuming that a motion block of the current block to be coded is "0" in a step S3703. On the other hand, when the number of blocks calculated in the step S3702 is "1" or more, a motion vector of a current block to be coded is determined in a step S3704 by the number of blocks containing the second reference index Ridx1. For example, motion compensation of a current block to be coded is performed using the motion vector determined by the number of blocks containing the second reference index Ridx1.

When the number of blocks calculated in the step S3701 is "1", a motion vector containing the first reference index Ridx0 is used in a step S3705.

When the number of blocks calculated in the step S3701 is "2", a motion vector corresponding to a median value of three motion vectors is used in a step S3706, assuming that a block which does not contain the first reference index Ridx0 contains a motion vector of MV=0 of the first reference index Ridx0.

When the number of blocks calculated in the step S3701 is "3", a motion vector corresponding to a median value of three motion vectors is used in a step S3707. Note that motion compensation in the step S3704 may be performed bi-directionally using one motion vector. Here, bi-directional motion compensation may be performed after calculating a motion vector in the same direction as one motion vector and a motion vector in the opposite direction to one motion vector, for example, by scaling one motion vector, or may be performed using a motion vector in the same direction as one motion vector and a motion vector of "0". Next, FIG. 34B is explained.

The number of blocks containing the second reference index Ridx1 is calculated in a step S3711.

When the number of blocks calculated in the step S3711 is "0", the number of blocks containing the first reference index Rixd1 is further calculated in a step S3712. When the number of blocks calculated in the step S3712 is "0", motion compensation is performed bi-directionally for a current block to be coded assuming that a motion block of the current block to be coded is "0" in a step S3713. On the other hand, the number of blocks calculated in the step S3712 is "1" or more, a motion vector of a current block to be coded is determined in a step S3714 by the number of blocks containing the first reference index Ridx0. For example, motion compensation of a current block to be coded is performed using the motion vector determined by the number of blocks containing the first reference index Ridx0.

When the number of blocks calculated in the step S3711 is "1", a motion vector containing the second reference index Ridx1 is used in a step S3715.

When the number of blocks calculated in the step S3711 is "2", a motion vector corresponding to a median value of three motion vectors is used in a step S3716, assuming that a block which does not contain the second reference index Ridx1 contains a motion vector of MV=0 of the second reference index Ridx1.

When the number of blocks calculated in the step S3711 is "3", a motion vector corresponding to a median value of three motion vectors is used in a step S3717. Note that motion compensation in the step S3714 may be performed bi-directionally using one motion vector. Here, bi-directional motion compensation may be performed after calculating a motion vector in the same direction as one motion vector and a motion vector in the opposite direction to one motion vector, for example, by scaling one motion vector, or may be performed using a motion vector in the same direction as one motion vector and a motion vector of "0".

Note that FIGS. 34A and 34B are explained respectively, but both methods may be used or one of those methods may be used. However, when one of those methods is used, for example, when a process started from the step 3704 shown in FIG. 34A is used and a process up to the step S3704 is used, a process after the step S3711 shown in FIG. 34B may be used. When a process up to the step S3704 is used, since a process after the step S3712 is not used, a motion vector can be determined uniquely. When both processes of FIGS. 34A and 34B are used, either process may be used first, or two processes may be used together. When a block neighboring a current block to be coded is coded in the direct mode, a reference index referred to by a motion vector used for coding the block coded in the direct mode may be assumed to be contained in a block coded in the direct mode and located in the neighbor of a current block to be coded.

Figures 35A, 35B:
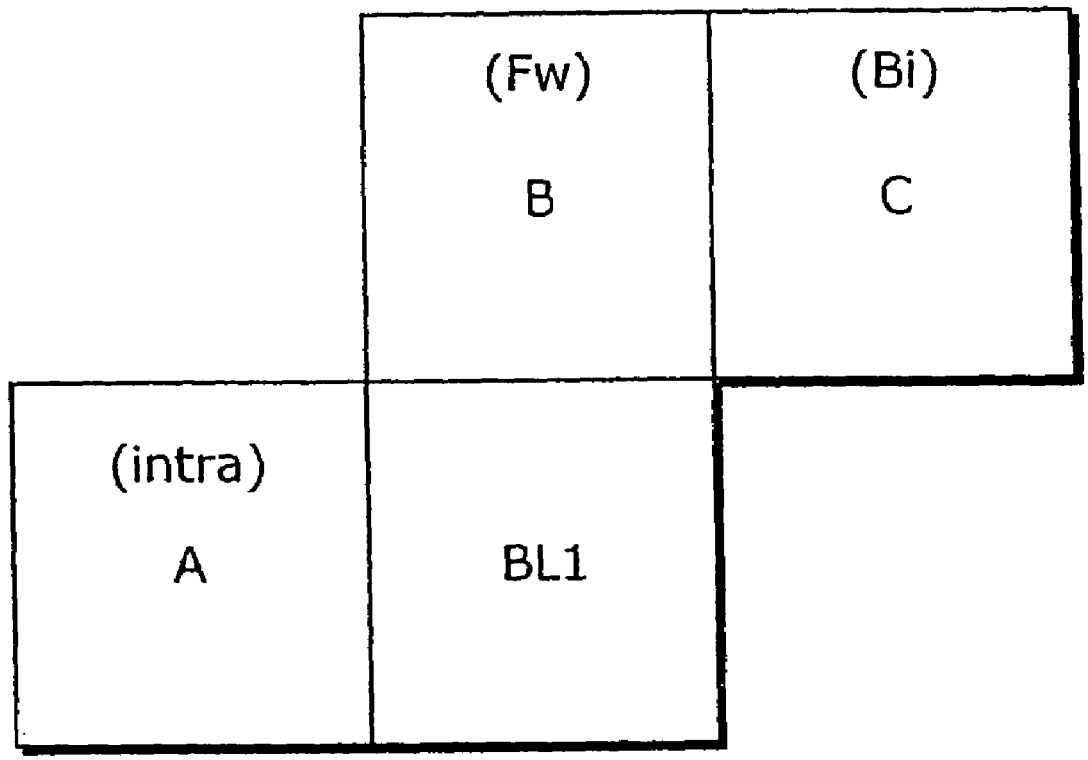
FIG. 35 is an illustration showing a relation between a current block to be coded and a block in the neighbor of the current block to be coded.

Detailed explanation of a method for determining a motion vector will be given below using concrete examples of a block. FIG. 35 is an illustration showing types of motion vectors contained in each block referred to by a current block BL1 to be coded. In FIG. 35A, a block containing a pixel A is a block intra picture coded, and a block containing a pixel B includes one motion vector and motion compensation is performed for the block using one motion vector, and a block containing a pixel C is a block including two motion vectors and motion compensation is performed bi-directionally. The block containing the pixel B contains a motion vector indicated by the second reference index Ridx1. Since the block containing the pixel A is a block to be intra picture coded, it does not contain a motion vector. In other words, it does not contain a reference index, too.

In the step S3701, the number of blocks containing the first reference index Ridx0 is calculated. As shown in FIG. 35, since the number of blocks containing the first reference index Ridx0 is 2, assuming that a block which does not contain the first reference index Ridx0 contains a motion vector of MV=0 of the first reference index Ridx0, a motion vector corresponding to a median value of three motion vectors is used in a step S3706. Bi-directional motion compensation may be performed for a current block to be coded using only the above motion vector, or may be performed using the second reference index Ridx1 and other motion vector as shown below.

In the step S3711, the number of blocks containing the second reference index Ridx1 is calculated. As shown in FIG. 35, since the number of blocks containing the second reference index Ridx1 is 1, a motion vector containing the second reference index Ridx1 is used in the step S3715.

Figure 38:
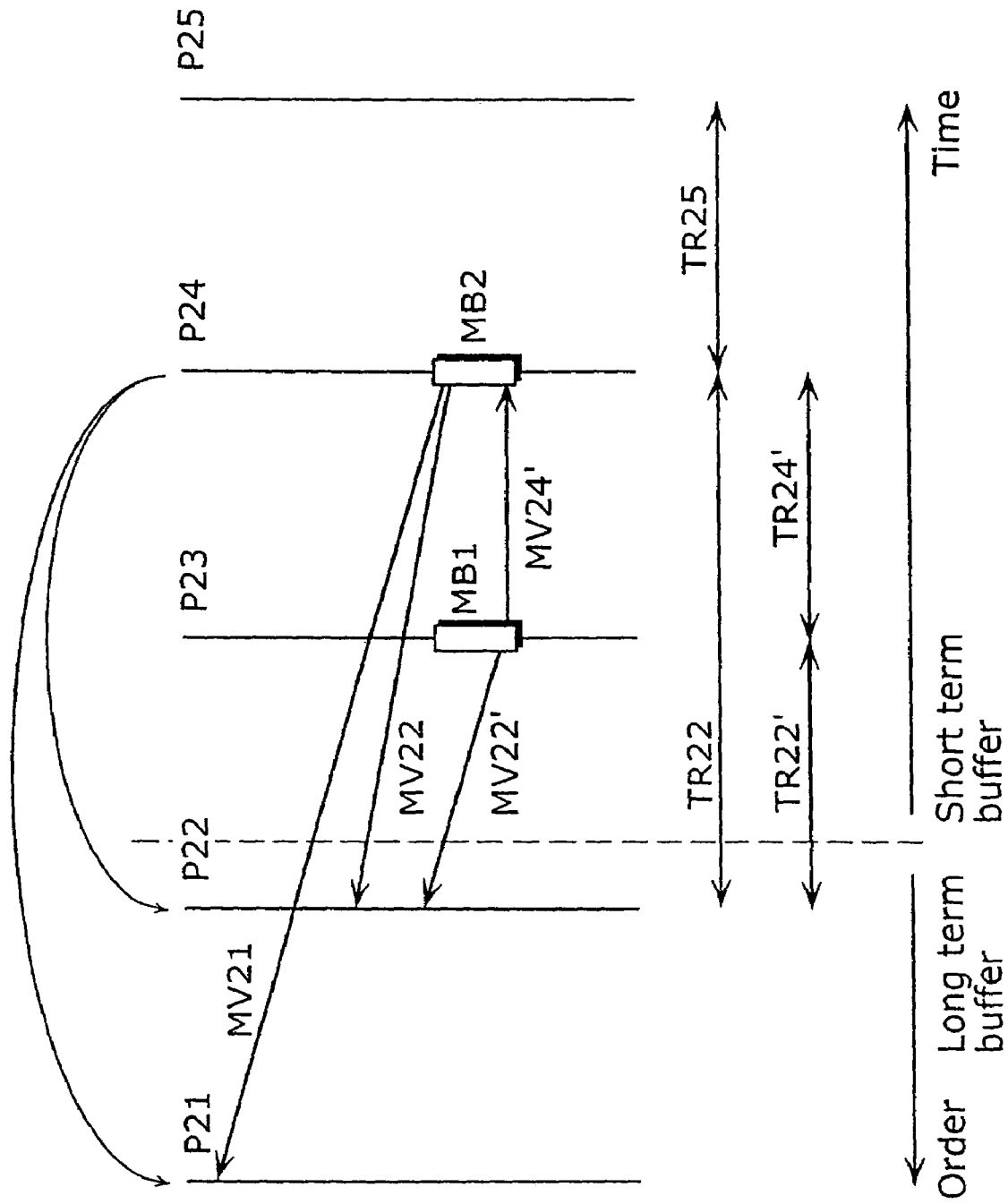
FIG. 38 is an illustration showing bi-prediction in the direct mode when motion vectors referring to a picture stored in the long term picture buffer are two.

In addition, an example of another calculation method combining the above-mentioned calculation methods is explained. FIG. 38 is an illustration showing a procedure for determining a motion vector of a current block to be coded using reference index values showing a picture referred to by a motion vector contained in blocks including pixels A, B and C respectively. FIGS. 36A and 36B are illustrations showing a procedure for determining a motion vector based on the first reference index Ridx0, and FIGS. 36C and 36D are illustrations showing a procedure for determining a motion vector based on the second reference index Ridx1. FIG. 36A shows a procedure based on the first reference index Ridx0, on the other hand, FIG. 36C shows a procedure based on the second reference index Ridx1. FIG. 36B shows a procedure based on the first reference index Ridx0, on the other hand, FIG. 36D shows a procedure based on the second reference index Ridx1. Hence, only FIGS. 36A and 36B is explained below. To begin with, FIG. 36A is explained.

In a step S3801, it is judged if the smallest first reference index Ridx0 of effective first reference indices Ridx0s can be selected.

When it is possible to select the smallest first reference index Ridx0 from the effective first reference indices Ridx0s, the motion vector selected in the step S3802 is used.

When the effective first reference indices Ridx0s include the plural smallest reference indices Ridx0s in the step S3801, a motion vector contained in a block selected by priority in a step S3803 is used. Here, the priority, for example, determines a motion vector to be used for motion compensation of a current block to be coded in alphabetical order of pixels contained in blocks.

When there is no effective first reference index Ridx0 in the step S3801, a process that is different from the steps S3802 and S3803 is used in a step S3804. For example, a process after a step S3711 explained in FIG. 374B may be used. Next, FIG. 36B is explained. The different point between FIGS. 36A and 36B is that a process in the steps S3803 and S3804 in FIG. 36A is changed to a step S3813 in FIG. 36B.

In a step S3811, it is judged if the smallest first reference index Ridx0 of effective first reference indices Ridx0s can be selected.

When it is possible to select the smallest first reference index Ridx0 from the effective first reference indices Ridx0s, the motion vector selected in the step S3812 is used.

When there is no effective first reference index Ridx0 in the step S3811, process that is different from S3812 is used in the step S3813. For example, a process after a step S3711 explained in FIG. 374B may be used.

Note that the above-mentioned effective first reference index Ridx0 is indicated by "0" in FIG. 35B, and is a reference index showing to have a motion vector. In FIG. 35B, the places in which "x" is written indicates that reference indices are not assigned. In a step S3824 in FIG. 36C and in a step S3833 in FIG. 36D, a process after the step S3701 explained in FIG. 34A may be used.

Detailed explanation of a method for determining a motion vector will be given below using concrete examples of a block and FIG. 35.

In a step S3801, it is judged if the smallest first reference index Ridx0 of effective first reference indices Ridx0s can be selected.

In the case shown in FIG. 35, there are two effective first reference indices Ridx0, however, when it is possible to select one smallest first reference index Ridx0 from effective first reference indices Ridx0s in the step S3801, a motion vector selected in the step S3802 is used.

When the effective first reference indices Ridx0s include the plural smallest reference indices Ridx0s in the step S3801, a motion vector contained in a block selected by priority in a step S3803 is used. Here, the priority, for example, determines a motion vector to be used for motion compensation of a current block to be coded in alphabetical order of pixels contained in blocks. When blocks including pixels B and C respectively contain the same first reference index Ridx0, the first reference index Ridx0 of the block including the pixel B is employed by the priority, and motion compensation is performed for a current block BL1 to be coded using a motion vector corresponding to the first reference index Ridx0 of the block containing the pixel B. In this case, motion compensation may be performed for the current block BL1 to be coded bi-directionally using only the determined motion vector, or may be performed using the second reference index Ridx1 and another motion vector as shown below.

In a step S3821, it is judged if the smallest second reference index Ridx1 of effective second reference indices Ridx1s can be selected.

In the case shown in FIG. 35, since the effective second reference index Ridx1 is one, a motion vector corresponding to the second reference index Ridx1 of a block containing the pixel C is used in a step S3822.

Note that in the above explanation, as for the block which does not contain reference indices, assuming that the block contains a motion vector of "0", a median value of three motion vectors is selected, however, assuming that the block contains a motion vector of "0", an average value of three vectors may be selected, or an average value of motion vectors of blocks containing reference indices may be selected.

Note that a motion vector used for motion compensation of a current block to be coded may be determined by priority different from the one explained above, for example, in order of pixels B-A-C, which are contained in blocks.

Thus, through determining a motion vector used for motion compensation of a current block to be coded by using a reference index, a motion vector can be determined uniquely. Moreover, according to the above-mentioned example, coding efficiency can be improved. In addition, since it is not necessary to judge whether a motion vector is a forward reference or a backward reference using time information, it is possible to simplify a process for determining a motion vector. When concerning a prediction mode for every block and a motion vector used for motion compensation or the like, there are a lot of patterns, however, as mentioned above since a process is done by a series of flows, it is useful.

Note that in this embodiment, the case calculating a motion vector used in the direct mode by scaling a motion vector referred to using a time interval between pictures is explained, however, a calculation may be performed by multiplying by a constant number. Here, a constant used for the multiplication may be variable when coding or decoding is performed on plural blocks basis or on plural pictures basis. Note that a calculation method using reference indices Ridx0 and Ridx1 are not only a method using a median value, and calculation methods may be combined with other calculation methods. For example, in the above-mentioned third calculation method, when motion vectors contained in blocks having pixels A, B and C respectively referring to a same picture of which reference index is the smallest are plural, it is not necessary to calculate a median value of these motion vectors, and a motion vector obtained from averaging these motion vectors may be used as a motion vector of the block BL1 used in the direct mode. Or, for example, a motion vector of which coding efficiency is the highest may be selected from plural motion vectors with the smallest reference indices.

Moreover, a forward motion vector and a backward motion vector of the block BL1 may be calculated independently or dependently. For example, a forward motion vector and a backward motion vector may be calculated from a same motion vector.

On the other hand, either a forward motion vector or a backward motion vector both obtained from the calculation may be used as a motion vector of the block BL1.

Eighth Embodiment

In this embodiment, a reference block MB in a reference picture contains a forward (the first) motion vector referring to a reference picture stored in the long term picture buffer as the first reference picture and a backward (the second) motion vector referring to a reference picture stored in the short term picture buffer as the second reference picture.

Figure 37:
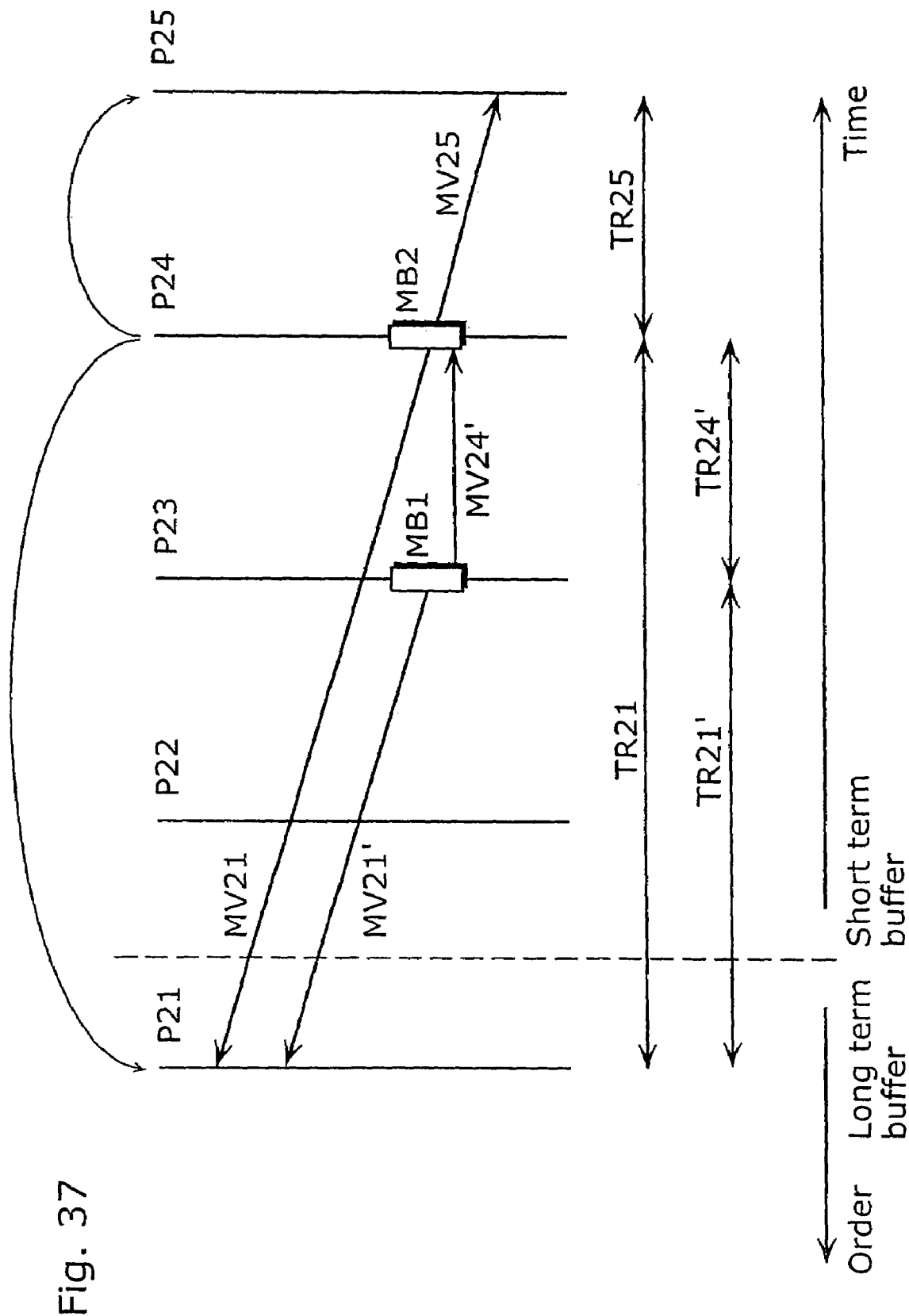
FIG. 37 is an illustration showing bi-prediction in the direct mode when a motion vector referring to a picture stored in a long term picture buffer is only one.

FIG. 37 is an illustration showing a bi-prediction in the direct mode when only one reference picture is stored in the long term picture buffer.

The different point of the eighth embodiment from above-mentioned plural embodiments is that a forward motion vector MV21 of a block MB2 in a reference picture refers to a reference picture stored in the long term picture buffer.

The short term picture buffer is a buffer for storing reference pictures temporarily, and, for example, pictures are stored in order in which pictures are stored in a buffer (that is, coding/decoding order). When pictures are newly stored in the buffer there is not enough storage capacity, pictures are deleted from a picture stored most previously in the buffer.

In the long term picture buffer, pictures are not always stored in the long term picture buffer in time order as the short term picture buffer. For example, as an order of storing pictures, time order of pictures may be corresponded, and order of address in a buffer in which pictures are stored may be corresponded. Therefore, it is impossible to scale a motion vector MV21 referring to a picture stored in the long term picture buffer based on a time interval.

A long term picture buffer is not for storing a reference picture temporarily as the short term picture buffer, but for storing a reference picture continuously. Therefore, a time interval corresponding to a motion vector stored in the long term picture buffer is much wider than a time interval corresponding to a motion vector stored in the short term picture buffer.

In FIG. 37, a boundary between the long term picture buffer and the short term picture buffer is indicated by a dotted vertical line as shown in the figure, and information about pictures on the left side of the dotted vertical line is stored in the long term picture buffer, and information about pictures on the right side of the dotted vertical line is stored in short term picture buffer. Here, a block MB1 in a picture P23 is a current block. A block MB2 is a co-located reference block of the block MB1 in a picture P24. A forward motion vector MV21 of the block MB2 in the reference picture P24 is the first motion vector referring to a picture P21 stored in the long term picture buffer as the first reference picture, and a backward motion vector MV25 of the block MB2 in the reference picture P24 is the second motion vector referring to a picture P25 stored in the short term picture buffer as the second reference picture.

As mentioned above, a time interval TR21 between the pictures P21 and P24 is corresponded to a forward motion vector MV21 referring to a picture stored in the long term picture buffer, a time interval TR25 between the pictures P24 and P25 is corresponded to a backward motion vector MV25 referring to a picture stored in the short term picture buffer, and the time interval TR21 between the pictures P21 and P24 can become much wider than the time interval TR25 between the pictures P24 and P25 or can be undefined.

Therefore, a motion vector of the block MB1 in the current picture P23 is not calculated by scaling a motion vector of the block MB2 in the reference picture P24 as previous embodiments, but the motion vector is calculated using a following method.

$$MV21=MV21'$$

$$MV24'=0$$

The upper equation shows that the first motion vector MV21 stored in the long term picture buffer is used directly as the first motion vector MV21' in a current picture.

The lower equation shows that since the second motion vector MV24', which refers to the picture 24 stored in the short term picture buffer, of the block MB1 in the current picture for the picture P23 is enough smaller than the first motion vector MV21', MV24' is negligible. The second motion vector MV24' is treated as "0".

As described above, a reference block MB contains one motion vector referring to a reference picture stored in the long term picture buffer as the first reference picture; and one motion vector referring to a reference picture stored in the short term picture buffer as the second reference picture. In this case, bi-prediction is performed using the motion vector stored in the long term picture buffer out of motion vectors of the block in the reference picture directly as a motion vector of a block in a current picture.

Note that a reference picture stored in the long term picture buffer may be either the first reference picture or the second reference picture, and a motion vector MV21 referring to a reference picture stored in the long term picture buffer may be a backward motion vector. Moreover, when the second reference picture is stored in the long term picture buffer and the first reference picture is stored in the short term picture buffer, a motion vector in a current picture is calculated by scaling a motion vector referring to the first reference picture.

This makes it possible to perform bi-prediction without using time which is considerably large in the long term picture buffer or undefined.

Note that bi-prediction may be performed not directly using a motion vector referred to but using a motion vector by multiplying by a constant number.

In addition, a constant used for the multiplication may be variable when coding or decoding is performed on plural blocks basis or on plural pictures basis.

Ninth Embodiment

In this embodiment, bi-prediction in the direct mode is shown. In this case, a reference block MB in a reference picture contains two forward motion vectors referring to a reference picture stored in a long term picture buffer.

FIG. 38 is an illustration showing bi-prediction in the direct mode when a reference block MB in a reference picture contains two forward motion vectors referring to a reference picture stored in the long term picture buffer.

The different point of the ninth embodiment from the eighth embodiment is that both motion vectors MV21 and MV22 of a block MB2 in a reference picture refer to a picture stored in the long term picture buffer.

In FIG. 38, a boundary between the long term picture buffer and the short term picture buffer is indicated by a dotted vertical line as shown in the figure, and information about pictures on the left side of the dotted vertical line is stored in the long term picture buffer and information about pictures on the right side of the dotted vertical line is stored in short term picture buffer. Motion vectors MV21 and MV22 of the block MB2 in a reference picture P24 both refer to a picture stored in the long term picture buffer. The motion vector MV21 corresponds to a reference picture P21, and the motion vector MV22 corresponds to a reference picture P22.

A time interval TR22 between the pictures P22 and P24 can become much wider than the time interval TR25 between the pictures P24 and P25 or can be undefined corresponding to the motion vector MV22 referring to the picture P22 stored in the long term picture buffer.

In FIG. 38, pictures are stored in order of pictures P22-P21 in that order in the long term picture buffer. Here the picture P21 corresponds to a motion vector MV21 and the picture P22 corresponds to a motion vector MV22. In FIG. 38, a motion vector of a block MB1 in a current picture is calculated as follows.

$$MV22'=MV22$$

$$MV24'=0$$

The upper equation shows that a motion vector MV22 referring to a picture P22 to which the smallest order is assigned is used directly as a motion vector MV22' of the block MB1 in a current picture P23.

The lower equation shows that since the backward motion vector MV24' of the block MB1 in the current picture P23 stored in the short term picture buffer is enough smaller than the motion vector MV21', MV24' is negligible. The backward motion vector MV24' is treated as "0".

As described above, by directly using a motion vector referring to a picture to which the smallest order is assigned out of motion vectors of a block in a reference picture stored in the long term picture buffer, bi-prediction can be made without using time which is considerably large in the long term picture buffer or undefined.

Note that bi-prediction may be made not directly using a motion vector referred to but using a motion vector by multiplying by a constant number.

In addition, a constant used for the multiplication may be variable when coding or decoding is performed on plural blocks basis or on plural pictures basis.

Furthermore, when motion vectors MV21 and MV22 of the block MB2 in a reference picture both refer to a picture stored in the long term picture buffer, a motion vector referring to the first reference picture may be selected. For example, when MV21 is a motion vector referring to the first reference picture and MV22 is a motion vector referring to the second reference picture, the motion vector MV21 referring to a picture P21 and a motion vector "0" referring to a picture P24 are used as motion vectors of a block MB1.

Tenth Embodiment

In this embodiment, a calculation method of a motion vector in the direct mode shown in the fifth embodiment through the ninth embodiment is explained. This calculation method of a motion vector is applied to either of coding and decoding a picture. Here, a current block to be coded or decoded is called a current block MB. A co-located block of the current block MB in a reference picture is called a reference block.

Figure 39:
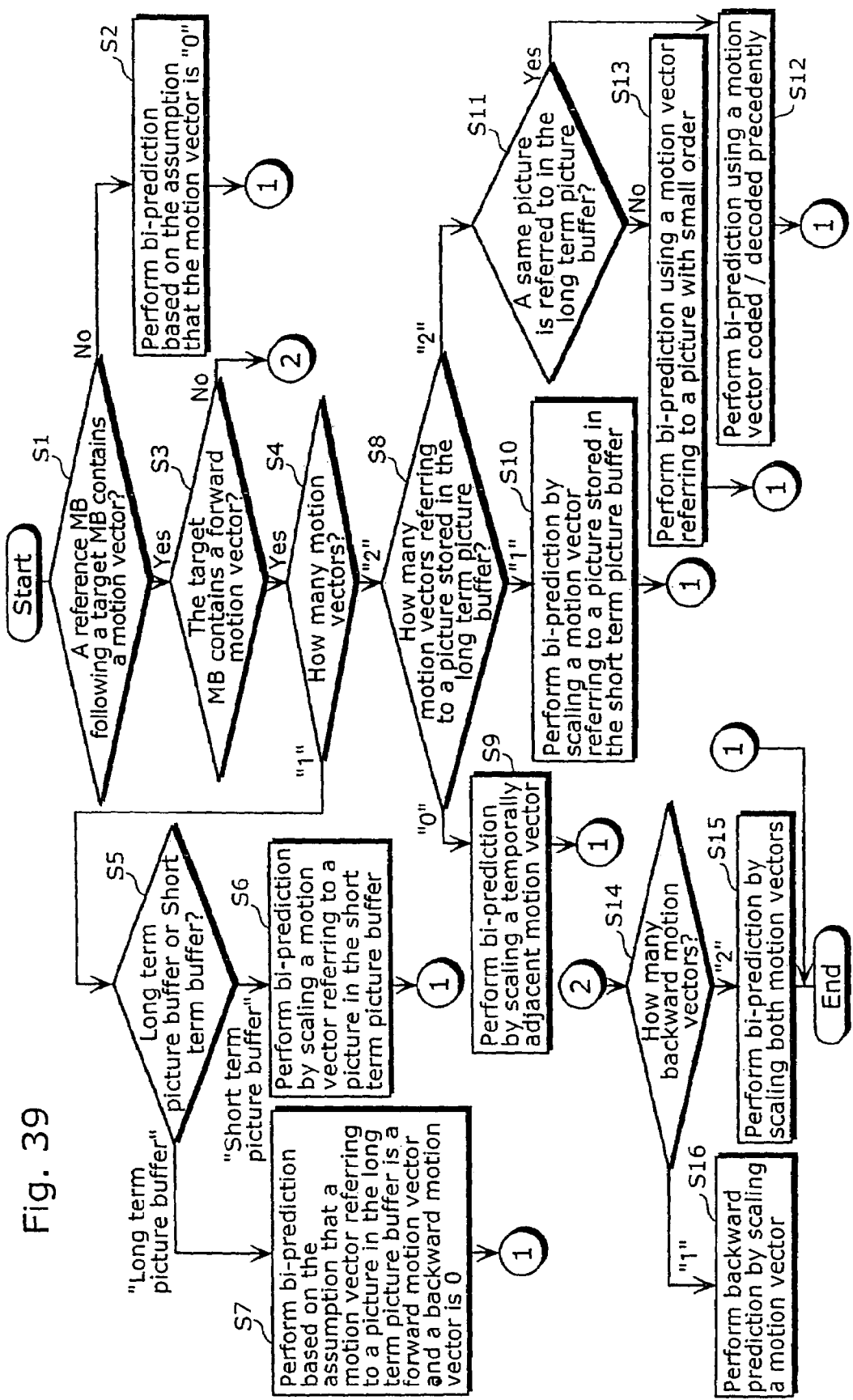
FIG. 39 is an illustration showing a process flow of a motion vector calculation method.

FIG. 39 is an illustration showing a process flow of a motion vector calculation method of this embodiment.

First, it is judged if a reference block MB in a backward reference picture referred by a current block MB contains a motion vector (step S1). If the reference block MB does not contain a motion vector (No in step S1), bi-prediction is performed assuming that a motion vector is "0" (step S2) and a process for a motion vector calculation is completed.

If the reference block MB contains a motion vector (Yes in step S1), it is judged if the reference block contains a forward motion vector (step S3).

If the reference block does not contain a forward motion vector (No in step S3), since the reference block MB contains only a backward motion vector, the number of backward motion vectors is judged (step S14). When the number of backward motion vectors of the reference block MB is "2", bi-prediction is performed using two backward motion vectors scaled based on one of the calculation method mentioned in FIGS. 17, 18, 19 and 20.

On the other hand, when the number of backward motion vectors of the reference block MB is "1", the only backward motion vector contained in the reference block MB is scaled and motion compensation is performed using the scaled backward motion vector (step S16). After completing the bi-prediction in the step S15 or S16, a process of the motion vector calculation method is completed.

On the other hand, if the reference block MB contains a forward motion vector (Yes in step S3), the number of forward motion vectors of the reference block MB is judged (step S4).

When the number of forward motion vectors of the reference block MB is "1", it is judged if a reference picture corresponding to the forward motion vector of the reference block MB is stored in the long term picture buffer or the short term picture buffer (step S5).

When the reference picture corresponding to the forward motion vector of the reference block MB is stored in the short term picture buffer, the forward motion vector of the reference block MB is scaled and bi-prediction is performed using the scaled forward motion vector (step S6).

When the reference picture corresponding to the forward motion vector of the reference block MB is stored in the long term picture buffer, bi-prediction is performed based on the motion vector calculation method shown in FIG. 37 assuming that a backward motion vector is 0 and using the forward motion vector of the reference block MB directly without scaling (step S7). After completing the bi-prediction in the step S6 or S7, a process of the motion vector calculation method is completed.

When the number of forward motion vectors of the reference block MB is "2", the number of forward motion vectors corresponding to a reference picture stored in the long term picture buffer is judged (step S8).

When the number of forward motion vectors corresponding to a reference picture stored in the long term picture buffer is "0" in the step S8, a motion vector which is temporally close to a current picture containing the current block MB is scaled and bi-prediction is performed using the scaled forward motion vector based on the motion vector calculation method shown in FIG. 14 (step S9).

When the number of forward motion vectors corresponding to a reference picture stored in the long term picture buffer is "1" in the step S8, a motion vector in a picture stored in the short term picture buffer is scaled and bi-prediction is performed using the scaled motion vector (step S10).

When the number of forward motion vectors corresponding to a reference picture stored in the long term picture buffer is "2" in the step S8, it is judged if a same picture in the long term picture buffer is referred to by both of two forward motion vectors (step S11). If the same picture in the long term picture buffer is referred to by both of two forward motion vectors (Yes in step S11), bi-prediction is performed using a motion vector previously coded or decoded in the picture referred to by two forward motion vectors in the long term picture buffer based on the motion vector calculation method shown in FIG. 13 (step S12).

If a same picture in the long term picture buffer is not referred to by both of two forward motion vectors (No in step S11), bi-prediction is performed using a forward motion vector corresponding to a picture to which a small order is assigned in the long term picture buffer (step S13). In the long term picture buffer, since reference pictures are stored regardless of actual time of pictures, a forward motion vector to be used for bi-prediction is selected in concordance with an order assigned to each reference picture. There is a case that the order of reference pictures stored in the long term picture buffer coincides with time of pictures, however, it may be merely coincided with an address in the buffer. In other words, the order of pictures stored in the long term picture buffer does not necessarily coincide with time of pictures. After completing bi-prediction in steps S12 and S13, process of the motion vector calculation method is completed.

Eleventh Embodiment

Detailed explanation of the eleventh embodiment according to the present invention will be given below using illustrations.

Figure 40:
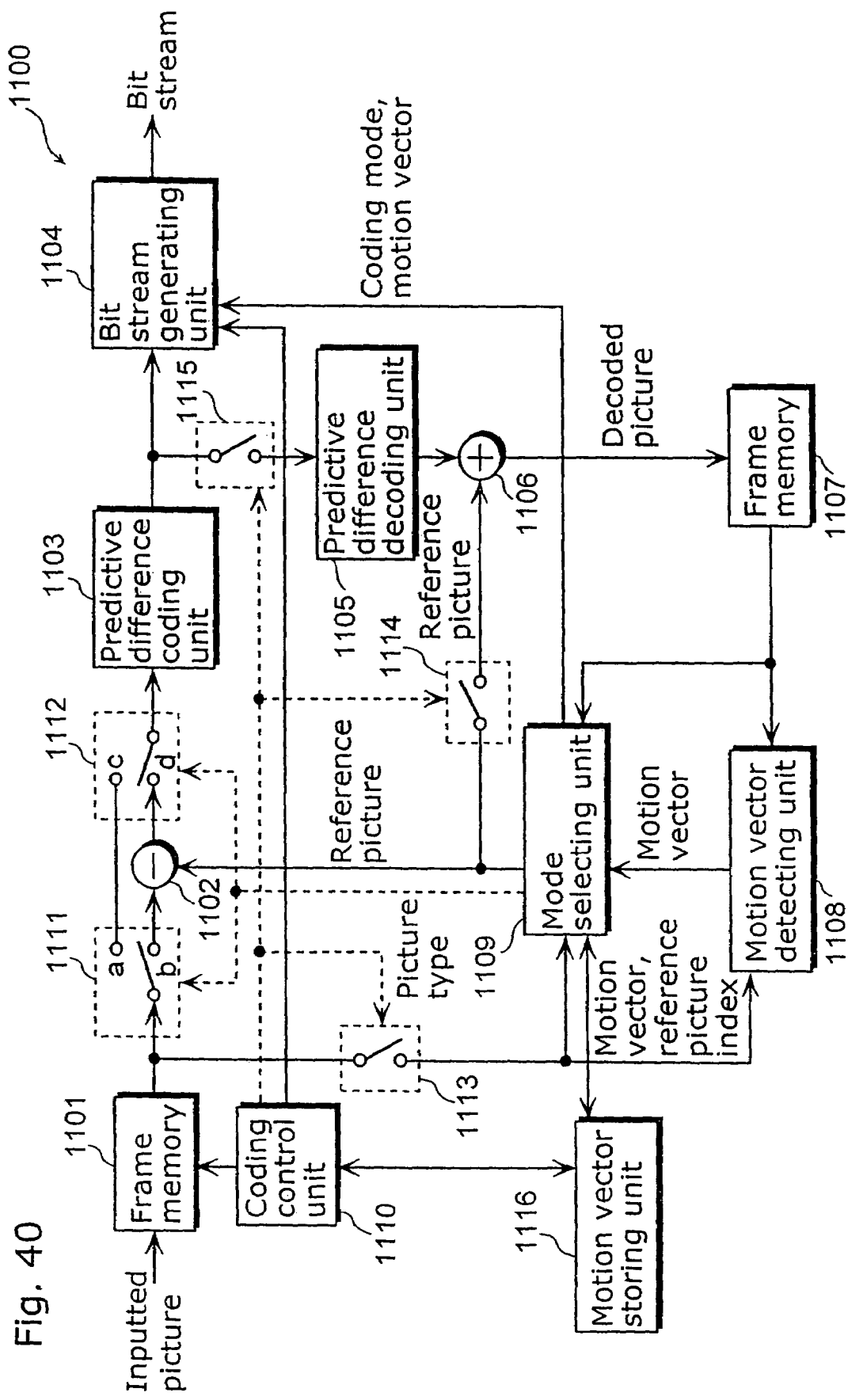
FIG. 40 is a block diagram showing a configuration of a moving picture coding apparatus 100 according to the eleventh embodiment of the present invention.

FIG. 40 is a block diagram showing a configuration of a moving picture coding apparatus 1100 according to the eleventh embodiment of the present invention. The moving picture coding apparatus 1100 is an apparatus which can code moving pictures by applying a spatial prediction method in the direct mode even if a block coded in a field structure and a block coded in a frame structure are mixed, and includes a frame memory 1101, a difference calculating unit 1102, a predictive difference coding unit 1103, a bit stream generating unit 1104, a predictive difference decoding unit 1105, an add operating unit 1106, a frame memory 1107, a motion vector detecting unit 1108, a mode selecting unit 1109, a coding control unit 110, a switch 1111, a switch 1112, a switch 1113, a switch 1114, a switch 1115 and a motion vector storing unit 1116.

The frame memory 1101 is a picture memory storing inputted pictures on picture basis. The difference calculating unit 1102 calculates prediction error, which is difference between an inputted picture from the frame memory 1101 and a reference picture obtained from a decoded picture based on a motion vector, and outputs it. The prediction difference coding unit 1103 performs frequency conversion for the prediction error obtained in the difference calculating unit 1102, quantizes and outputs it. The bit stream generating unit 1104 converts into a format of output coded bit stream after performing variable length coding of the coded result from the predictive difference coding unit 1103, and generates a bit stream adding additional information such as header information in which related information on the coded prediction error is described. The predictive difference decoding unit 1105 performs variable length coding and inverse quantization of the coded result from the predictive difference coding unit 1103, and after that performs inverse frequency conversion such as IDCT conversion after performing, and decodes the coded result to output predictive residual. The add operating unit 1106 adds a predictive residual as a decoded result, to the above-mentioned reference picture, and outputs a reference picture showing a same picture as an inputted picture by coded and decoded picture data. The frame memory 1107 is a picture memory storing reference pictures on picture basis.

The motion vector detecting unit 1108 derives a motion vector for every coding of a current frame to be coded. The mode selecting unit 1109 selects if calculation of a motion vector is performed in the direct mode or in other mode. The coding control unit 1110 reorders inputted pictures stored in the frame memory 1101 in input order to coding order. Additionally, the coding control unit 1110 judges which of a field structure or a frame structure is used for coding for every predetermined size of a current frame to be coded. Here, the predetermined size is a size of two macroblocks (for example, 16 (horizontal)×16 (vertical) pixels) combined vertically (hereinafter, macroblock pair). If a field structure is used for coding, a pixel value is read every other horizontal scanning line corresponding to interlace from the frame memory 1101, if a frame basis is used for coding, each pixel value in inputted picture is read sequentially from the frame memory 1101 and each read pixel value is placed on the memory in order to configure a current macroblock pair to be coded corresponding to the field structure or the frame structure. The motion vector storing unit 1116 stores a motion vector of a coded macroblock and reference indices of frames referred to by the motion vector. Reference indices are stored for each macroblock of coded macro block pairs.

Figure 42:
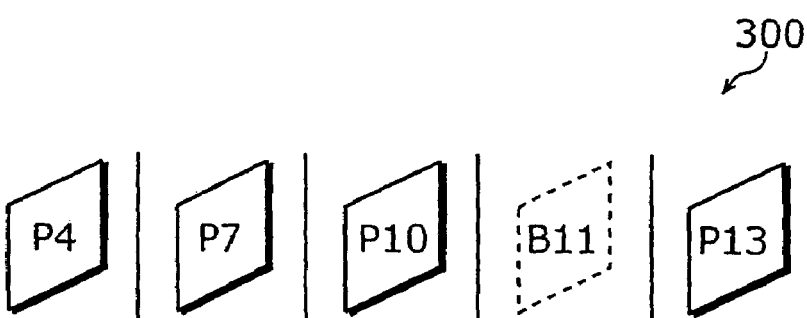
FIG. 42 is an illustration showing a structure of a reference picture list to explain the first embodiment.

Next, an operation of the moving picture coding apparatus configured as above is explained. Pictures to be inputted are inputted into the frame memory 1101 on picture basis in time order. FIG. 41A is an illustration showing an order of frames inputted into the moving picture coding apparatus 100 on picture basis in time order. FIG. 41B is an illustration showing an order of pictures reordering the order of pictures shown in FIG. 41A to coding order. In FIG. 41A, a vertical lines indicate pictures, and the number indicated on the lower right side each picture shows the picture types (I, P and B) with the first alphabet letters and the picture numbers in time order with following numbers. FIG. 42 is an illustration showing a structure of a reference frame list 300 to explain the eleventh embodiment. Each picture inputted into the frame memory 1101 is reordered in coding order by the coding control unit 1110. Pictures are reordered in coding order based on referential relation of an inter picture prediction coding, and in the coding order, a picture used as a reference picture is coded previously to a picture referring to a picture.

For example, it is assumed that a P picture uses one of preceding and neighboring three I or P pictures as a reference picture. On the other hand, it is assumed that a B picture uses one of preceding and neighboring three I or P pictures and one of following and neighboring I or P picture as a reference picture. Specifically, a picture P7 which is inputted after pictures B5 and B6 in FIG. 41A is reordered and placed before pictures B5 and B6 since the picture P7 is referred to by pictures B5 and B6. Likewise, a picture P10 inputted after pictures B8 and B9 is reordered and placed before pictures B8 and B9, and a picture P13 inputted after pictures B11 and B12 is reordered and placed before pictures B11 and B12. Hence, the result of reordering an order of pictures shown in FIG. 41A is as shown in FIG. 41B. It is assumed that each picture reordered by the frame memory 1101 is read on macroblock pair basis, and each macroblock pair is 16 (horizontal)×16 (vertical) pixels in size. Here a macroblock pair combines two macroblocks vertically. Therefore, a macroblock pair is 16 (horizontal)×32 (vertical) pixels in size. A process of coding a picture B11 is explained below. Note that in this embodiment it is assumed that the coding control unit 1110 controls reference indices, that is, a reference frame list.

Since the picture B11 is a B picture, inter picture prediction coding is performed using bi-directional reference. It is assumed that the picture B11 uses two of preceding pictures P10, P7, P4, and a following picture P13 as a reference picture. Additionally, it is assumed that selection of two pictures from these four pictures can be specified on macroblock basis. Here, it is assumed that reference indices are assigned using a method of initial condition. In other words, a reference frame list 300 during coding the picture B11 is as shown in FIG. 42. Regarding a reference picture in this case, the first reference picture is specified by the first reference index in FIG. 42 and the second reference picture is specified by the second reference index.

In a process for the picture B11, it is assumed that the coding control unit 1110 controls the switch 1113 to be on, the switches 1114 and 1115 to be off. Therefore, a macroblock pair in the picture B11 read from the frame memory 1101 is inputted into the motion vector detecting unit 1108, the mode selecting unit 109 and difference calculating unit 1102. In the motion vector detecting unit 108, by using decoded data of pictures P10, P7 and P4 stored in the frame memory 1107 as a reference picture, the first motion vector and the second motion vector of each macroblock contained in a macroblock pair is derived. In the mode selecting unit 1109, a coding mode for a macroblock pair is determined using motion vectors derived in the motion vector detecting unit 1108. Here, it is assumed that coding mode for a B picture may be selected from, for example, intra picture coding, inter picture prediction coding using uni-directional motion vector, inter picture prediction coding using bi-directional motion vector and a direct mode. When coding modes other than the direct mode are selected, it is determined which one of a frame structure or a field structure is used for coding a macroblock pair at the same time.

Figure 43A:
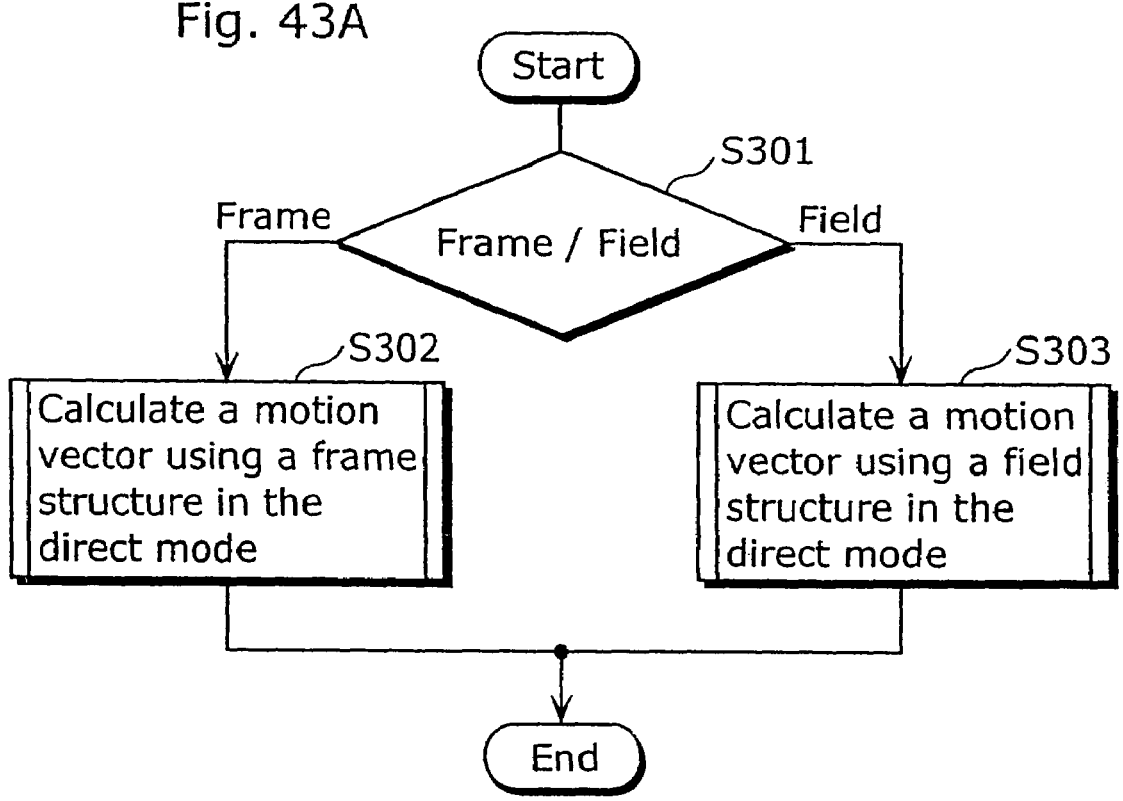
FIG. 43A is a flow chart showing an example of a motion vector calculation procedure using a spatial predicting method in the direct mode when a macroblock pair to be coded in a field structure and a macroblock pair to be coded in a frame structure are mixed.

Here, a motion vector calculation method using a spatial predicting method in the direct mode is explained. FIG. 43A is a flow chart showing an example of a motion vector calculation procedure using a spatial predicting method in the direct mode when a macroblock pair to be coded in a field structure and a macroblock pair to be coded in a frame structure are mixed.

Figure 43B:
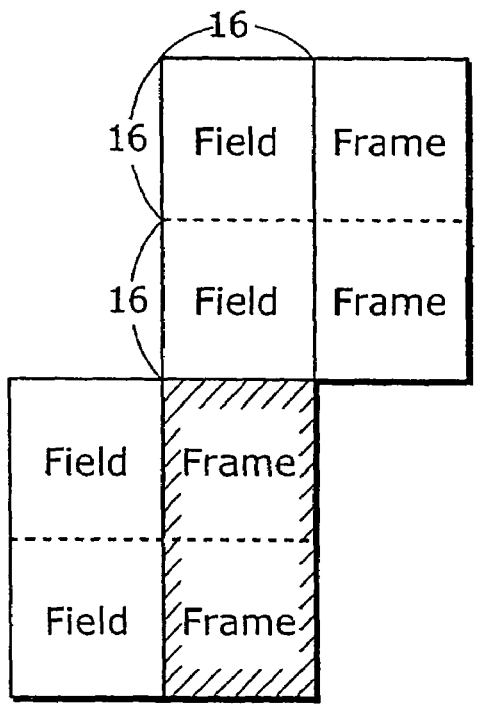
FIG. 43B is an illustration showing an example of a location of neighboring macroblock pairs to which the present invention is applied when a current macroblock pair to be coded is coded in a frame structure.
Figure 43C:
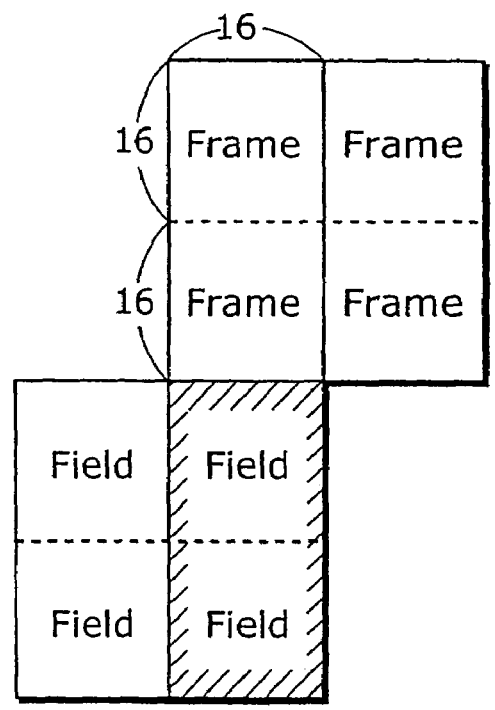
FIG. 43C is an illustration showing an example of location of neighboring macroblock pairs to which the present invention is applied when a current macroblock pair to be coded is coded in a field structure.

FIG. 43B is an illustration showing an example of a location of neighboring macroblock pairs to which the present invention is applied when a current macroblock pair to be coded is coded in a frame structure. FIG. 43C is an illustration showing an example of location of neighboring macroblock pairs to which the present invention is applied when a current macroblock pair to be coded is coded in a field structure. A macroblock pair diagonally shaded in FIGS. 43B and 43C is a current macroblock pair to be coded.

When a current macroblock pair to be coded is coded using a spatial prediction in the direct mode, three coded macroblock pairs in the neighbor of the current macroblock pair to be coded are selected. In this case, the current macroblock pair may be coded in either of a field structure and a frame structure. Therefore, the coding control unit 1110 first determines which one of a field structure or a frame structure is used for coding a current macroblock pair to be coded. For example, when the number of neighboring macroblock pairs coded in a field structure is great, a current macroblock pair is coded in a field structure, and if the number of neighboring macroblock pairs coded in a frame structure is great, a current macroblock pair is coded in a field structure. Thus, by determining which one of a field structure or a frame structure is used for coding a current macroblock pair to be coded by using information on neighboring blocks, it is not necessary to describe information showing which structure is used for coding a current macroblock pair to be coded in a bit stream. Additionally, since a structure is predicted from neighboring macroblock pairs, it is possible to select an adequate structure.

Next, the motion vector detecting unit 1108 calculates a motion vector of a current macroblock pair to be coded according to determination of the coding control 1110. First, the motion vector detecting unit 1108 checks which one of a field structure or a frame structure is determined to be used for coding by the control unit 110 (S301), and when the frame structure is determined to be used for coding, a motion vector of a current macroblock pair to be coded is derived using the frame structure (S302), and when the field structure is determined to be used for coding, a motion vector of the current macroblock pair to be coded is derived using the field structure (S303).

Figure 44:
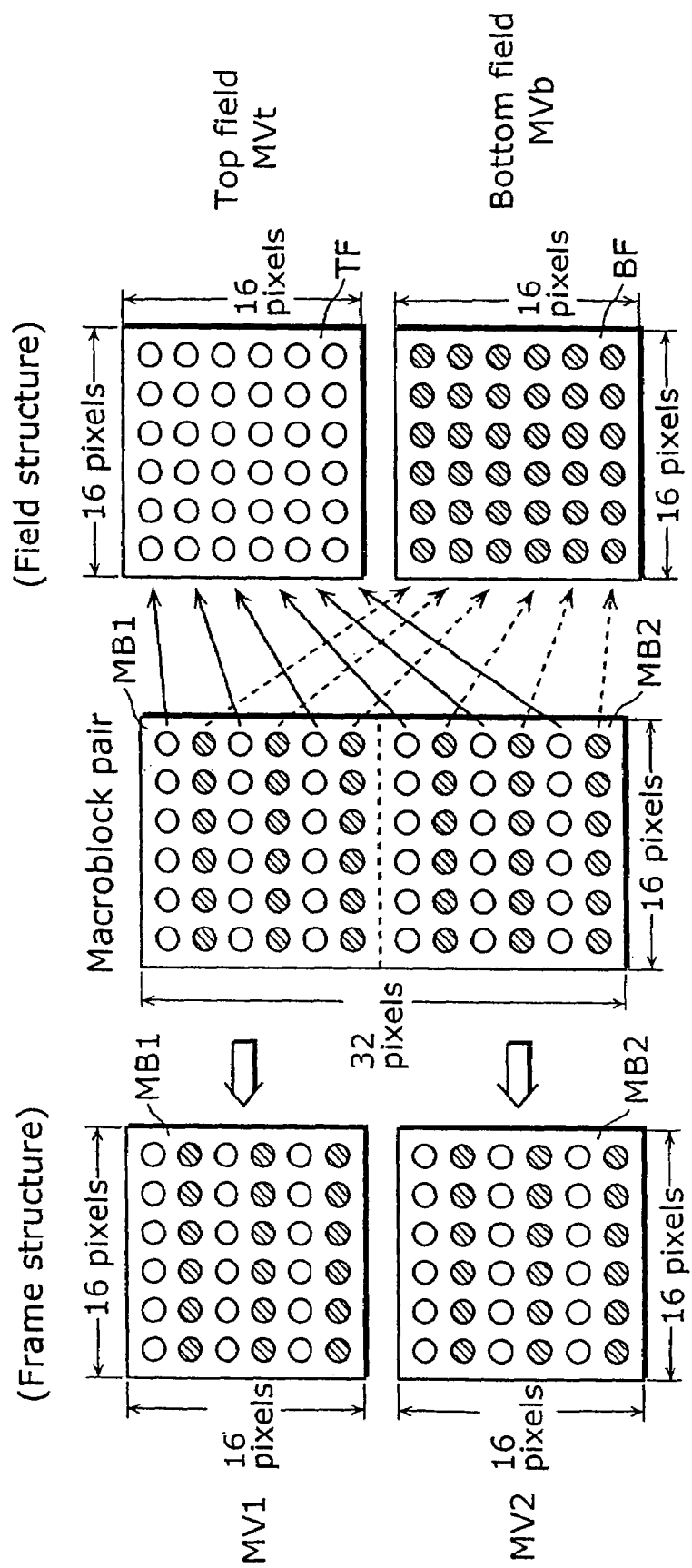
FIG. 44 is an illustration showing a data configuration of a macroblock pair when coding is performed in a frame structure, and a data configuration of a macroblock pair when coding is performed in a field structure.

FIG. 44 is an illustration showing a data configuration of a macroblock pair when coding is performed using a frame structure, and a data configuration of a macroblock pair when coding is performed using a field structure. In FIG. 44, a white circle indicates a pixel on odd-numbered horizontal scanning lines, and a black circle shaded with a hatch pattern of oblique lines indicates a pixel on even-numbered horizontal scanning lines. When a macroblock pair is cut from each frame showing an inputted picture, pixels on odd-numbered horizontal scanning lines and pixels on even-numbered horizontal scanning lines are placed alternately in a vertical direction as shown in FIG. 44. When the above-mentioned macroblock pair is coded in the frame structure, a process is performed every macroblock MB1 and every macroblock MB2 for the macroblock pair, and a motion vector is calculated for each of macroblocks MB1 and MB2 forming a macroblock pair. When the macroblock pair is coded in the field structure, the macroblock pair is divided into a macroblocks TF and BF. Here, the macroblock TF indicates a top field and the macroblock BF indicates a bottom field when interlacing a macroblock pair in a horizontal scanning line direction, and the two fields form a macroblock pair. Then one motion vector is calculated for the two fields respectively.

Figure 45:
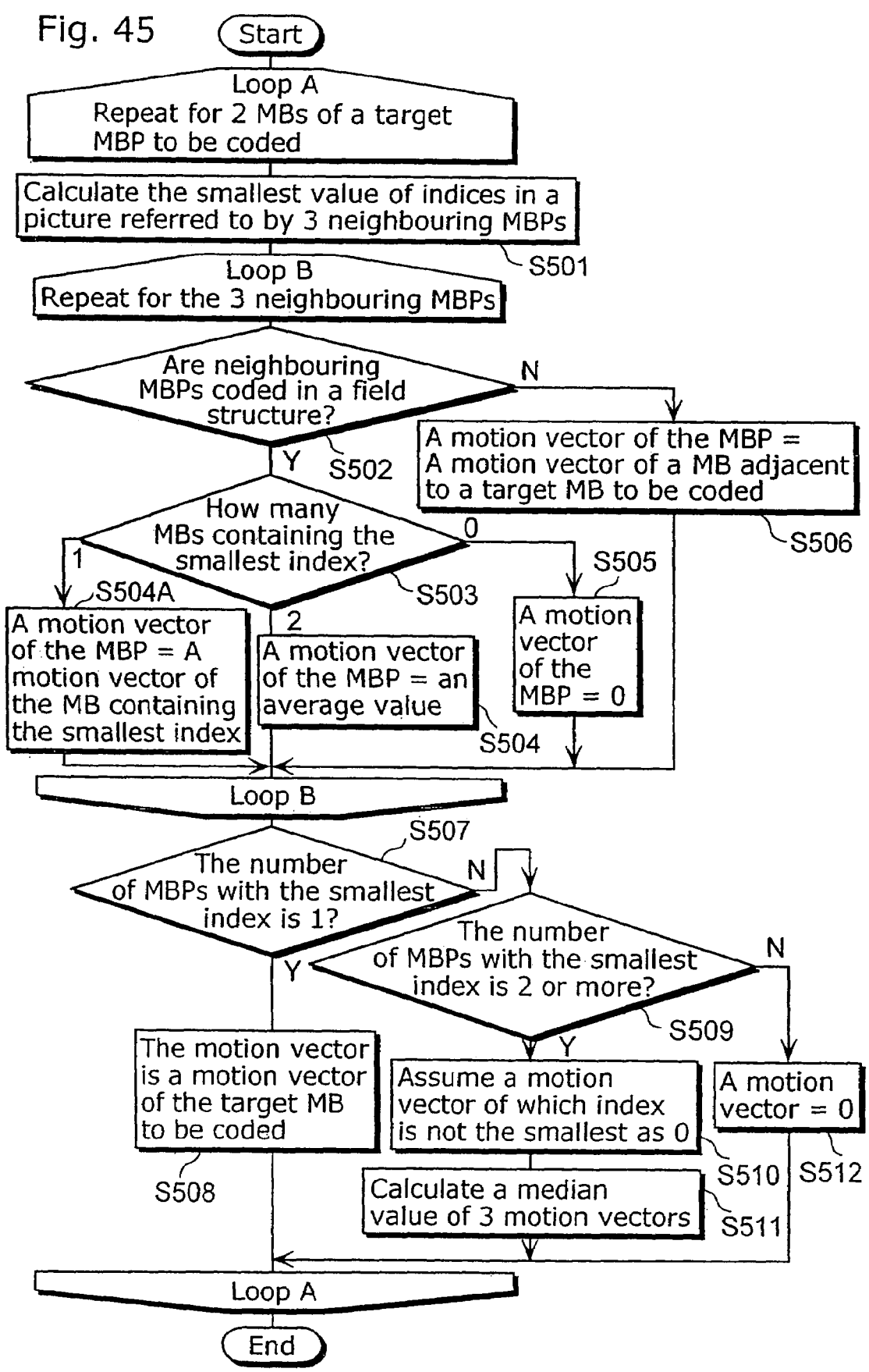
FIG. 45 is a flow chart showing a detailed processing procedure in a step S302 shown in FIG. 43.

Based on such a macroblock pair, the case that a current macroblock pair to be coded is coded in a frame structure is explained as shown in FIG. 43B. FIG. 45 is a flow chart showing a detailed processing procedure in a step S302 shown in FIG. 43. Note that in FIG. 45 a macroblock pair is indicated as MBP, and a macroblock is indicated as MB.

The mode selecting unit 1109 first calculates a motion vector of a macroblock MB1 (an upper macroblock), which is one of macroblocks forming a current macroblock pair to be coded, using a spatial prediction in the direct mode. First, the mode selecting unit 1109 calculates the smallest value of indices in pictures referred to by neighboring macroblock pairs for the first and the second indices respectively (S501). In this case, however, when a neighboring macroblock pair is coded in the frame structure, the value is determined using only a macroblock adjacent to a current macroblock to be coded. Next, it is checked if neighboring macroblock pairs are coded in the field structure (S502), and if coding is performed using the field structure, it is further checked the number of fields to which the smallest index are assigned in fields referred to by two macroblocks forming the neighboring macroblock pairs from a reference frame list in FIG. 42 (S503).

When the check result of the step S503 shows that the smallest index is assigned to either field referred to by the two macroblocks (that is, fields to which the same index is assigned), an average value of motion vectors of two macroblocks is calculated and made to be a motion vector of the neighboring macroblock pair. This is since, when considering based on a interlace structure, two macroblocks of neighboring macroblock pairs with the field structure are adjacent to a current macroblock to be coded with the frame structure.

When the check result of the step S503 shows that the smallest index is assigned to only a field referred to by one macroblock; a motion vector of the macroblock is determined as a motion vector of the neighboring macroblock pair (S504A). When the smallest index is assigned to none of fields referred to, a motion vector of the neighboring macroblock pair is assumed to be "0" (S505).

In above cases, from motion vectors of the neighboring macroblocks, by using only motion vectors referring to fields to which the smallest index is assigned, it is possible to select a motion vector with higher coding efficiency. A process in a step S505 shows that there is no adequate motion vector for prediction.

When the check result of the step S502 shows the neighboring macroblock pairs are coded in the frame structure, among the neighboring macroblock pairs, a motion vector of a macroblock adjacent to a current macroblock to be coded is determined as a motion vector of the neighboring macroblock pair (S506).

The mode selecting unit 1109 repeats processes from above steps S501 to S506 for selected three neighboring macroblock pairs. As a result, a motion vector is calculated for each of three neighboring macroblock pairs as for one macroblock of a current macroblock pair to be coded, for example, a macroblock MB1.

Next, the mode selecting unit 1109 checks if the number of neighboring macroblock pairs referring to a frame with the smallest index or a field of the frame among three neighboring macroblock pairs is 1 (S507).

In this case, the mode selecting unit 1109 unifies reference indices of three neighboring macroblock pairs to a reference frame index or a reference field index, and compares them. In a reference frame list shown in FIG. 42, reference indices are merely assigned to every frame, however, since relation between the reference frame indices and reference field indices to which indices are assigned every field are constant, it is possible to convert one of reference frame list or a reference field list into another reference indices by calculation.

Figure 46:
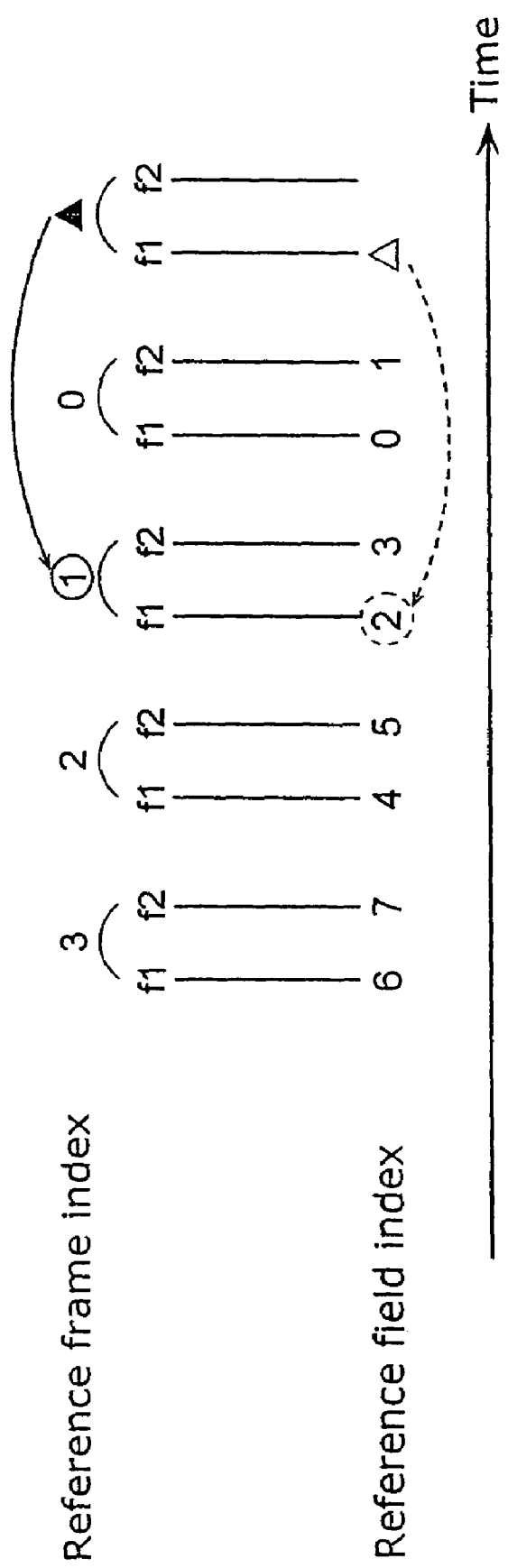
FIG. 46 is an indicator chart showing a relation between reference field indices and reference frame indices.

FIG. 46 is an indicator chart showing a relation between reference field indices and reference frame indices.

As shown in FIG. 46, there are several frames indicated by the first field f1 and the second field f2 in chronological order in a reference field list, and reference frame indices such as 0, 1, and 2 are assigned to each frame based on frames including a current block to be coded (frames shown in FIG. 46). In addition, reference field indices such as 0, 1 and 2 are assigned to the first field f1 and the second field f2 of each frame based on the first field f1 of a frame including a current block to be coded (when the first field is a current field to be coded). Note that the reference field indices are assigned from the first field f1 and the second field f2 of a frame close to a current field to be coded. Here, if the current block to be coded is the first field f1, the indices are assigned giving priority to the first field f1, and if the current block to be coded is the second field f2, the indices are assigned giving priority to the second field f2.

For example, when a neighboring macroblock coded in the frame structure refers to a frame with a reference frame index "1" and a neighboring macroblock coded in the field structure refers to the first field f1 with a reference field index "2", the above-mentioned neighboring macroblocks are treated as they refer to a same picture. In other words, when a precondition that a reference frame index referred to by one neighboring macroblock is equal to half the reference field index (round down after decimal point) assigned to a reference field of another neighboring macroblock is satisfied, the neighboring macroblocks are treated as they refer to a same picture.

For example, when a current block to be coded included in the first field f1 indicated by Δ in FIG. 46 refers to the first field f1 with the reference field index "2", and a neighboring macroblock with the frame structure refers to a frame with the reference frame index "1", the above-mentioned neighboring blocks are treated as they refer to a same picture since the above-mentioned precondition is satisfied. On the other hand, when a neighboring macroblock refers to the first field with a reference field index "2" and other neighboring macroblock refers to a frame with a reference frame index "3", the neighboring blocks are treated as they do not refer to a same picture since the precondition is not satisfied.

As mentioned above, if the check result of the step S507 shows the number is 1, a motion vector of a neighboring macroblock pair referring to a field a frame with the smallest index or a field in the frame is determined as a motion vector of a current macroblock to be coded (S508). If the check result of the step S507 shows the number is not 1, it is further checked if the number of neighboring macroblock pairs of three neighboring macroblock pairs referring to a frame with the smallest index or a field in the frame is 2 or more (S509). Then if the number is 2 or more, assuming that a motion vector of neighboring macroblock pairs not referring to a frame with the smallest index or a field in the frame is "0" (S510), a median value of three motion vectors of the neighboring macroblock pairs is determined as a motion vector of a current macroblock to be coded (S511). If the check result of the step S509 is less than 2, since the number of the neighboring macroblock pairs referring to the frame with the smallest index or the field in the frame is "0", a motion vector of a current macroblock to be coded is determined as "0" (S512).

As a result of the above process, one motion vector MV1 can be obtained as a calculation result for a macroblock forming a current macroblock pair to be coded, for example, MB1. The mode selecting unit 109 performs the above process for a motion vector with the second reference index, and performs motion compensation by bi-prediction using the two obtained motion vectors. However, when none of neighboring macroblocks contains the first or the second motion vector, motion compensation is performed not using a motion vector in the direction indicated by a motion vector not contained in the neighboring macroblocks but using a motion vector in uni-direction. Moreover, the same process is repeated for the other macroblock in the current macroblock pair to be coded, for example, MB2. As a result, it is equal to perform motion compensation in the direct mode for each of two macroblocks in a current macroblock pair to be coded.

Figure 47:
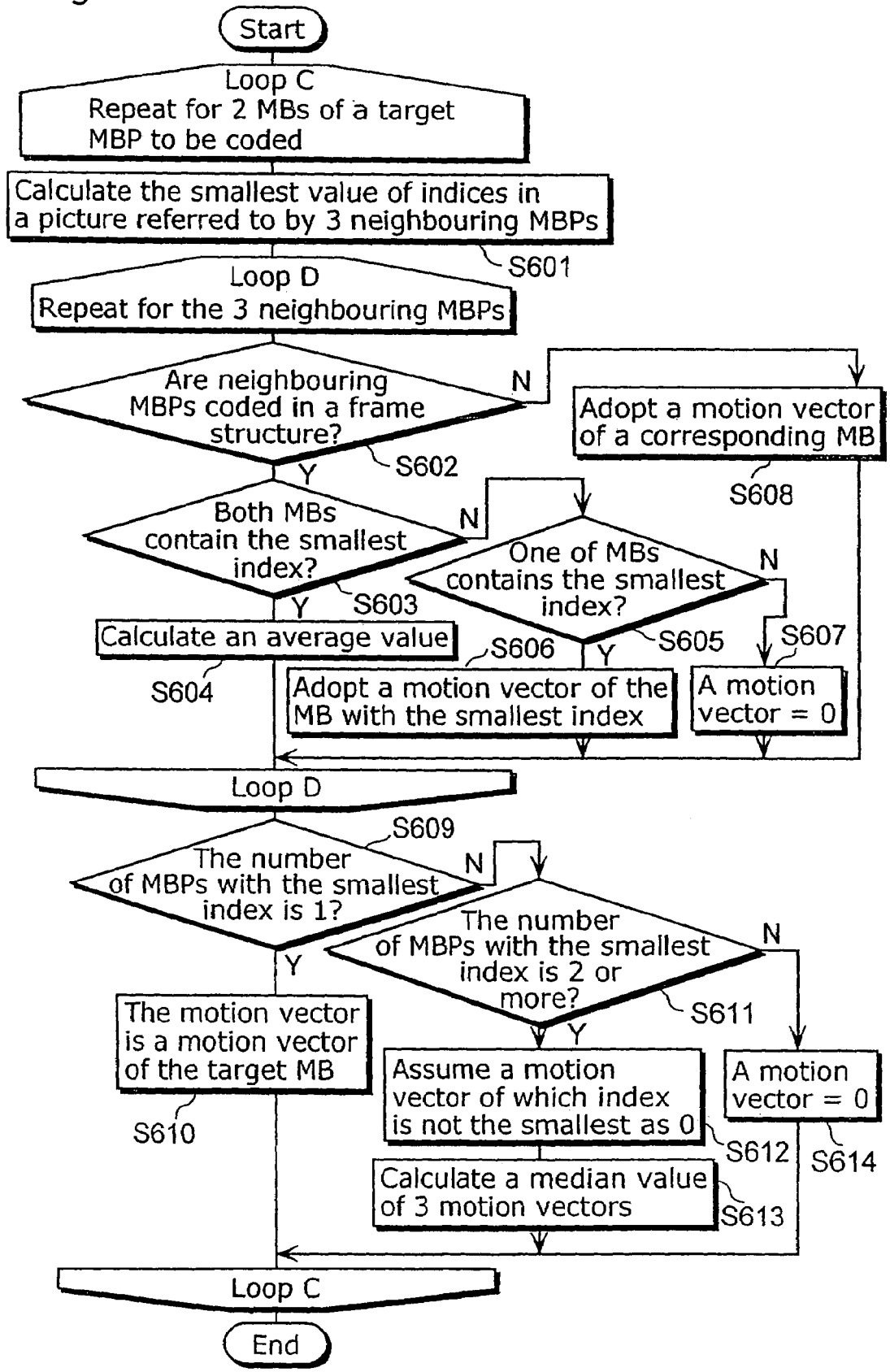
FIG. 47 is a flow chart showing a detailed processing procedure in a step S303 shown in FIG. 43.

Next, the case that a current macroblock pair to be coded is coded in the field structure as shown in FIG. 43C is explained. FIG. 47 is a flow chart showing a detailed processing procedure in a step S303 shown in FIG. 43. The mode selecting unit 1109 calculates one motion vector MVt using a spatial prediction in the direct mode for a macroblock forming a current macroblock pair to be coded, for example, a macroblock TF corresponding to a top field of the macroblock pair. First, the mode selecting unit 1109 calculates the smallest value of indices in pictures referred to by neighboring macroblock pairs (S601). However, when the macroblock pairs are processed by the field structure, only a macroblock of a field (a top field or a bottom field) same as the current macroblock to be coded is considered. Next, it is checked if the neighboring macroblock pairs are coded by the frame structure (S602), and if coding is performed using the frame structure, it is further judged if frames referred to by two macroblocks in the neighboring macroblock pair are frames with the smallest index based on the index value assigned to each frame by a reference frame list 300 (S603).

If the check result of the step S603 shows that the smallest index is assigned to either of the frames referred to by the two macroblocks, an average value of motion vectors of the two macroblocks is calculated, and the calculation result is determined as a motion vector of the neighboring macroblock pair (S604). If the check result of the step S603 shows that one or both of the frames referred to are not frames with the smallest index, it is further checked if a frame referred to by either of macroblocks contains the smallest index (S605). If the check result shows that the smallest index is assigned to a frame referred to by one of macroblocks, a motion vector of the macroblock is determined as a motion vector of the neighboring macroblock pair (S606). On the other hand, if the check result of the step S605 shows that none of macroblocks refers to a frame with the smallest index, a motion vector of the neighboring macroblock pair is determined as "0" (S607). In above cases, from motion vectors of the neighboring macroblocks, by using only motion vectors referring to frames to which the smallest index is assigned, it is possible to select a motion vector with higher coding efficiency. A process in a step S607 shows that there is no adequate motion vector for prediction.

When the check result of the step S602 shows the neighboring macroblock pairs are coded in the field structure, in the neighboring macroblock pair, motion vectors of the whole neighboring macroblock pair is determined as a motion vector of the macroblock pair corresponding to a current macroblock in a current macroblock pair to be coded (S608). The mode selecting unit 109 repeats processes from above steps S601 to S608 for selected three neighboring macroblock pairs. As a result, it is equal to obtain a motion vector for three neighboring macroblock pairs respectively as for a macroblock of the current macroblock pair to be coded, for example, a macroblock TF.

Next, the motion vector detecting unit 108 checks if the number of neighboring macroblock pairs referring to a frame with the smallest index among three neighboring macroblock pairs is 1 (S609). If it is 1, a motion vector of a neighboring macroblock pair referring to a frame with the smallest index is determined as a motion vector of the current macroblock to be coded (S610). If the check result of the step S609 shows the number is not 1, it is further checked if the number of neighboring macroblock pairs referring to a frame with the smallest index among three neighboring macroblock pairs is two or more (S611). Then if the number is two or more, assuming that a motion vector of neighboring macroblock pairs not referring to a frame with the smallest index is "0" (S612), a median value of three motion vectors of neighboring macroblock pairs is determined as a motion vector of the current macroblock to be coded (S613). If the check result of the step S611 is less than 2, since the number of neighboring macroblock pairs referring to a frame with the smallest index is "0", a motion vector of the current macroblock to be coded is determined as "0" (S614).

As a result of the above process, a motion vector MVt can be obtained as a calculation result for a macroblock forming a current macroblock pair to be coded, for example, a macroblock TF corresponding to a top field. The mode selecting unit 109 repeats the above process also for the second motion vector (corresponding to the second reference index). As for a macroblock TF, two motion vectors can be obtained by above process, and motion compensation is performed using the two motion vectors. However, when none of neighboring macroblocks contains the first or the second motion vector, motion compensation is performed not using a motion vector in the direction indicated by a motion vector not contained in the neighboring macroblocks but using a motion vector in uni-direction. This is because when a neighboring macroblock pair refers to only uni-directionlly, it is conceivable that coding efficiency becomes higher when a neighboring macroblock pair also refers to only uni-direction.

Moreover, the same process is repeated for another macroblock in the current macroblock pair to be coded, for example, BF corresponding to a bottom field. As a result, it is equal to perform motion compensation in the direct mode for each of two macroblocks in the current macroblock pair to be coded, for example, the macroblocks TF and BF.

Note that in the above cases, when a coding structure for a current macroblock pair to be coded and a coding structure for a neighboring macroblock pair are different, a calculation is performed by a process such as calculating an average value of motion vectors of two macroblocks in the neighboring macroblock pair, however, the present invention is not limited to the above cases. For example, only when a coding structure for a current macroblock pair to be coded and a neighboring macroblock pair are the same, a motion vector of the neighboring macroblock pair may be used, and when a coding structure for a current macroblock pair to be coded and a neighboring macroblock pair are different, a motion vector of the neighboring macroblock pair of which coding structure is different is not used. Specifically, 1. When a current macroblock pair to be coded is coded in the frame structure, only a motion vector of a neighboring macroblock pair coded in the frame structure is used. In this case, when none of motion vectors of the neighboring macroblock pair coded in the frame structure refers to a frame with the smallest index, a motion vector of the current macroblock pair to be coded is determined as "0". When a neighboring macroblock pair is coded in the field structure, a motion vector of the neighboring macroblock pair is determined as "0".

Next, 2. When a current macroblock pair to be coded is coded in the field structure, only a motion vector of a neighboring macroblock pair coded in a field structure is used. In this case, when none of motion vectors of the neighboring macroblock pair coded in the field structure refers to a frame with the smallest index, a motion vector of the current macroblock pair to be coded is determined as "0". When a neighboring macroblock pair is coded in the frame structure, a motion vector of the neighboring macroblock pair is determined as "0". Thus, after calculating a motion vector of each neighboring macroblock pair, 3. When the number of motion vectors obtained by referring to a frame with the smallest index or a field in the frame among these motion vectors is only one, the motion vector is determined as a motion vector of a current macroblock pair in the direct mode, and if the number is not 1, a median value of three motion vectors is determined as a motion vector of the current macroblock pair in the direct mode.

Additionally, in the above cases, which one of a field structure or a frame structure is used for coding a current macroblock pair to be coded is determined based on the majority of a coding structure of coded neighboring macroblock pairs, however, the present invention is not limited to the above case. A coding structure may be fixed, for example, a frame structure is always used for coding in the direct mode, or a field structure is always used for coding in the direct mode. In this case, for example, when the field structure and the frame structure are switched for an every current frame to be coded, it may be described in a header of whole bit stream or in a frame header of every frame. Switching is performed, for example, on sequence basis, GOP basis, picture basis, and slice basis, and in this case, it may be described in a corresponding header of a bit stream or the like. Needless to say, even in the above cases, only when coding structures used for a current macroblock pair to be coded and a neighboring macroblock pair are the same, a motion vector of the current macroblock pair to be coded in the direct mode can be calculated by a method using a motion vector of the neighboring macroblock pair. In addition, when transmitting in such as packets, a header part and a data part may be separated and transmitted respectively. In this case, the header part and the data part are never included in one bit stream. However, as for packets, although a transmission order can be more or less out of sequence, a header part corresponding to a corresponding data part is just transmitted in other packet, and there is no difference even if it is not included in one bit stream. Thus, through fixing which one of the frame structure or the field structure is used, a process for determining a coding structure by using information of neighbor becomes unnecessary, and a process can be simplified.

In addition, in the direct mode, after processing a current macroblock pair using both the frame structure and the field structure, a coding structure with higher coding efficiency may be selected. In this case, it may be described which one of the frame structure and the field structure is selected in a header part of a macroblock pair under coding. Needless to say, even in the above cases, only when coding structures used for a current macroblock pair to be coded and a neighboring macroblock pair are the same, a motion vector of the current macroblock pair to be coded in the direct mode can be calculated by a method using a motion vector of the neighboring macroblock pair. By using such a method, information showing which one of the frame structure or the field structure is used becomes necessary in a bit stream, however, it is possible to reduce residual data for motion compensation and coding efficiency can be improved.

Figure 48A:
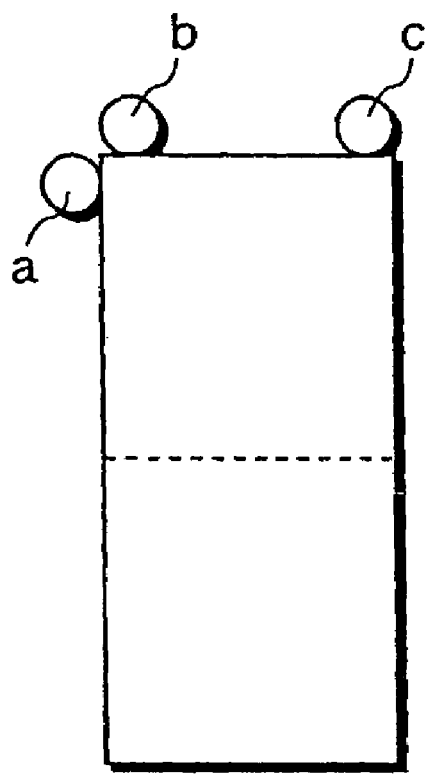
FIG. 48 is an illustration showing a relation of position between a current macroblock pair to be coded and neighboring macroblock pairs in order to explain the first embodiment.
Figure 48B:
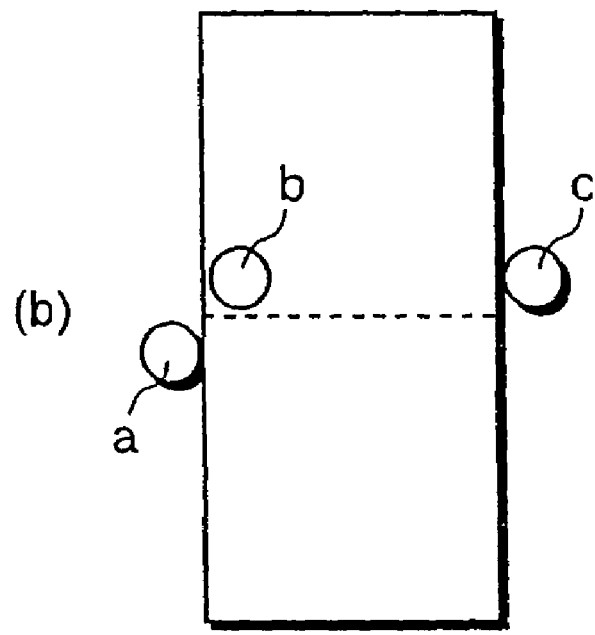
Figure 49A:
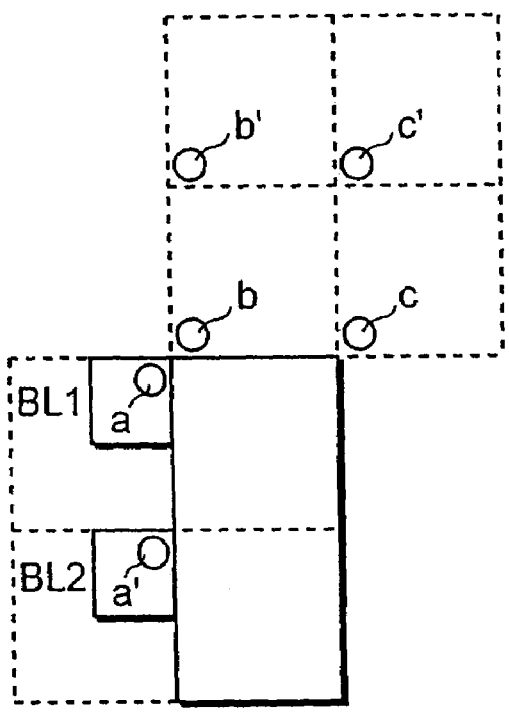
FIG. 49 is an illustration showing a positional relation between a current macroblock pair to be coded and neighboring macroblock pairs in order to explain the first embodiment.
Figure 49B:
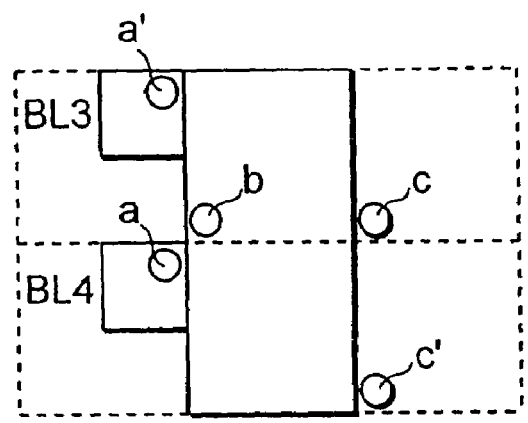

In the above explanation, the case that motion compensation is performed for neighboring macroblock pairs on macroblock size basis, however, motion compensation may be performed on a different size basis. In this case, as shown in FIGS. 48A and 48B, a motion vector containing pixels located on a, b and c is used as a motion vector of neighboring macroblock pair for each macroblock of a current macroblock pair to be coded. FIG. 48A shows the case processing an upper macroblock, and FIG. 48B shows the case processing a lower macroblock. When structures (a frame structure/a field structure) for a current macroblock pair and neighboring macroblock pairs are different, a process is performed using a block including pixels located on a, b and c, and a block including pixels located on a', b' and c' as shown in FIGS. 49A and 49B. Here, locations a', b' and c' are a block included in another macroblock in the same macroblock pair corresponding to locations of pixels a, b, and c. For example, in the case of FIG. 49A, when coding structures (a frame structure/a field structure) for a current macroblock pair and neighboring macroblock pairs are different, a motion vector of a block on the left side of an upper current macroblock to be coded is determined using motion vectors of BL1 and BL2. In the case of FIG. 49B, when coding structures (a frame structure/a field structure) for a current macroblock pair and neighboring macroblock pairs are different, a motion vector of a block on the left side of an upper current macroblock to be coded is determined using motion vectors of BL3 and BL4. By using such a processing method, even if motion compensation is performed for neighboring macroblock on a size basis using a different size from a macroblock, a process in the direct mode can be performed in consideration of the difference of the frame structure and the field structure.

Moreover, when motion compensation is performed for neighboring macroblock on a size basis different from a macroblock, by calculating an average value of motion vectors of a block included in the macroblock, the calculated value may be a motion vector of the macroblock. Even if motion compensation is performed for neighboring macroblocks on a size basis using a different size from a macroblock, a process in the direct mode can be performed in consideration of the difference of a frame structure and a field structure.

Figure 50:
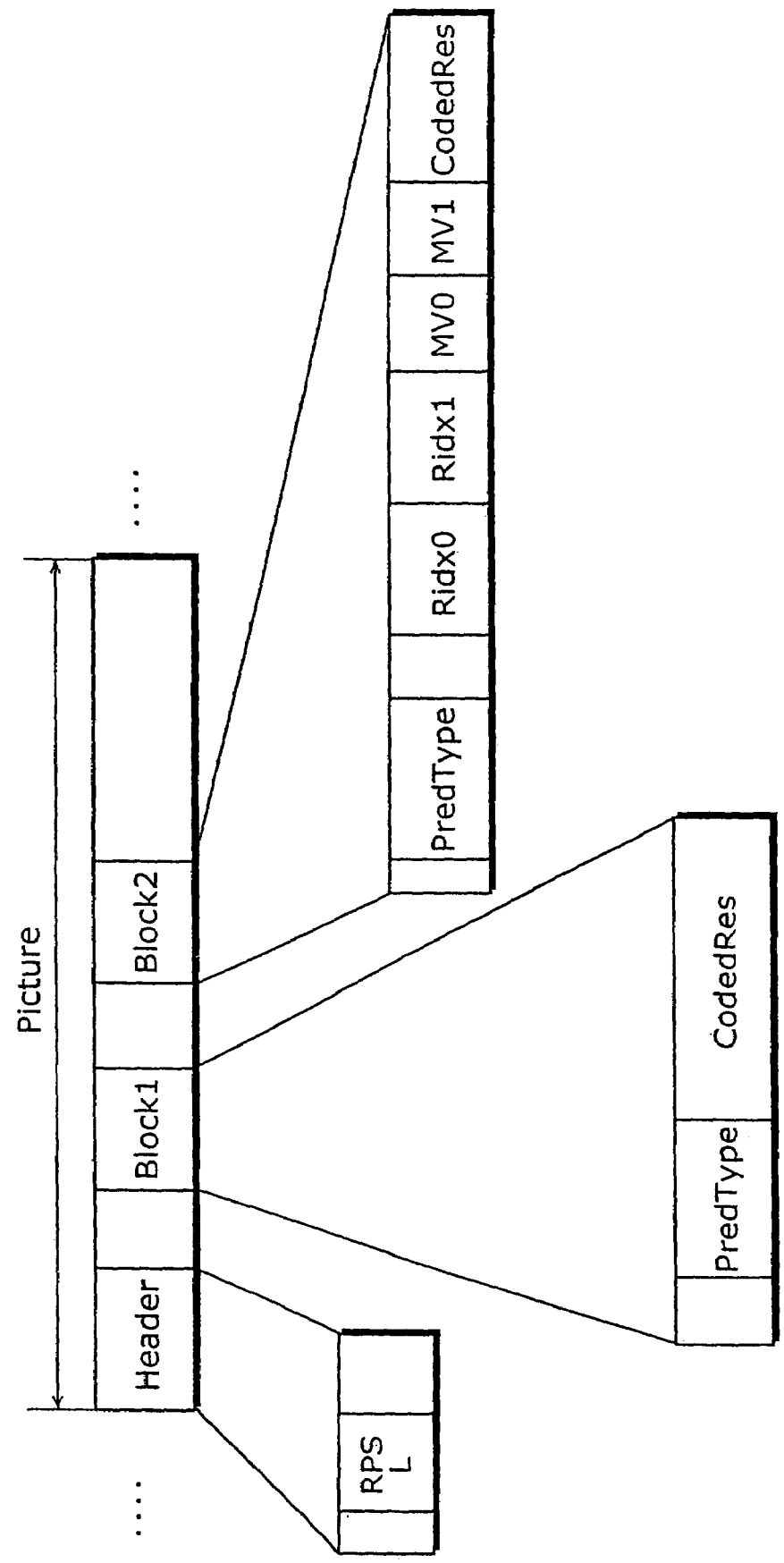
FIG. 50 is an illustration showing an example of a data configuration of a bit stream 700 generated by a bit stream generating unit 104.

By the way, as mentioned above, a motion vector is derived, and inter picture prediction coding is performed based on the derived motion vector. As a result, the motion vector derived in the motion vector detecting unit 108 and the coded predictive error picture are stored in a bit stream on macroblock basis. However, as for a motion vector of a macroblock coded in the direct mode, it is merely described that it is coded in the direct mode, and the motion vector and reference indices are not described in a bit stream. FIG. 50 is an illustration showing an example of a data configuration of a bit stream 700 generated by a bit stream generating unit 104. As shown FIG. 50, in the bit stream 700 generated by the bit stream generating unit 104, a Header is provided for every Picture. The Header contains, for example, items such as an item RPSL showing the change of a reference frame list 10, and an item showing a picture type of the picture and not shown in this figure, and when an assignment method of the first reference index 12 and the second reference index 13 in the frame list 10 is changed form initial settings, an assignment method after change is described in the item RPSL.

On the other hand, coded predictive error is recorded on macroblock basis. For example, when a macroblock is coded using a spatial prediction in the direct mode, a motion vector of the macroblock is not described in an item Block1, and information showing a coding mode is the direct mode is described in an item PredType. Here, the item Block1 is an item in which a predictive error corresponding to the macroblock is described, and the item PredType shows a coding mode of the macroblock. When it is selected which one of the frame structure or the field structure is used for coding from the viewpoint of the above-mentioned coding efficiency, information showing the choice between the frame structure and the field structure is described. Subsequently, coded predictive error is described in an item CodedRes. When another macroblock is a macroblock coded in an inter picture prediction coding mode, it is described in the item PredType in an item Block2 that a coding mode for the macroblock is the inter prediction coding mode. Here, the item CodeRes shows a coding mode described and the item PredType is an item in which a predictive error corresponding to the macroblock is described. In this case, the first reference index 12 of the macroblock is further described in an item Ridx0, and the second reference index 13 is further described in an item Ridx1 other than the coding mode. Reference indices in a block are represented by variable length code words, and the shorter code length is assigned to the smaller value. Subsequently, a motion vector of the macroblock during forward frame reference is described in an item MV0, and a motion vector during backward frame reference is described in an item MV1. Then coded predictive error is described in the item CodeRes.

Figure 51:
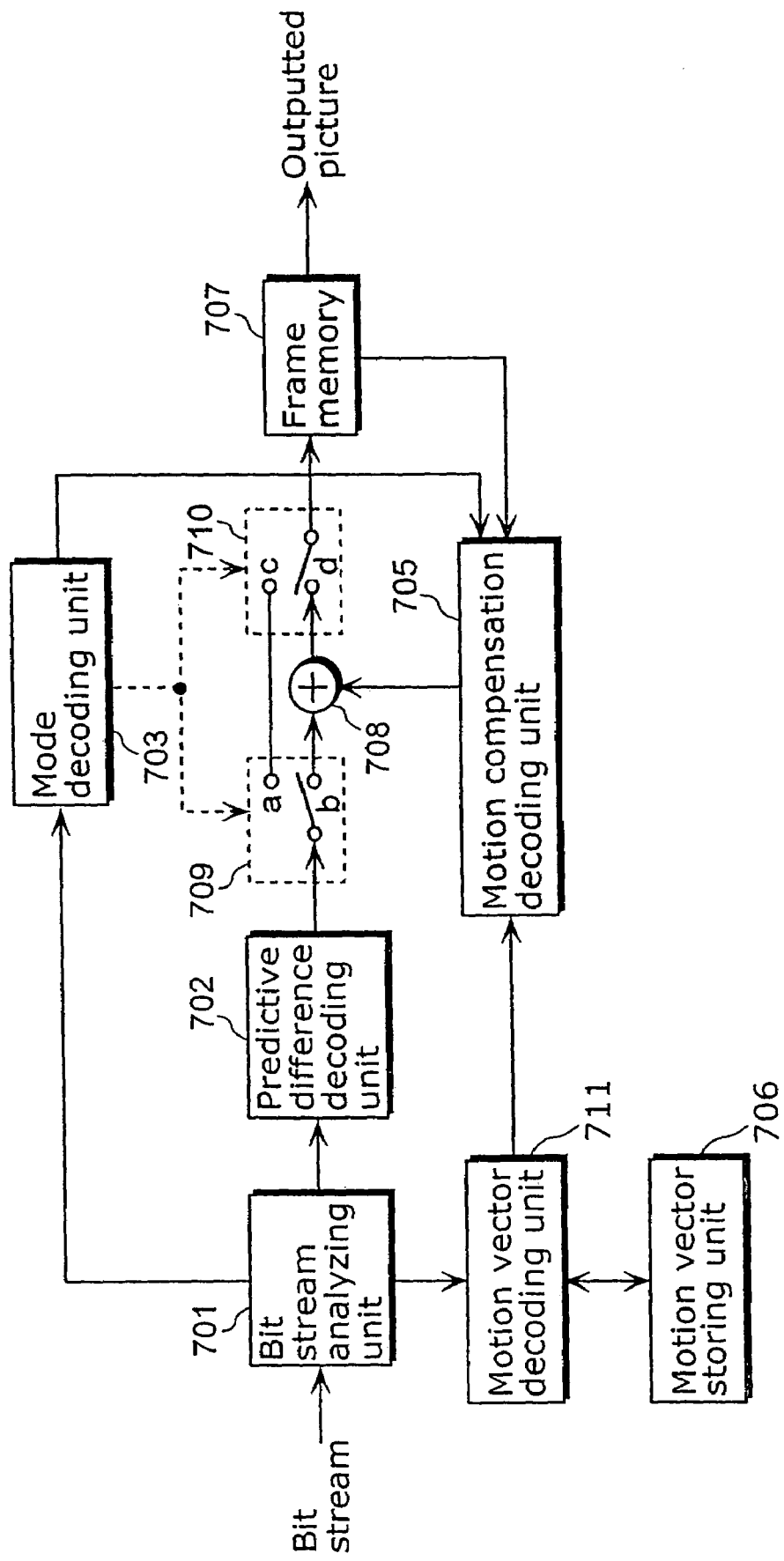
FIG. 51 is a block diagram showing a configuration of a moving picture decoding apparatus 800 which decodes the bit stream 700 shown in FIG. 50.

FIG. 51 is a block diagram showing a configuration of a moving picture decoding apparatus 800 which decodes the bit stream 700 shown in FIG. 50. The moving picture decoding apparatus 800 is a moving picture decoding apparatus which decodes the bit stream 700 in which a predictive error including a macroblock coded in the direct mode is described, and includes a bit stream analyzing unit 701, a predictive difference decoding unit 702, a mode decoding unit 703, a motion compensation decoding unit 705, a motion vector storing unit 706, a frame memory 707, an add operating unit 708, switches 709 and 710, and a motion vector decoding unit 711. The bit stream analyzing unit 701 extracts various data from inputted bit stream 700. Here, various data includes information such as information on a coding mode and information on a motion vector or the like. Extracted information on a coding mode is outputted to the mode decoding unit 703. On the other hand, extracted information on a motion vector is outputted to the motion vector decoding unit 705. Furthermore, extracted predictive difference coding data is outputted to the predictive difference decoding unit 702. The predictive difference decoding unit 702 decodes inputted predictive difference coding data and generates a predictive difference picture. Generated predictive difference picture is outputted to the switch 709. For example, when the switch 709 is connected to a terminal b, a predictive difference picture is outputted to the add operating unit 708.

The mode decoding unit 703 controls the switches 709 and 710 referring to a coding mode information extracted form a bit stream. When a coding mode is intra picture coding mode, the mode decoding unit 703 controls to connect the switch 709 with a terminal a and to connect the switch 710 with a terminal c. Moreover, the mode decoding unit 703 outputs a coding mode information to the motion compensation decoding unit 705 and the motion vector decoding unit 711. The motion vector decoding unit 711 decodes a coded motion vector inputted from the bit stream analyzing unit 701. Decoded reference picture number and a decoded motion vector are stored in the motion vector storing unit 706 and outputted to the motion vector compensation decoding unit 705 at the same time.

When a coding mode is the direct mode, the mode decoding unit 703 controls to connect the switch 709 with the terminal b and to connect the switch 710 with a terminal d. Moreover, the mode decoding unit 703 outputs a coding mode information to the motion compensation decoding unit 705 and the motion vector decoding unit 711. The motion vector decoding unit 711 determines a motion vector to be used in the direct mode using a motion vector of neighboring macroblock pair and a reference picture number stored in the motion vector storing unit 706, when a coding mode is the direct mode. Since the method for determining a motion vector is same as the contents explained for the operation of the mode selecting unit 109 shown in FIG. 40, the explanation will be omitted here.

Based on decoded reference picture number and decoded motion vector, the motion compensation decoding unit 705 obtains a motion compensation picture on macroblock basis from the frame memory 707. The obtained motion compensation picture is outputted to the add operating unit 708. The frame memory 707 is a memory storing decoding pictures on frame basis. The add operating unit 708 adds inputted predictive difference picture to a motion compensation picture, and generates a decoded picture. The generated decoded picture is outputted to the frame memory 707.

As mentioned above, according to this embodiment, even if a neighboring macroblock pair coded by a frame structure and a neighboring macroblock pair coded by a field structure are mixed in coded neighboring macroblock pairs corresponding to a current macroblock pair to be coded include in a spatial prediction method in the direct mode, a motion vector can be easily calculated.

Note that in the above embodiment, the case that each picture is processed on macroblock pair (connecting two macroblocks vertically) basis using either a frame structure or a field structure is explained, however, a process may be performed by switching a frame structure and a field structure on a different basis, for example, on macroblock basis.

Moreover, in above embodiment, the case that a macroblock in a B picture is processed in the direct mode, however, a macroblock in a P picture can be processed likewise. When coding and decoding a P picture, each block performs motion compensation from only one picture, and a reference frame list is only one. Therefore, in order to perform the process same as this embodiment in a P picture, the process calculating two motion vectors of a current block to be coded/decoded (the first reference frame and the second reference frame) in this embodiment may be changed to a process calculating one motion vector.

In addition, in the above embodiment, the case that predictive generation of a motion vector used in the direct mode is performed using motion vectors of three neighboring macroblock pairs is explained, however, the number of neighboring macroblock pairs to be used may be different. For example, a case using only a motion vector of a neighboring macroblock pair located on the left side is conceivable.

Twelfth Embodiment

Through storing a program to realize a configuration of the picture coding method and the picture decoding method mentioned in the above embodiment on a storage medium such as a flexible disk, it becomes possible to easily perform the process mentioned in the above embodiment on an independent computer system.

FIG. 52 is an illustration explaining a storage medium which stores a program to realize the picture coding method and the decoding method of the above first embodiment through eleventh embodiment on a computer system.

Figure 52A:
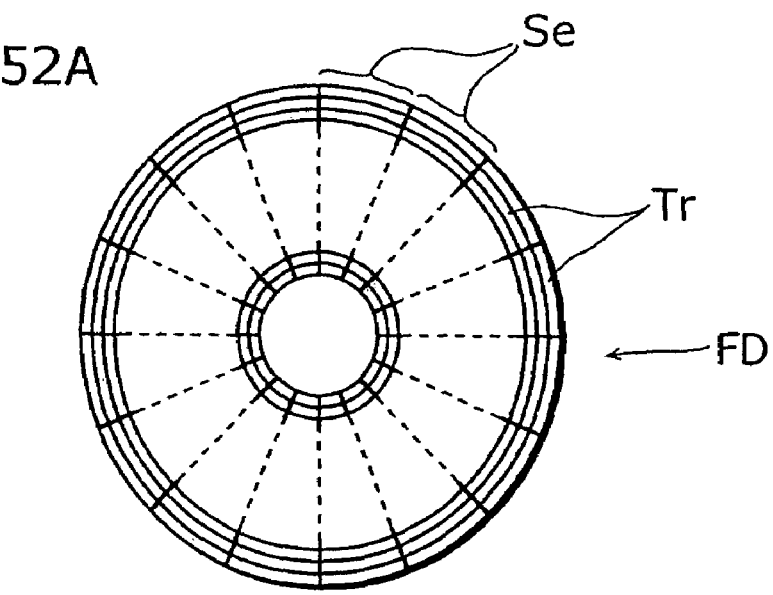
FIG. 52A is an illustration showing an example of a physical format of a flexible disk which is a body of a storage medium.
Figure 52B:
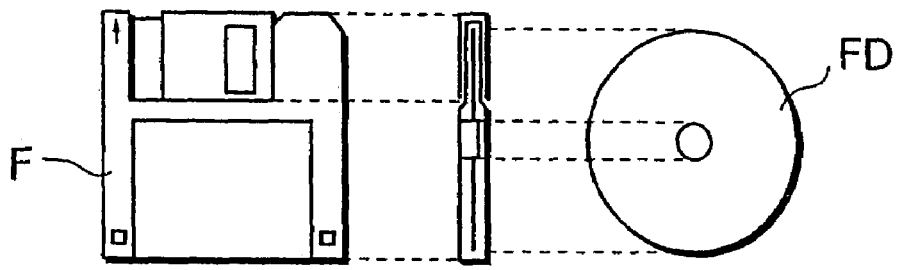
FIG. 52B is an illustration showing an external view of the flexible disk viewed from the front, a configuration of the section and the flexible disk.

FIG. 52B shows an external view of the flexible disk viewed from the front, a configuration of a cross section and the flexible disk, and FIG. 52A shows an example of a physical format of a flexible disk as a body of storage medium. A flexible disk FD is contained in a case F, and plural tracks Tr are formed concentrically on the surface of the disk from outer to inner radius, and each track is divided into 16 sectors Se in angular direction. Therefore, as for the flexible disk storing the above-mentioned program, a picture coding method and a picture decoding method as the above program are stored in an allocated area on the above-mentioned flexible disk FD.

Figure 52C:
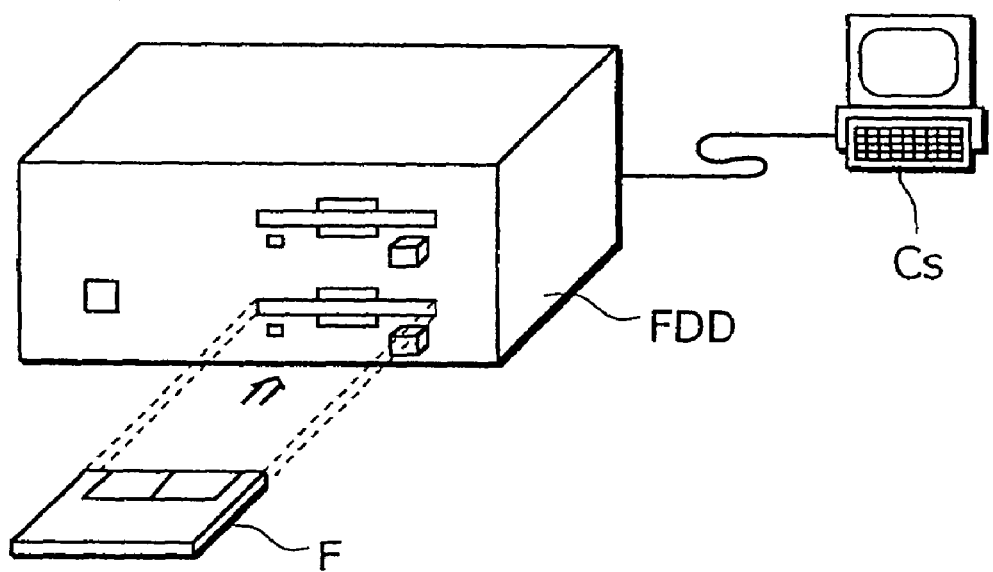
FIG. 52C is an illustration showing a configuration to record and read the above-mentioned program on a flexible disk, FD.

FIG. 52C shows a configuration for recording and reading the above-mentioned program on and from a flexible disk FD. When above-mentioned program is stored on the flexible disk FD, the picture coding method and a picture decoding method as above-mentioned program are written via a flexible disk drive from a computer system Cs. When the above coding or decoding method is constructed in the computer system by the program on the flexible disk, the program is read from the flexible disk and transferred to the computer system.

Note that in the above explanation, a flexible disk is used as a storage medium, however it is possible to perform likewise using an optical disk. Moreover, a storage medium is not limited to a flexible disk and media capable of storing a program such as a CD-ROM, a memory card and a ROM cassette can execute likewise.

Applications of the picture coding method and the picture decoding method shown in the above embodiment and a system using the applications will be further explained.

Figure 53:
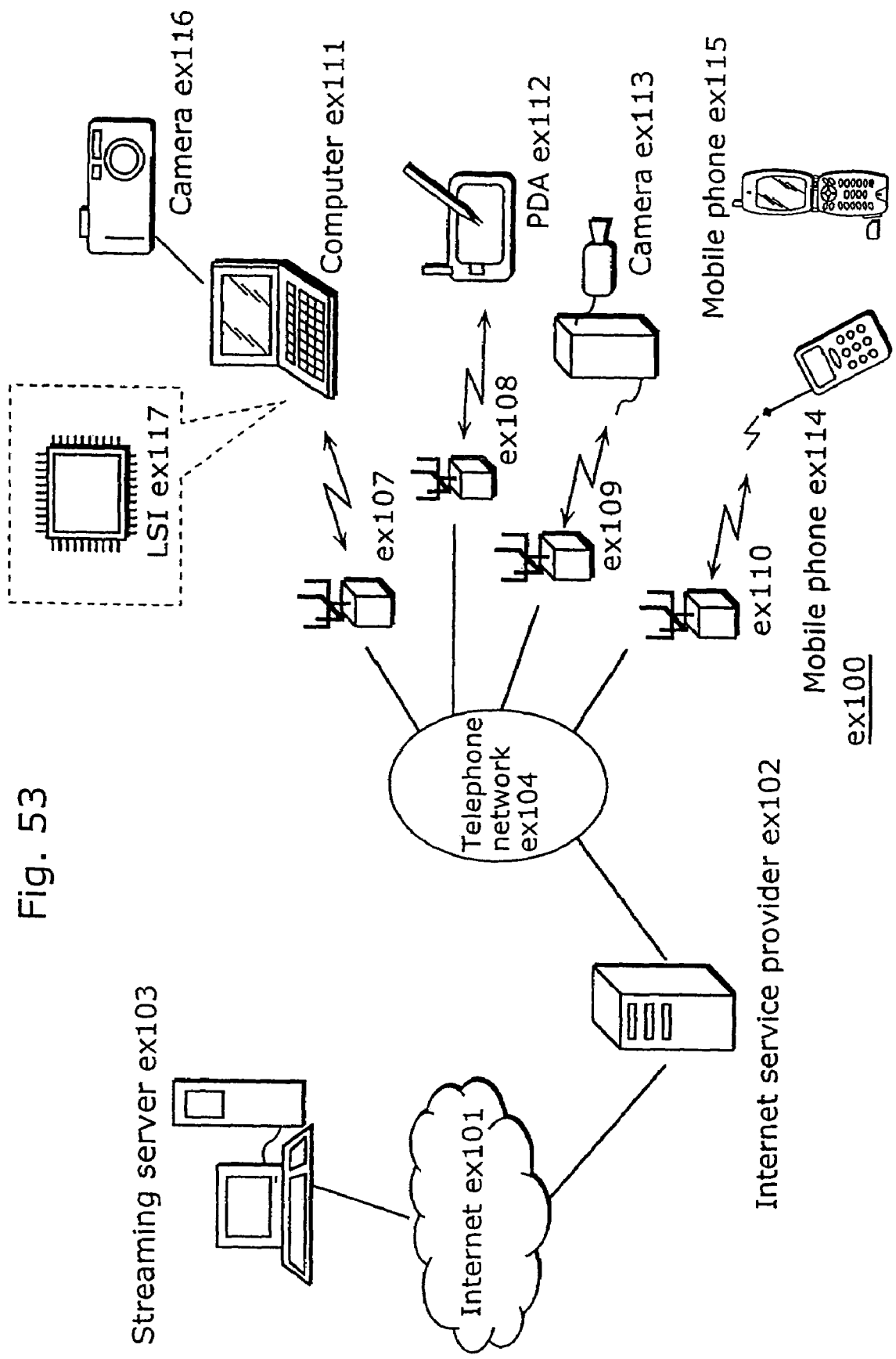
FIG. 53 is a block diagram showing an entire configuration of contents supply system implementing a contents delivery service.

FIG. 53 is a block diagram showing an overall configuration of a content supply system ex100 for realizing content distribution service. The area for providing communication service is divided into cells of desired size, and cell sites ex107~ex110 which are fixed wireless stations are placed in each cell.

In this content supply system ex100, for example, the Internet ex101 is connected to devices such as a computer ex111, a PDA (Personal Digital Assistant) ex112, a camera ex113, a cell phone ex114 and a cell phone with a camera ex115 via the Internet service provider ex102, a telephone network ex104 and cell sites ex107 ex110.

However, the content supply system ex100 is not limited to the configuration as shown in FIG. 53, and may be connected to a combination of any of them. Also, each device may be connected directly to the telephone network ex104, not through the cell sites ex107 ex110.

The camera ex113 is a device such as a digital video camera capable of shooting moving pictures. The cell phone may be a cell phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like.

A streaming server ex103 is connected to the camera ex113 via the cell site ex109 and the telephone network ex104, and live distribution or the like using the camera ex113 based on the coded data transmitted from the user becomes possible. Either the camera ex113 or the server for transmitting the data may code the data. Also, the moving picture data shot by a camera ex116 may be transmitted to the streaming server ex103 via the computer ex111. The camera ex116 is a device such as a digital camera capable of shooting still and moving pictures. Either the camera ex116 or the computer ex111 may code the moving picture data. An LSI ex117 included in the computer ex111 or the camera ex116 performs coding processing. Software for coding and decoding pictures may be integrated into any type of storage medium (such as a CD-ROM, a flexible disk and a hard disk) that is a recording medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by users using the camera ex113, the camera ex116 or the like in the same manner as the above embodiment and transmits them to the streaming server ex103, while the streaming server ex103 makes stream distribution of the content data to the clients at their request. The clients include the computer ex111, the PDA ex112, the camera ex113, the cell phone ex114 and so on capable of decoding the above-mentioned coded data. In the content supply system ex100, the clients can thus receive and reproduce the coded data, and further can receive, decode and reproduce the data in real time so as to realize personal broadcasting.

When each device in this system performs coding and decoding, the picture coding apparatus or the picture decoding apparatus shown in the above embodiment may be used. A cell phone is explained as an example.

Figure 54:
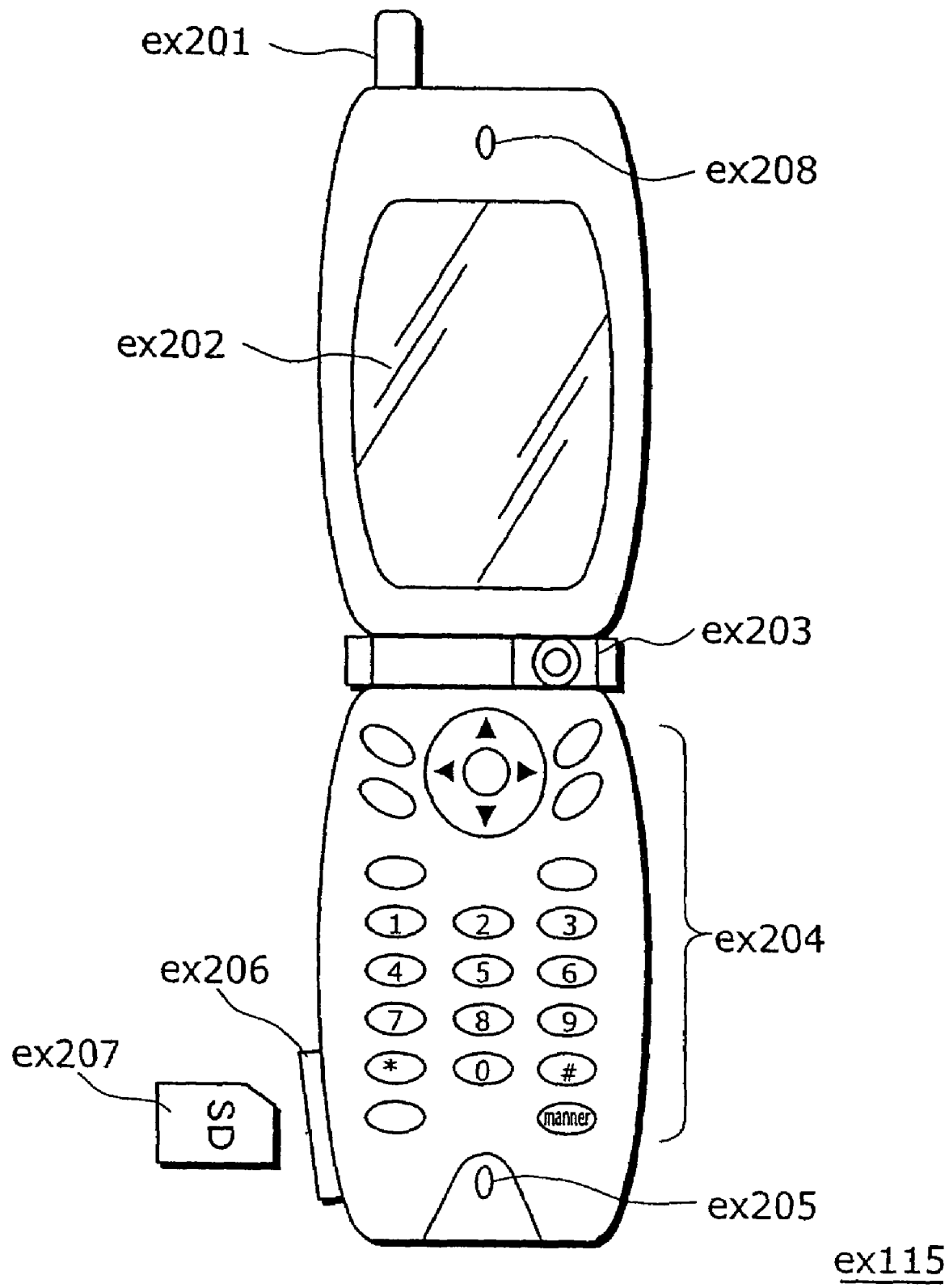
FIG. 54 is an illustration showing an example of an appearance of a cell phone.

FIG. 54 is an illustration showing the cell phone ex115 using the picture coding method and the picture decoding method explained in the above embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data obtained by decoding pictures and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mails and data of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is an electrically erasable and rewritable nonvolatile memory, in a plastic case such as a SD card.

Next, the cell phone ex115 is explained with reference to FIG. 55. In the cell phone ex115, a main control unit ex311 for overall controlling each unit of the body unit including the display unit ex202 and the operation keys ex204 is connected to a power supply circuit unit ex310, an operation input control unit ex304, a picture coding unit ex312, a camera interface unit ex303, a LCD (Liquid Crystal Display) control unit ex302, a picture decoding unit ex309, a multiplexing/separating unit ex308, a recording and reading unit ex307, a modem circuit unit ex306 and a voice processing unit ex305 to each other via a synchronous bus ex313.

When a call-end key or a power key is turned ON by a user's operation, the power supply circuit unit ex310 supplies respective components with power from a battery pack so as to activate the digital cell phone with a camera ex115 for making it into a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the communication circuit unit ex301 performs digital-to-analog conversion and frequency transform of the data, so as to transmit it via the antenna ex201. Also, in the cell phone ex115, the communication circuit unit ex301 amplifies the data received by the antenna ex201 in conversation mode and performs frequency transform and analog-to-digital conversion for the data, the modern circuit unit ex306 performs inverse spread spectrum processing of the data, and the voice processing unit ex305 converts it into analog voice data, so as to output it via the voice output unit 208.

Furthermore, when transmitting an e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform for it, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit 202 via the camera interface unit ex303 and the LCD control unit ex302.

The picture coding unit ex312, which includes the picture coding apparatus as explained in the present invention, compresses and codes the picture data supplied from the camera unit ex203 by the coding method used for the picture coding apparatus as shown in the above-mentioned embodiment so as to transform it into coded picture data, and sends it out to the multiplexing/separating unit ex308. At this time, the cell phone ex115 sends out the voices received by the voice input unit ex205 during shooting by the camera unit ex203 to the multiplexing/separating unit ex308 as digital voice data via the voice processing unit ex305.

The multiplexing/separating unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the communication circuit unit ex301 performs digital-to-analog conversion and frequency transform of the data for transmitting via the antenna ex201.

As for receiving data of a moving picture file which is linked to a Web page or the like in data communication mode, the modem circuit unit ex306 performs inverse spread spectrum processing of the data received from the cell site ex110 via the antenna ex201, and sends out the multiplexed data obtained as a result of the processing to the multiplexing/separating unit ex308.

In order to decode the multiplexed data received via the antenna ex201, the multiplexing/separating unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as explained in the present invention, decodes the bit stream of picture data by the decoding method corresponding to the coding method as shown in the above-mentioned embodiment to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 56:
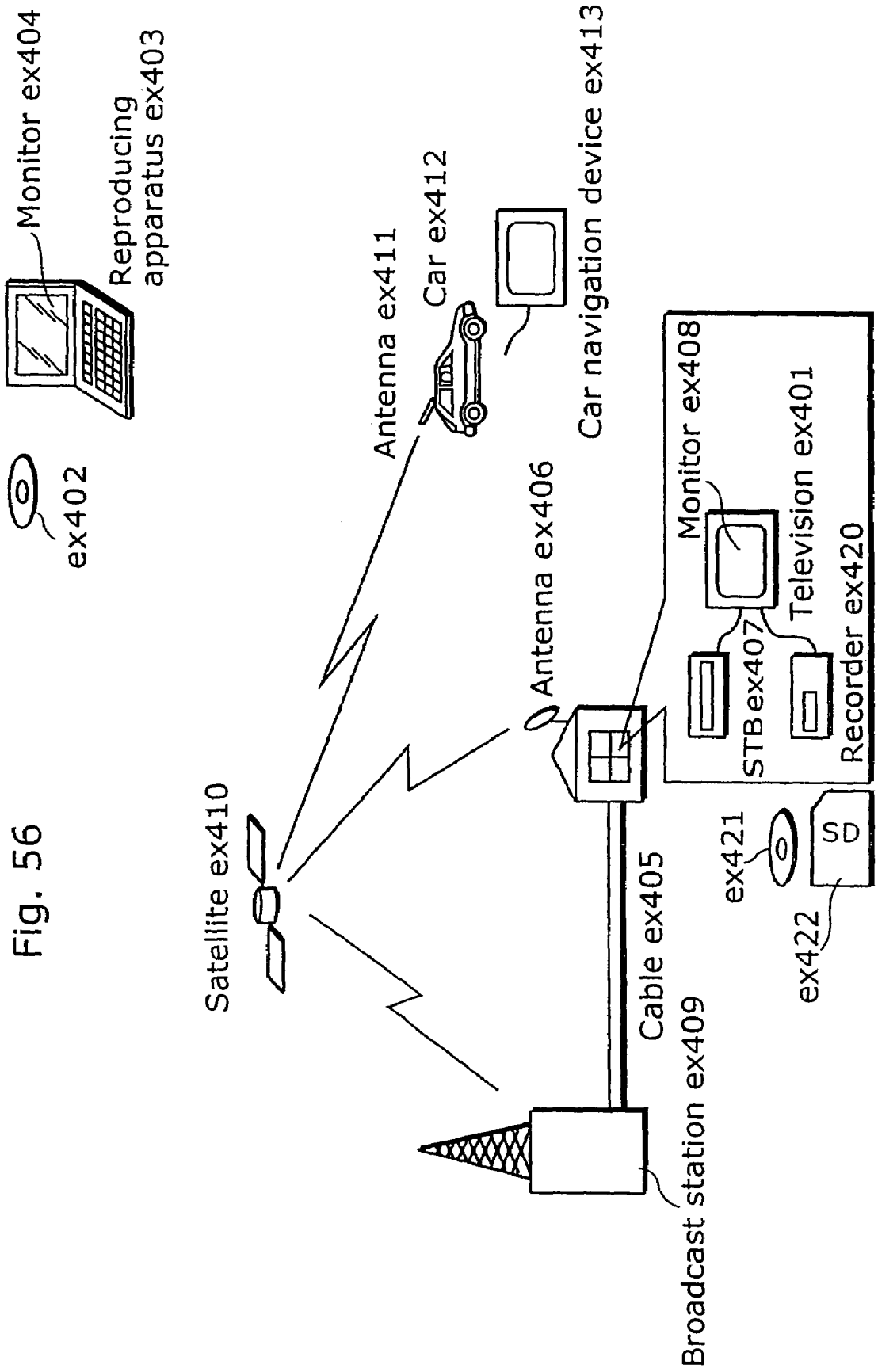
FIG. 56 is an illustration to show a device performing the coding or the decoding process shown in above embodiments and a system using the device.

The present invention is not limited to the above-mentioned system, and at least either the picture coding apparatus or the picture decoding apparatus in the above-mentioned embodiments can be incorporated into a digital broadcasting system as shown in FIG. 56. Such satellite or terrestrial digital broadcasting has been in the news lately. More specifically, a bit stream of video information is transmitted from a broadcast station ex409 to or communicated with a broadcast satellite ex410 via radio waves. Upon receipt of it, the broadcast satellite ex410 transmits radio waves for broadcasting, a home-use antenna ex406 with a satellite broadcast reception function receives the radio waves, and a television (receiver) ex401 or a set top box (STB) ex407 decodes the bit stream for reproduction. The picture decoding apparatus as shown in the above-mentioned embodiment can be implemented in the reproducing apparatus ex403 for reading off and decoding the bit stream recorded on a storage medium ex402 that is a storage medium such as a CD and a DVD. In this case, the reproduced video signals are displayed on a monitor ex404. It is also conceived to implement the picture decoding apparatus in the set top box ex407 connected to a cable ex405 for a cable television or the antenna ex406 for satellite and/or terrestrial broadcasting so as to reproduce them on a monitor ex408 of the television ex401. The picture decoding apparatus may be incorporated into the television, not in the set top box. Or, a car ex412 having an antenna ex411 can receive signals from the satellite ex410 or the cell site ex107 for reproducing moving pictures on a display apparatus such as a car navigation system ex413.

Furthermore, the picture coding apparatus as shown in the above-mentioned embodiment can code picture signals for recording on a storage medium. As a concrete example, there is a recorder ex420 such as a DVD recorder for recording picture signals on a DVD disk ex421 and a disk recorder for recording them on a hard disk. They can be recorded on a SD card ex422. If the recorder ex420 includes the picture decoding apparatus as shown in the above-mentioned embodiment, the picture signals recorded on the DVD disk ex421 or the SD card ex422 can be reproduced for display on the monitor ex408.

Figure 55:
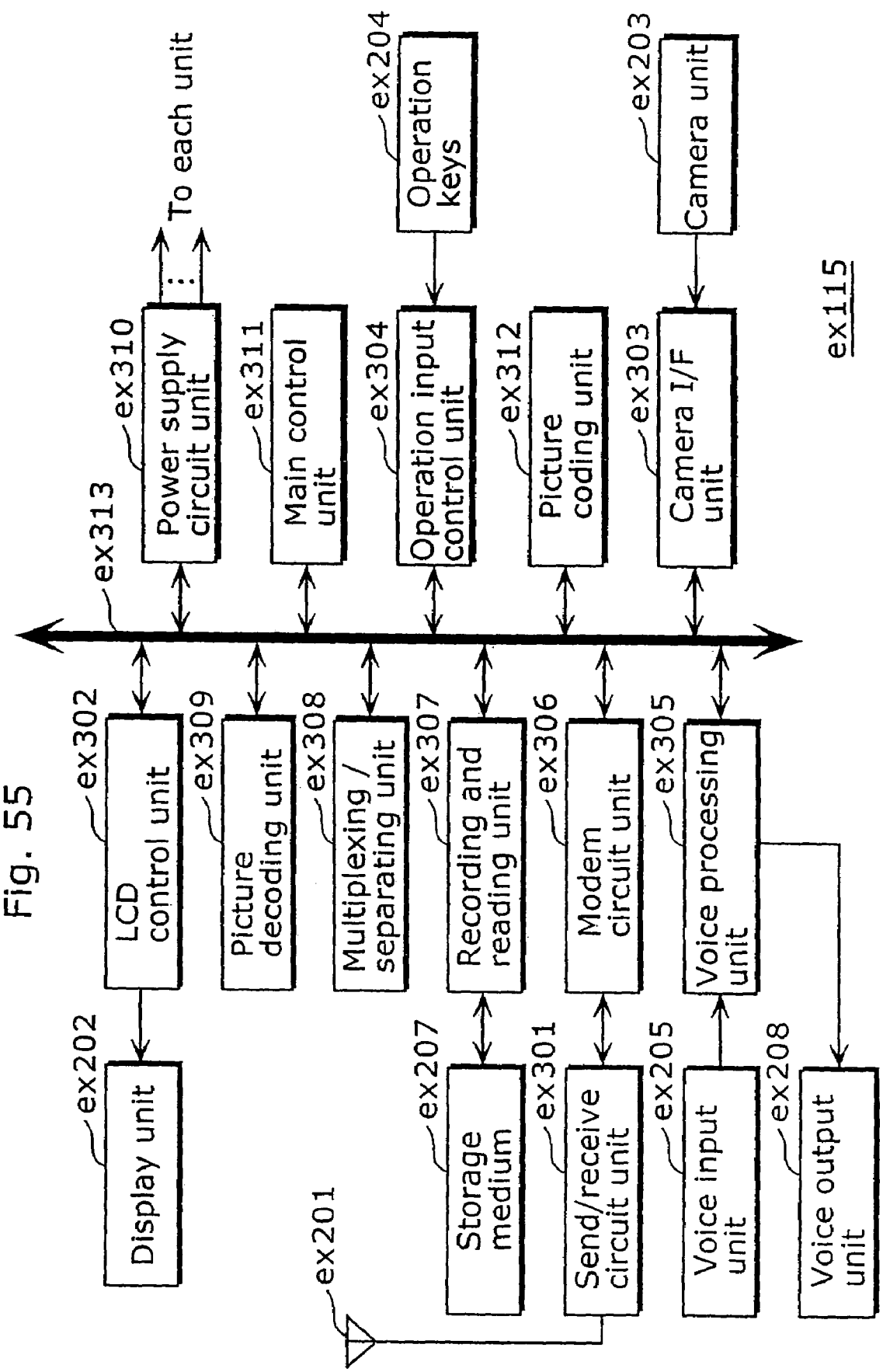
FIG. 55 is a block diagram showing a configuration of the cell phone.

As the structure of the car navigation system ex413, the structure without the camera unit ex203, the camera interface unit ex303 and the picture coding unit ex312, out of the components shown in FIG. 55, is conceivable. The same goes for the computer ex111, the television (receiver) ex401 and others.

In addition, three types of implementations can be conceived for a terminal such as the above-mentioned cell phone ex114; a sending/receiving terminal implemented with both an encoder and a decoder, a sending terminal implemented with an encoder only, and a receiving terminal implemented with a decoder only.

As described above, it is possible to use the moving picture coding method or the moving picture decoding method in the above-mentioned embodiments in any of the above-mentioned device and system, and using this method, the effects described in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The picture coding apparatus according to the present invention is useful as a picture coding apparatus embedded in a personal computer with communication facility, a PDA, a broadcast station for digital broadcasting and a cell phone or the like.

The picture decoding apparatus according to the present invention is useful as a picture decoding apparatus equipped for a personal computer with communication facility, a PDA, a STB for receiving digital broadcasting and a cell phone or the like.

The invention claimed is:

1. A motion vector determining method for determining a motion vector of a current block included in a current picture, said motion vector determining method comprising:
    specifying a co-located block which is a block included in a second picture that is different from the current picture, the co-located block being located in the second picture at the same position that the current block is located in the current picture; and
    determining first and second motion vectors for performing motion compensation on the current block, using a third motion vector which is a motion vector of the co-located block,
    wherein, in the case where a reference picture referred to by the third motion vector is stored in a long term picture buffer, (i) the first motion vector, which refers to the reference picture stored in the long term picture buffer, is determined to be equal to the third motion vector, and (ii) the second motion vector, which refers to the second picture that is different from the current picture, is determined to be equal to a value of 0.

2. The motion vector determining method according to claim 1,
    wherein, in the case where the co-located block has two motion vectors, one of the two motion vectors is used as the third motion vector,
    wherein said one of the two motion vectors is a motion vector which refers to a reference picture selected from a reference picture list in which lower identification numbers are assigned with priority to a reference picture to be displayed prior to the current picture.

3. A semiconductor apparatus for determining a motion vector of a current block included in a current picture, said semiconductor apparatus comprising:
    a specifying unit operable to specify a co-located block which is a block included in a second picture that is different from the current picture, the co-located block being located in the second picture at the same position that the current block is located in the current picture; and
    a determining unit operable to determine first and second motion vectors for performing motion compensation on the current block, using a third motion vector which is a motion vector of the co-located block,
    wherein, in the case where a reference picture referred to by the third motion vector is stored in a long term picture buffer, (i) the first motion vector, which refers to the reference picture stored in the long term picture buffer, is determined to be equal to the third motion vector, and (ii) the second motion vector, which refers to the second picture that is different from the current picture, is determined to be equal to a value of 0.

4. A mobile terminal comprising the semiconductor apparatus according to claim 3.

* * * * *